(12) United States Patent
Puri

(10) Patent No.: US 8,036,267 B2
(45) Date of Patent: *Oct. 11, 2011

(54) RATE CONTROL FOR VIDEO CODER EMPLOYING ADAPTIVE LINEAR REGRESSION BITS MODELING

(75) Inventor: Atul Puri, Mountain View, CA (US)

(73) Assignee: Apple, Inc., Cupertino, CA (US)

( * ) Notice: Subject to any disclaimer, the term of this patent is extended or adjusted under 35 U.S.C. 154(b) by 485 days.

This patent is subject to a terminal disclaimer.

(21) Appl. No.: 12/343,380

(22) Filed: Dec. 23, 2008

(65) Prior Publication Data

US 2009/0103610 A1    Apr. 23, 2009

Related U.S. Application Data

(63) Continuation of application No. 10/811,960, filed on Mar. 30, 2004, now Pat. No. 7,492,820.

(60) Provisional application No. 60/541,907, filed on Feb. 6, 2004.

(51) Int. Cl.
*H04N 7/12* (2006.01)
*H04B 1/66* (2006.01)

(52) U.S. Cl. .............. 375/240.03; 375/240.12

(58) Field of Classification Search ............. 375/240.03, 375/240.24

See application file for complete search history.

(56) References Cited

U.S. PATENT DOCUMENTS

| | | | |
|---|---|---|---|
| 4,245,248 A | 1/1981 | Netravali et al. |
| 4,394,680 A | 7/1983 | Watanabe |
| 4,717,956 A | 1/1988 | Moorhead et al. |
| 4,920,414 A | 4/1990 | Remus et al. |
| 4,958,226 A | 9/1990 | Haskell et al. |
| 4,999,705 A | 3/1991 | Puri |
| 5,001,559 A | 3/1991 | Gonzales et al. |
| 5,086,346 A | 2/1992 | Fujisawa |
| 5,116,287 A | 5/1992 | Hironaka et al. |
| 5,117,283 A | 5/1992 | Kroos et al. |
| 5,117,287 A | 5/1992 | Koike et al. |
| 5,134,476 A | 7/1992 | Aravind et al. |

(Continued)

FOREIGN PATENT DOCUMENTS

CA    2168641 A    3/2000

(Continued)

OTHER PUBLICATIONS

Zhihai He, Y.K. Kim, and S.K. Mitra, "Low-delay rate control for DCT video coding via p-domain source modeling," IEEE Trans. on Circuits and Systems for Video Technology, Aug. 2001, vol. 11, No. 8.

(Continued)

*Primary Examiner* — Dave Czekaj
*Assistant Examiner* — Anner Holder
(74) *Attorney, Agent, or Firm* — Kenyon & Kenyon LLP

(57) ABSTRACT

A rate control system is disclosed for video coding applications. The rate controller assigns a quantization parameter for video data in a picture in response to complexity indicators indicative of spatial complexity, motion complexity and/or bits per pel of the picture. A virtual buffer based quantizer parameter is proposed based on a virtual buffer fullness analysis and a target rate estimate, which is derived from the complexity indicators. A second quantizer parameter is proposed from a linear regression analysis of quantizer parameters used to code previously coded pictures of similar type (e.g., I pictures, P pictures or B pictures). A coding policy decision unit defines a final quantizer parameter from a comparison of the two proposed quantizer parameters.

23 Claims, 28 Drawing Sheets

U.S. PATENT DOCUMENTS

| | | |
|---|---|---|
| 5,136,659 A | 8/1992 | Kaneko et al. |
| 5,170,264 A | 12/1992 | Saito et al. |
| 5,185,819 A | 2/1993 | Ng et al. |
| 5,189,526 A | 2/1993 | Sasson |
| 5,194,941 A | 3/1993 | Grimaldi et al. |
| 5,196,933 A | 3/1993 | Henot |
| 5,214,507 A | 5/1993 | Aravind et al. |
| 5,214,721 A | 5/1993 | Fukuhara et al. |
| 5,227,878 A | 7/1993 | Puri et al. |
| 5,247,590 A | 9/1993 | Fukuhara et al. |
| 5,253,055 A | 10/1993 | Civanlar et al. |
| 5,253,056 A | 10/1993 | Puri et al. |
| 5,270,813 A | 12/1993 | Puri et al. |
| 5,278,646 A | 1/1994 | Civanlar et al. |
| 5,333,012 A | 7/1994 | Singhal et al. |
| 5,343,247 A | 8/1994 | Vogel |
| 5,345,317 A | 9/1994 | Katsuno et al. |
| 5,374,958 A | 12/1994 | Yanagihara |
| 5,404,174 A | 4/1995 | Sugahara |
| 5,408,328 A | 4/1995 | Boliek et al. |
| 5,414,459 A | 5/1995 | Bullwinkel |
| 5,414,469 A | 5/1995 | Gonzales et al. |
| 5,428,396 A | 6/1995 | Yagasaki et al. |
| 5,436,985 A | 7/1995 | Li |
| 5,454,051 A | 9/1995 | Smith |
| 5,465,119 A | 11/1995 | Demos |
| 5,467,135 A | 11/1995 | Yamane et al. |
| 5,467,136 A | 11/1995 | Odaka et al. |
| 5,473,376 A | 12/1995 | Auyeung |
| 5,488,418 A | 1/1996 | Mishima et al. |
| 5,493,513 A | 2/1996 | Keith et al. |
| 5,500,678 A | 3/1996 | Puri |
| 5,524,024 A | 6/1996 | Lin |
| 5,526,052 A | 6/1996 | Ar |
| 5,532,747 A | 7/1996 | Yoon et al. |
| 5,539,468 A | 7/1996 | Suzuki et al. |
| 5,543,846 A | 8/1996 | Yagasaki |
| 5,561,477 A | 10/1996 | Polit |
| 5,566,002 A | 10/1996 | Shikakura |
| 5,592,569 A | 1/1997 | Li |
| 5,598,213 A | 1/1997 | Chung et al. |
| 5,600,375 A | 2/1997 | Wickstrom |
| 5,617,150 A | 4/1997 | Nam et al. |
| 5,619,591 A | 4/1997 | Tsang et al. |
| 5,633,684 A | 5/1997 | Teranishi et al. |
| 5,638,126 A | 6/1997 | Lim |
| 5,638,281 A | 6/1997 | Wang |
| 5,659,490 A | 8/1997 | Imamura |
| 5,694,171 A | 12/1997 | Katto |
| 5,699,117 A | 12/1997 | Uramoto et al. |
| 5,731,837 A | 3/1998 | Hurst, Jr. |
| 5,737,022 A | 4/1998 | Yamaguchi et al. |
| 5,745,182 A | 4/1998 | Yukitake et al. |
| 5,748,789 A | 5/1998 | Lee et al. |
| 5,757,969 A | 5/1998 | Kim |
| 5,757,971 A | 5/1998 | Kim |
| 5,764,374 A | 6/1998 | Seroussi et al. |
| 5,764,805 A | 6/1998 | Martucci et al. |
| 5,777,812 A | 7/1998 | Kim |
| 5,778,097 A | 7/1998 | Nickerson |
| 5,781,665 A | 7/1998 | Cullen et al. |
| 5,786,855 A | 7/1998 | Chen et al. |
| 5,790,695 A | 8/1998 | Suwa |
| 5,812,197 A | 9/1998 | Chan et al. |
| 5,818,532 A | 10/1998 | Malladi et al. |
| 5,822,461 A | 10/1998 | Choi |
| 5,832,115 A | 11/1998 | Rosenberg |
| 5,835,149 A | 11/1998 | Astle |
| 5,850,294 A | 12/1998 | Apostolopoulos et al. |
| 5,852,473 A | 12/1998 | Horne et al. |
| 5,852,682 A | 12/1998 | Kim |
| 5,859,921 A | 1/1999 | Suzuki |
| 5,881,180 A | 3/1999 | Chang et al. |
| 5,883,981 A | 3/1999 | Li et al. |
| 5,912,991 A | 6/1999 | Jeon et al. |
| 5,963,257 A | 10/1999 | Katata et al. |
| 5,966,468 A | 10/1999 | Fujimoto |
| 5,974,172 A | 10/1999 | Chen |
| 5,974,184 A | 10/1999 | Eifrig et al. |
| 5,978,509 A | 11/1999 | Nachtergaele et al. |
| 5,978,510 A | 11/1999 | Chung et al. |
| 5,999,189 A | 12/1999 | Kajiya et al. |
| 5,999,219 A | 12/1999 | Boon |
| 6,005,623 A | 12/1999 | Takahashi et al. |
| 6,005,980 A | 12/1999 | Eifrig et al. |
| 6,026,183 A | 2/2000 | Talluri et al. |
| 6,040,861 A | 3/2000 | Boroczky et al. |
| 6,055,623 A | 4/2000 | Webb et al. |
| 6,057,884 A | 5/2000 | Chen et al. |
| 6,097,842 A | 8/2000 | Suzuki et al. |
| 6,111,991 A | 8/2000 | Ribas-Corbera et al. |
| 6,141,442 A | 10/2000 | Chen |
| 6,148,026 A | 11/2000 | Puri et al. |
| 6,178,205 B1 | 1/2001 | Cheung et al. |
| 6,192,081 B1 | 2/2001 | Chiang et al. |
| 6,208,693 B1 | 3/2001 | Chen et al. |
| 6,222,887 B1 | 4/2001 | Nishikawa et al. |
| 6,223,193 B1 | 4/2001 | Pau et al. |
| 6,233,356 B1 | 5/2001 | Haskell et al. |
| 6,256,422 B1 | 7/2001 | Mitchell et al. |
| 6,269,123 B1 | 7/2001 | Fujishiro et al. |
| 6,366,614 B1 | 4/2002 | Pian et al. |
| 6,380,986 B1 | 4/2002 | Minami et al. |
| 6,385,242 B1 | 5/2002 | Chen |
| 6,459,732 B2 | 10/2002 | Chen et al. |
| 6,532,262 B1 | 3/2003 | Fukuda et al. |
| 6,587,508 B1 | 7/2003 | Hanamura et al. |
| 6,654,417 B1 | 11/2003 | Hui |
| 6,724,817 B1 | 4/2004 | Simpson et al. |
| 6,862,402 B2 | 3/2005 | Kim |
| 6,900,829 B1 | 5/2005 | Ozawa et al. |
| 6,914,937 B2 | 7/2005 | Takenaka |
| 6,915,018 B2 | 7/2005 | Tajime |
| 6,937,656 B2 | 8/2005 | Suzuki |
| 6,940,903 B2 | 9/2005 | Zhao et al. |
| 6,940,911 B2 | 9/2005 | Sugiyama |
| 6,950,040 B2 | 9/2005 | Tsuru |
| 7,058,130 B2 | 6/2006 | Liu et al. |
| 7,079,581 B2 | 7/2006 | Noh et al. |
| 7,110,452 B2 | 9/2006 | Katsavounidis et al. |
| 7,148,908 B2 | 12/2006 | Riek et al. |
| 7,158,570 B2 | 1/2007 | Nagumo et al. |
| 7,266,148 B2 | 9/2007 | Kim |
| 7,277,483 B1 | 10/2007 | Eckart |
| 7,567,721 B2 | 7/2009 | Alattar et al. |
| 2001/0026589 A1 | 10/2001 | Sugiyama |
| 2002/0009139 A1 | 1/2002 | Honda et al. |
| 2002/0012452 A1 | 1/2002 | Van Overveld et al. |
| 2002/0028061 A1 | 3/2002 | Takeuchi et al. |
| 2002/0071489 A1 | 6/2002 | Ramanzin |
| 2002/0146071 A1 | 10/2002 | Liu et al. |
| 2003/0142747 A1 | 7/2003 | Obata et al. |
| 2003/0142748 A1 | 7/2003 | Tourapis et al. |
| 2004/0131267 A1 | 7/2004 | Adiletta et al. |
| 2004/0146108 A1 | 7/2004 | Hsia |
| 2005/0084007 A1 | 4/2005 | Lightstone et al. |

FOREIGN PATENT DOCUMENTS

| | | |
|---|---|---|
| EP | 0 283 715 A2 | 9/1988 |
| EP | 0 400 756 A2 | 12/1990 |
| EP | 0 422 404 A2 | 4/1991 |
| EP | 0 514 663 A2 | 11/1992 |
| EP | 0 517 256 A2 | 12/1992 |
| EP | 0 534 350 A | 3/1993 |
| EP | 0 540 961 A2 | 5/1993 |
| EP | 0 566 219 A2 | 10/1993 |
| EP | 0 582 819 A2 | 2/1994 |
| EP | 0 746 159 A2 | 12/1996 |
| EP | 0 753 970 A2 | 1/1997 |
| WO | WO 94/27252 A | 11/1994 |

OTHER PUBLICATIONS

Zhihai He and S.K. Mitra, "Optimum bit allocation and accurate rate control for video coding via p-domain source modeling," IEEE Trans. on Circuits and Systems for Video Technology, Oct. 2002, pp. 840-849, vol. 12, No. 10.

Zhihai He and S.K. Mitra, "A unified rate-distortion analysis framework for transform coding," IEEE Trans. on Circuits and Systems for Video Technology, Dec. 2001, pp. 1221-1236, vol. 11, No. 12.

Wei Ding, "Joint encoder and channel rate control of VBR video over ATM networks," IEEE Trans. on Circuits and Systems for Video Technology, Apr. 1996, pp. 266-278, vol. 7, No. 2.

Wei Ding and B. Liu, "Rate control of MPEG video coding and recoding by Rate-Quantization modeling," IEEE Trans. on Circuits and Systems for Video Technology, Feb. 1996, pp. 12-20, vol. 6, No. 1.

I-Ming Pao and Ming-Ting Sun, "Encoding stored video for streaming applications," IEEE Trans. on Circuits and Systems for Video Technology, Feb. 2001, pp. 199-209, vol. 11, No. 2.

Jordi Ribas-Corbera and S.-M. Lei, "A frame-layer bit allocation for H.263+," IEEE Trans. on Circuits and Systems for Video Technology, Oct. 2000, pp. 1154-1158, vol. 10, No. 7.

Yan Yang and S.S. Hemami, "Rate control for VBR video over ATM: Simplification and implementation," IEEE Trans. on Circuits and Systems for Video Technology, Nov. 2001, pp. 1045-1058, vol. 11, No. 9.

Supavadee Aramvith, I.-M. Pao, and M.-T. Sun, "A rate-control for video transport over wireless channels," IEEE Trans. on Circuits and Systems for Video Technology, May 2001, pp. 569-580, vol. 11, No. 5.

I-Ming Pao and M.-T. Sun, "Encoding stored video for streaming applications," IEEE Trans. on Circuits and Systems for Video Technology, Feb. 2001, pp. 199-209, vol. 11, No. 2.

Lilla Boroczky, A.Y. Ngai, and E.F. Westermann, "Joint rate-control with look-ahead for multi-program video coding," IEEE Trans. on Circuits and Systems for Video Technology, Oct. 2000, pp. 1159-1163, vol. 10, No. 7.

Jordin Ribas-Corbera and S. Lei, "Rate control in DCT video coding for low-delay communications," IEEE Trans. on Circuits and Systems for Video Technology, Feb. 1999, pp. 172-185, vol. 9, No. 1.

Po-Yuen Cheng, J. Li, and C.-C.J. Kuo, "Rate control for and embedded wavelet video coder," IEEE Trans. on Circuits and Systems for Video Technology, Aug. 1997, pp. 696-702, vol. 7, No. 4.

Kuo-Chin Fan and K.-S. Kan, "An active scene analysis-based approach for pseudoconstant bit-rate video coding," IEEE Trans. on Circuits and Systems for Video Technology, Apr. 1998, pp. 159-170, vol. 8, No. 2.

Ashish Jagmohan and K. Ratakonda, "MPEG-4 one-pass VBR rate control for digital storage," IEEE Trans. on Circuits and Systems for Video Technology, May 2003, pp. 447-452, vol. 13, No. 5.

Anthony Vetro, H. Sun, and Y. Wang, "MPEC-4 rate control for multiple object coding," IEEE Trans. on Circuits and Systems for Video Technology, Feb. 1999, pp. 186-199, vol. 9, No. 1.

Jose I. Ronda, F. Jaureguizar, and N. Garcia, "Rate control and bit allocation for MPEG-4," IEEE Trans. on Circuits and Systems for Video Technology, Dec. 1999, pp. 1243-1258, vol. 9, No. 8.

Hung-Ju Lee, T. Chiang, and Y.-Q. Zhang, "Scalable rate control for MPEG-4 video," IEEE Trans. on Circuits and Systems for Video Technology, Sep. 2000, pp. 878-894, vol. 10, No. 6.

Feng Pan, Z. Li, K. Lim, and G. Feng, "A study of MPEG-4 rate control scheme and its improvements," IEEE Trans. on Circuits and Systems for Video Technology, May 2003, pp. 440-446, vol. 13, No. 5.

Jeong-Woo Lee, A. Vetro, Y. Wang, and Y.-S. Ho, "Bit allocation for MPEG-4 video coding with spatio-temporal tradeoffs," IEEE Trans. on Circuits and Systems for Video Technology, Jun. 2003, pp. 488-502, vol. 13, No. 6.

Chen, T., MPEG4 Video Verification Model VM 5.0, pp. 2-192.

Fukinuki, T.; "Measurement of Movement and Velocity of Moving Objects with Picture Signals"; IE78-67; pp. 35-41; Central Research Laboratory; Hitachi, Ltd.; Kokubunji, Tokyo, Japan, 185; and English translation.

Koga, T. et al.; "Motion-Compensated Interframe Coding for Video Conferencing"; IE81-54; pp. 85-90, C&C Systems Research Laboratories; Nippon Electric Co., Ltd; and English translation.

Nonomiya, Y.; "Motion Correction for Interframe Coding Systems," IE78-6; pp. 1-10; General Technology Research Institute; Nippon Broadcasting Association; and English translation.

Web site material, "MPEG 4: A Flexible Coding Standard for the Emerging Mobile Multimedia Applications," http://www.tnt.uni hannover.de/project/eu/momusys/docs/Paper/IST/pimrc/pimrc. html.

Cohen et al., "Adaptative Differential Coding of Picture Signals Based on Local Contour Prediction," Communications and Knowledge, Partners in Progress, Nov. 29, 30-Dec. 1, 1976, Dallas, Texas.

Ploysongsang, A. et al., "DCT/DPCM Processing of NTSC Composite Video Signal," IEEE Transactions on Communications, vol. COM-30, No. 3, pp. 541-549, XP002062314, ISSN: 0090-6778, Mar. 1, 1982.

Cham et al., "DC Coefficient Restoration in Transform Image Coding," IEE Proceedings, vol. 131, Pt. F, No. 7, pp. 709-713, Dec. 1984.

See et al., "Efficient Encoding of DC Coefficients in Transform Coding of Images Using JPEG Scheme," Signal Image and Video Processing, vol. 1, No. Symp. 24, published Nov. 6, 1991, Institute of Electrical and Electronics Engineers, Jun. 11-14, 1991, pp. 404-407, Singapore.

Kim, J. W. et al., "A Transform Domain Classified Vector Quantizer for Image Coding," IEEE Transactions on Circuit and Systems for Video Technology, pp. 3-14, XP002115624, Mar. 1992.

Puri, A., "Invited address: Video Coding Using the MPEG-1 Compression Standard," AT&T Bell Labs, Holmdel, NJ, 1992 SID Int'l. Symposium Digest of Technical Papers, Society for Information Display, Playa del Rey, CA, May 1992.

De Natale, F. G. B. et al.: "Adaptive DCT for Image-Data Compression," European Transactions on Telecommunications and Related Technologies, vol. 3, No. 4, pp. 359-366, XP000310681, ISSN: 1120-3862, Jul. 1, 1992.

Kok, C. W. et al.: "Image Coding Using DCT of Wavelet Coefficients," Proceedings of the IEEE-SP International Symposium Time-Frequency and Time-Scale Analysis (CT. No. 92TH0478-8), pp. 475-478, XP002115625 1992, NY, NY, IEEE, USA ISBN: 0-7803-0805, Victoria, BC, Canada, Oct. 4-6, 1992.

Test Model Editing Committee, Telecommunication Standardization Sector, Study Group 15, Experts Group for ATM Video Coding (Rapporteur's Group on Part of Q.2/15), International Organisation for Standardisation Organisation Internationale de Normalisation ISO-IEC/JTC1/SC29/WG11 MPEG93/457, "Test Model 5," Draft, Document AVC-491, Version 1, Coded Representation of Picture and Audio Information, Apr. 1993, pp. 1-126.

Puri, A., "Video Coding Using the MPEG Compression Standard," AT&T Bell Labs, Holmdel, NJ, Visual Communications and Image Processing '93, Haskell et al. Chairs/Editors, Cambridge, MA, pp. 1701-1713, vol. 2094, Part Three, SPIE—The Int'l. Society for Optical Engineering, Bellingham, WA, Nov. 8-11, 1993.

International Organisation for Standardisation Organisation Internationale de Normalisation ISO/IEC JTC1/SC29/WG11, N0702 (revised): Incorporating N0702 (revised), incorporating N702 Delta of Mar. 24 and Further Editorial Corrections; "Information Technology—Generic Coding of Moving Pictures and Associated Audio Information: Video, Recommendation H.262"; ISO/IEC 13818-2; May 10, 1994.

Schmidt et al., "Performance Evaluation of Nonscalable MPEG-2 Video Coding," AT&T Bell Laboratories, Holmdel, New Jersey, Visual Communications and Image Processing '94, Katsaggelos, Aggelos K., Chair/Editor, Chicago, Illinois, pp. 296-310, vol. 2308, Part One, SPIE—The International Society for Optical Engineering, Bellingham, Washington, Sep. 25-29, 1994.

International Organisation for Standardisation; Generic Coding of Moving Picture and Associated Audio Information; Video; ISO/IEC JTC1/SC29/WG11 NXXXX; ISO/IEC 13818-2, Nov. 1994.

Aizawa & Huang, "Model-Based Image Coding: Advanced Video Coding techniques for Very Low Bit-Rate Applications," Proceedings of the IEEE, Feb. 1995, vol. 83, No. 2, pp. 259-271.

AOE Sub Group; Organisation Internationale de Normalisation; "MPEG-4 Proposal Package Description (PPD)—Revision 2 (Lausanne Revision)"; Source: ISO/IEC JTC1/SC29/WG11 N0937, MPEG 95/ Coding of Moving Pictures and Associated Audio Information; Mar. 1995.

Hartman et al., The VRML 2.0 Handbook Building Moving Worlds on the Web, pp. 45-46, 264-265, Silicon Graphics, Inc. Addison-Wesley Publishing Co., 1996.

Puri, Atul, "Status and Direction of the MPEG-4 Standard," AT&T Bell Labs, Holmdel, NJ, Multimedia Communications and Video Coding, Wang et al., Editors, pp. 349-356, Plenum Press, New York, 1996.

Chiariglione, Leonard, Florence Press Release, Source: "MPEG Press Release," Int'l Organisation for Standardisation, Coding of Motion Pictures and Audio, ISO/IEC JTC1/SC29/WG11N 1249, pp. 1-3, Firenze (Florence), Exhibit B, Mar. 1996.

Puri et al., "Initial B-Picture Syntax Proposal for MPEG-4 Video," Int'l Organisation for Standardization, Coding of Moving Pictures and Associated Audio, ISO/IEC JTC1/WG11/MPEG 96/ 0776, Florence, Mar. 1996.

Puri et al., "SBASIC Video Coding and Its 3D-DCT Extension for MPEG-4 Multimedia," AT&T Bell Labs, Holmdel, NJ, Visual Communications and Image Processing '96, Ansari et al., Chairs/Editors, Orlando, FL, pp. 1331-1341, vol. 2727, Part Three, SPIE—The Int'l. Society for Optical Engineering, Bellingham, WA, Mar. 17-20, 1996.

Rijkse, Karel, Contact Person, Int'l. Telecommunication Union, ITU-T Draft H.263, Telecommunication, Standardization Sector of ITU, Line Transmission of Non-Telephone Signals, "Video Coding for Low Bitrate Communication," Draft ITU-T Recommendation H.263, http://www.image.cityu.edu.hk/~stwkchan/h263/h263.html, pp. 1-49, May 2, 1996.

AD HOC Group on MPEG-4 Video VM Editing, MPEG-4 Video Verification Model Version 2.1, Source: Video Group, International Organization for Standardisation; Coding of Moving Pictures and Associated Audio Information ISO/IEC JTC1/29/WG11 XXXX, pp. 1-69, May 3, 1996.

Schmidt, R. L., Puri, A. and Haskell, B. G. (AT&T); International Organisation for Standardization Organisation Internationale de Normalisation ISO/IEC JTC1/SC29/WG11, MPEG96/1084; Coding of Moving Pictures and Associated Audio, "Results of Scalability Experiments"; Tampere, Finland, Jul. 1996.

Tan, T.K. and Shen, S. M., "Intra Prediction (T9/T10) and DC/AC Prediction Results"; International Organisation for Standardisation Organisation Internationale de Normalisation ISO/IEC JTC1/SC29/WG11, MPEG 96/0939; Source: Panasonic Singapore Laboratories Pte Ltd (Matsushita); Coding of Moving Pictures and Associated Audio Information; Jul. 1996.

Sullivan, Gary J., Contact, "Altered Sections of H.263 for Draft Text of H.263+"; ITU—Telecommunications Standardization SectorDocument: ITU-LBC-96-358R1, Study Group 15, LBC Experts Group, Shepperton, UK, Jul. 15-18, 1996.

"The Virtual Reality Modeling Language Specification," Version 2.0, ISO-IEC CD 14772, Aug. 4, 1996.

Ad Hoc Group on MPEG-4 Video VM Editing, "MPEG-4 Video Verification Model Version 3.2," International Organisation for Standardisation, ISO/IEC JTC1/SC29/WG11, Coding of Moving Pictures and Associated Audio Information, Chicago, Sep. 1996.

Puri, A., Schmidt, R. L. and Haskell, B. G. (AT&T); International Organisation for Standardization Organisation Internationale de Normalisation ISO/IEC JTC1/SC29/WG11 MPEG96/1320; Coding of Moving Pictures and Associated Audio; "Description and Results of Coding Efficiency Experiment T9 (part 4) in MPEG-4 Video"; Sep. 1996, Chicago.

Chen et al., IEEE International Conference on Image Processing, "An Approach to Region Coding for Content-Based Scalable Video," Sep. 16, 1996, vol. 3, pp. 399-402.

Ebrahimi, T., Ostermann, J., O'Connell, K., Jang, E.S. and the Ad hoc Group on Video Working Draft Editing; International Organization for Standardisation Organisation Internationale de Normalisation ISO/IEC JTC1/SC29/WG11 N1470, MPEG96/ Maceio, "Working Draft 1.0 of ISO/IEC 14496-2," A. Puri (Editor), Coding of Moving Pictures and Audio, Nov. 1996.

Ad Hoc Group on MPEG-4 Video VM Editing; International Organisation for Standardisation Organisation Internationale de Normalisation ISO/IEC JTC1/SC29/ WG11, MPEG 96/ XXXX, Coding of Moving Pictures and Associated Audio Information, "MPEG-4 Video Verification Model Version 5.1"; Dec. 1996.

Haskell, Barry G., Puri, Atul and Netravali, Arun N., "Digital Video: An Introduction to MPEG 2," Digital Multimedia Standards; Chapters 7-9, pp. 146-229, 1997.

Haskell, Barry G., Puri, Atul and NETRAVALi, Arun N., "Digital Video: An Introduction to MPEG 2," Digital Multimedia Standards; Chapter 17, "MPEG-4 and the Future," 1997.

Web site material, "MPEG 4 Video and Its Potential for Future Multimedia Services," http://wwwam.hhi.de/mpeg-video/ papers/sikora/iscas.htm (Jan. 27, 1997).

Chen et al., IEEE Transactions on Circuits and Systems for Video Technology, "Coding of Subregions for Content-Based Scalable Video," vol. 7, No. 1, pp. 256-260, Feb. 1997.

Tekalp & Van Beek, "Core Experiment M2: Triangular Mesh-Based Coding with Object-Based Functionalities," International Organization for Standardisation—University of Rochester, ISO/IEC JTC1/SC29/WG11 MPEG96/1627, pp. 1-18, Feb. 1997.

Puri et al., "Improvements in DCT Based Video Coding," AT&T Laboratories, Visual Communications and Image Processing '97, San Jose, California, SPIE—The International Society for Optical Engineering, Bellingham, Washington, Feb. 1997.

Ebrahimi, T., Horne, C., Ostermann, J., Jang, E.S., and the Ad hoc Groups on Video & SNHC VM/WD Editing; Source: Video & SNHC Groups; International Organization for Standardization Organisation Internationale De Normalisation, ISO/IEC JTC1/SC29/ WG11 N1797, MPEG97/, "Working Draft 4.0 of ISO/IEC 14496-2"; A. Puri (Editor); Stockholm, Jul. 1997.

Eleftheriadis et al., editors, "Text for CD 14496-1 Systems," Int'l. Organization for Standardisation, Coding of Moving Pictures and Audio, ISO/IEC JTC1/SC29/ WG11, N1901, pp. 1-207, Nov. 21, 1997.

Puri et al., "Current and Future Trends in Multimedia Standards," Multimedia Technology for Applications, Sheu et al., Editors, Chapter 1, pp. 3-35, IEEE Press Marketing, Piscataway, NJ, 1998.

Puri, A. and Eleftheriadis, A., "MPEG-4: An Object-Based Multimedia Coding Standard Supporting Mobile Applications" invited paper in Mobile Networks and Applications, 3, pp. 5-32, 1998.

Web site material, "The Structure of the MPEG 4 Video Coding Algorithm," http://www.ee.iisc.ernet.in/people/students/ gupta/Mpeg4/Coding/fmpeg4vm.htm (Mar. 1, 1998).

Int'l. Organization for Standardisation, Coding of Moving Pictures and Audio, ISO/IEC JTC1/ SC29/ WG11, N2403, "MPEG-4 Standard Completed," 6 pages, Oct. 12-16, 1998.

FDIS/BIFS, Technical Paper, Chapter 9, Sections 9.1 through 9.4.2. 100.2, 16:37, Nov. 23, 1998.

MPEG-4 Systems, "Coding of Audio-Visual Objects: Systems," ISO/IEC JTC 1/SC 29/WG 11, N2501, ISO/IEC 14496-1:1999(E), Dec. 18, 1998.

Puri et al., "Scene Description, Composition, and Playback Systems for MPEG-4," SPIE, Visual Communications and Image Processing '99, San Jose, California, pp. 2-13, Jan. 25-27, 1999.

Puri, A. and Tekalp, A. M., "MPEG-4 and MPEG-7 Standards," Electronic Imaging, Course Notes, San Jose, Jan. 1999.

MPEG-4 Systems Group, N2739, "Text for ISO/IEC 14496-1/PDAM1," ISO/IEC JTC1/SC29/WG11, Mar. 1999.

MPEG-4 Systems Group, N2741, "MPEG-4 Systems Version 2 Verification Model 6.0," ISO IEC JTC1/SC29/ WG11, Mar. 1999.

Web site material, "Object Based Coding," http://www.ece.concordia.ca/ÿsorial/seminar 1/node18.html (Jul. 14, 1999).

Lifshitz, Z., Dicagno, G., Franceschini, G. and Battista, S., "MPEG-4 Players Implementation," Multimedia Systems, Standards, and Networks, Puri, A. and Chen, T., Editors, Chapter 16, pp. 461-486, Marcel Dekker, Inc., New York, New York, 2000.

Puri, A. and Chen, T., editors, Multimedia Systems, Standards, and Networks, Chapters 3-5, 7-9, 12 and 13; Marcel Dekker, Inc., New York, New York, 2000.

Int'l. Organisation for Standardisation; Coding of Motion Pictures and Audio, ISO/IEC 14496-2: 1999/Amd. 1:2000(E); ISO/IEC JTC1/SC29/WG11; SC 29 Secretariat: JISC; Information Technology—Coding of Audio-Visual Objects—Part 2: Visual, Amendment 1: Visual Extensions; Exhibit D; Jan. 31, 2000.

Siwei Ma et al., "Rate Control for Advance Video Coding (AVC) Standard," Proceedings of the 2003 IEEE International Symposium on Circuits and Systems, vol. II of V, 2003, pp. 892-895.

Blinn, "Quantization Error and Dithering", IEEE Computer Graphics and Applications, 1994, pp. 78-82.

J. Lee and B.W. Dickinson, "Scene-adaptive motion interpolation structures based on temporal masking in human visual perception," in Proc. SPIE Conference on Visual Comm. and Image Processing, Cambridge, 1993, pp. 499-510.

A. Hanjalic, "Shot-Boundary Detection: Unraveled and resolved?," IEEE Transactions on Circuits and Systems for Video Technology, vol. 12, No. 2, pp. 90-105, Feb. 2002.

C L. Huang and B Y Liao, "A robust scene-change detection method for video segmentation," IEEE Signal Processing Letters, vol. 7, No. 7, pp. 173-175, Jul. 2000.

T. Vlachos, "Cut detection in video sequences using phase correlation," IEEE Signal Processing Letters, vol. 7, No. 7, pp. 173 175, Jul. 2000.

U. Gargi, R. Kasturi, and S.H. Strayer, "Performance characterization of video shot change detection methods," IEEE Transactions on Circuits and Systems for Video Technology, vol. 10, No. 1, pp. 1-13, Feb. 2000.

R.M. Ford, C. Robson, D. Temple, and M. Gerlach, "Metrics for shot boundary detection in video sequences," Multimedia Systems, vol. 8, pp. 37-46, 2000.

B L Yeo and B. Liu, "Rapid Scene analysis on compressed video," IEEE Transactions on Circuits and Systems for Video Technology, vol. 5, No. 6, pp. 533-544, Dec. 1995.

H.J. Zhang, C.Y. Low, and S.W. Smoliar, "Video parsing and browsing using compressed data," Multi media Tools and Applications, vol. 1, No. 1, pp. 89-111, Mar. 1995.

H.C. Liu and G. Zick, "Automatic determination of scene changes in MPEG compressed video," in Proc. IEEE Symp. Circuits and Systems, Seattle, 1995, vol. 1, pp. 764-767.

Z. Cernekova, C. Nikou, and I. Pitas, "Shot detection in video sequences using entropy based metrics," in Proceedings of IEEE International Conference on Image Processing, 2002, vol. 3, pp. 421-424.

B. Shahraray, "Scene change detection and content based sampling of video sequences," in Digital Video Compression: Algorithms and Technologies, 1995, vol. SPIE 2419, pp. 2-13.

J. Bescos, G. Cisneros, and J.M. Menendez, "Multidimensional comparison of shot detection algorithms," in Proceedings of IEEE International Conference on Image Processing, 2002, vol. 2, pp. 401-403.

J. Meng, Y. Juan, and S.F. Chang, "Scene change detection in a MPEG compressed video sequence," in Digital Video Compression: Algorithms and Technologies, 1995, vol. SPIE 2419, pp. 14-25.

Jungwoo Lee and Bradley W. Dickinson, "Temporally adaptive motion interpollation exploiting temporal masking in visual perception," IEEE Transactions on Image Processing, vol. 3, No. 5, pp. 513-526, Sep. 1994.

International Telecommunication Union, ITU-T, H.264 (May 2003), Telecommunication Standardization Sector of ITU, "Series H: Audiovisual and Multimedia Systems Infrastructure of audiovisual services—Coding of moving video," Advanced video coding for generic audiovisual services, ITU-T Recommendation H.264, pp. 135-136.

Tihao Chiang and Ya-Qin Zhang (Chiang), A New Rate Control Scheme Using Quadratic Rate Distortion Model, IEEE, 1996, pp. 246-250.

Test Model Editing Committee, Telecommunication Standardization Sector, Study Group 15, Experts Group for ATM Video Coding (Rapporteur's Group on Part of Q.2/15), International Organisation for Standardisation Organisation Internationale De Normalisation, ISO-IEC JCTI/SC29/WG11/N0400. "Test Model 5" Coded Representation of Picture and Audio Information. Document AVC-491B, Version 2: Apr. 1993, pp. 1-120.

Ardizzone, E. et al. "Video Indexing Using MPEG Motion Compensation Vectors", 1999 IEEE International Conference on Multimedia Computing and Systems, Jul. 1999, vol. 2, pp. 725-729.

Lan, Austin Y., Nguyen, A.G., and Hwang, J-N, "Scene-context-dependent reference-frame placement for MPEG video coding," IEEE Trans. on Circuits and Systems for Video Technology, Apr. 1999, pp. 478-489, vol. 9, No. 3.

Mitchell, J.L., et al. "MPEG Video Compression Standard", 1996, Chapman & Hall, New York, XP002367660, pp. 79 and 331.

Ohm, J. R., "Digitale Bildcodierung," 1995, pp. 127-130, Springer-Verlag, Heidelberg, XP002350026.

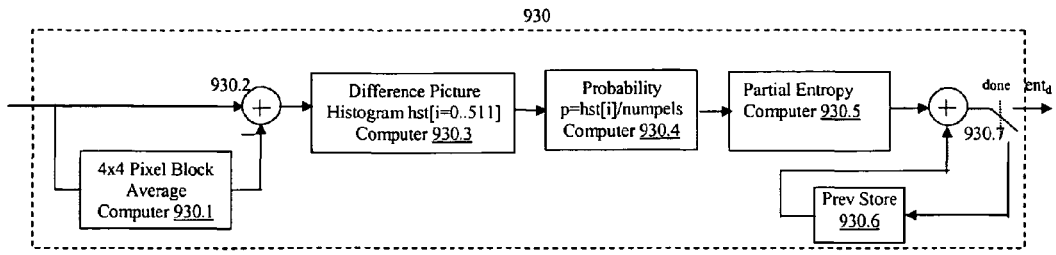
FIG. 11A
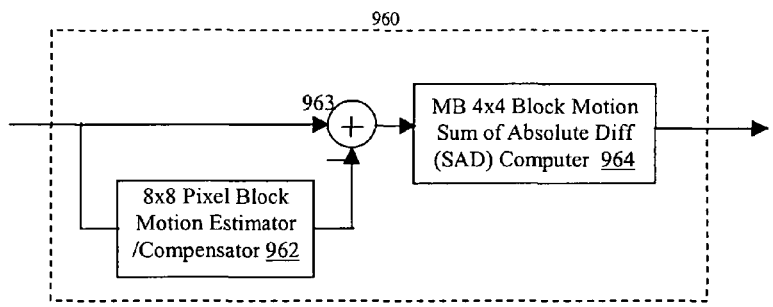
FIG. 11B
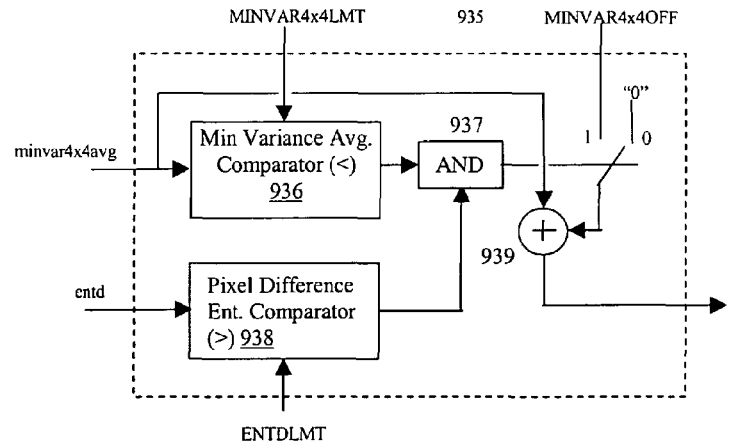
FIG. 11C
| BBPID | | | | | | | | |
|---|---|---|---|---|---|---|---|---|
| 0 | 1 | 2 | 3 | 4 | 5 | 6 | 7 | 8 |
| 0.01052 | 0.02104 | 0.04208 | 0.08416 | 0.16832 | 0.33664 | 0.67328 | 1.34656 | 2.69312 |
FIG. 12A - 915

CPID

| 0 | 1 | 2 | 3 | 4 | 5 | 6 | 7 | 8 | 9 | 10 | 11 |
|---|---|---|---|---|---|---|---|---|---|----|----|
| 1.0 | 2.0 | 4.5 | 8.5 | 12.5 | 17.0 | 22.0 | 28.0 | 34.0 | 41.0 | 50.0 | 60.0 |

| 12 | 13 | 14 | 15 | 16 | 17 |
|----|----|----|----|----|----|
| 71.0 | 84.0 | 100.0 | 120.0 | 145.0 | 177.0 |

CPXID

| 0 | 1 | 2 | 3 | 4 | 5 | 6 | 7 | 8 |
|---|---|---|---|---|---|---|---|---|
| 1 | 3 | 5 | 7 | 9 | 11 | 13 | 15 | 17 |

CPMID

| 0 | 1 | 2 | 3 | 4 |
|---|---|---|---|---|
| 32.0 | 64.0 | 112.0 | 184.0 | 280.0 |

1300 – video scene with subscenes of various complexity 1304 high texture, low motion
1306 low texture, medium panning motion
1308 medium texture, complex / high motion
1310 medium texture, medium object motion qh264

| 0 | 1 | 2 | 3 | 4 | 5 | 6 | 7 | 8 | 9 | 10 | 11 | 12 |
|---|---|---|---|---|---|---|---|---|---|---|---|---|
| .250 | .281 | .315 | .353 | .396 | .446 | .500 | .561 | .623 | .707 | .794 | .891 | 1.00 |

| 13 | 14 | 15 | 16 | 17 | 18 | 19 | 20 | 21 | 22 | 23 | 24 | 25 |
|---|---|---|---|---|---|---|---|---|---|---|---|---|
| 1.12 | 1.26 | 1.41 | 1.59 | 1.78 | 2.00 | 2.25 | 2.52 | 2.82 | 3.18 | 3.56 | 4.00 | 4.49 |

| 26 | 27 | 28 | 29 | 30 | 31 | 32 | 33 | 34 | 35 | 36 | 37 | 38 |
|---|---|---|---|---|---|---|---|---|---|---|---|---|
| 5.04 | 5.65 | 6.35 | 7.13 | 8.00 | 8.98 | 10.08 | 11.31 | 12.70 | 14.25 | 16.00 | 17.96 | 20.16 |

| 39 | 40 | 41 | 42 | 43 | 44 | 45 | 46 | 47 | 48 | 49 | 50 | 51 |
|---|---|---|---|---|---|---|---|---|---|---|---|---|
| 22.63 | 25.39 | 28.51 | 32.00 | 35.92 | 40.31 | 45.25 | 50.80 | 57.02 | 64.00 | 71.83 | 80.64 | 90.51 |

| CPID | | | | | |
|---|---|---|---|---|---|
| 0 | 1 | 2 | 3 | 4 | 5 |
| -68134.59213 | -87003.98467 | -106202.60465 | -125401.23463 | -133506.23620 | -141558.73699 |
| 6 | 7 | 8 | 9 | 10 | 11 |
| -149611.24778 | -151588.19751 | -220858.39744 | -293963.81117 | -254808.46319 | -215653.11522 |
| 12 | 13 | 14 | 15 | 16 | 17 |
| -207487.50918 | -1993321.90315 | -191155.48428 | -182989.06541 | -178235.75132 | -169521.36854 |

| CPID | | | | | |
|---|---|---|---|---|---|
| 0 | 1 | 2 | 3 | 4 | 5 |
| 3313453.21342 | 3993567.19336 | 4565785.16255 | 5138003.13174 | 5715464.15501 | 6104194.66665 |
| 6 | 7 | 8 | 9 | 10 | 11 |
| 6492925.17829 | 6678722.15535 | 9084900.80067 | 11517856.77655 | 10611605.70466 | 9705354.63278 |
| 12 | 13 | 14 | 15 | 16 | 17 |
| 9777071.15962 | 9848787.68646 | 9920504.21330 | 9992220.74014 | 10623397.89991 | 11435042.39299 |

FIG. 29A

CPXID

| BPPID | 0 | 1 | 2 | 3 | 4 | 5 | 6 | 7 | 8 |
|---|---|---|---|---|---|---|---|---|---|
| 0 | 10 | 11 | 12 | 13 | 14 | 15 | 16 | 17 | 18 |
| 1 | 9 | 10 | 11 | 12 | 13 | 14 | 15 | 16 | 17 |
| 2 | 8 | 9 | 10 | 11 | 12 | 13 | 14 | 15 | 16 |
| 3 | 7 | 8 | 9 | 10 | 11 | 12 | 13 | 14 | 15 |
| 4 | 6 | 7 | 8 | 9 | 10 | 11 | 12 | 13 | 14 |
| 5 | 5 | 6 | 7 | 8 | 9 | 10 | 11 | 12 | 13 |
| 6 | 4 | 5 | 6 | 7 | 8 | 9 | 10 | 11 | 12 |
| 7 | 3 | 4 | 5 | 6 | 7 | 8 | 9 | 10 | 11 |
| 8 | 2 | 3 | 4 | 5 | 6 | 7 | 8 | 9 | 10 |

FIG. 29B

CPXID

| BPPID | 0 | 1 | 2 | 3 | 4 | 5 | 6 | 7 | 8 |
|---|---|---|---|---|---|---|---|---|---|
| 0 | 10 | 11 | 12 | 13 | 14 | 15 | 16 | 17 | 18 |
| 1 | 9 | 10 | 11 | 12 | 13 | 14 | 15 | 16 | 17 |
| 2 | 8 | 9 | 10 | 11 | 12 | 13 | 14 | 15 | 16 |
| 3 | 7 | 8 | 9 | 10 | 11 | 12 | 13 | 14 | 15 |
| 4 | 6 | 7 | 8 | 9 | 10 | 11 | 12 | 13 | 14 |
| 5 | 5 | 6 | 7 | 8 | 9 | 10 | 11 | 12 | 13 |
| 6 | 4 | 5 | 6 | 7 | 8 | 9 | 10 | 11 | 12 |
| 7 | 3 | 4 | 5 | 6 | 7 | 8 | 9 | 10 | 11 |
| 8 | 2 | 3 | 4 | 5 | 6 | 7 | 8 | 9 | 10 |

FIG. 29C

CPXID

| BPPID | 0 | 1 | 2 | 3 | 4 | 5 | 6 | 7 | 8 |
|---|---|---|---|---|---|---|---|---|---|
| 0 | 2 | 2 | 2 | 3 | 3 | 3 | 4 | 4 | 4 |
| 1 | 1 | 2 | 2 | 2 | 3 | 3 | 3 | 4 | 4 |
| 2 | 1 | 1 | 2 | 2 | 2 | 3 | 3 | 3 | 4 |
| 3 | 1 | 1 | 1 | 2 | 2 | 2 | 3 | 3 | 3 |
| 4 | 1 | 1 | 1 | 1 | 2 | 2 | 2 | 3 | 3 |
| 5 | 0 | 1 | 1 | 1 | 2 | 2 | 2 | 2 | 3 |
| 6 | 0 | 0 | 1 | 1 | 1 | 2 | 2 | 2 | 2 |
| 7 | 0 | 0 | 0 | 1 | 1 | 1 | 2 | 2 | 2 |
| 8 | 0 | 0 | 0 | 0 | 1 | 1 | 1 | 2 | 2 |

US 8,036,267 B2

RATE CONTROL FOR VIDEO CODER EMPLOYING ADAPTIVE LINEAR REGRESSION BITS MODELING

RELATED APPLICATIONS

This application is a continuation of U.S. patent application Ser. No. 10/811,960, filed on Mar. 30, 2004, which claims the benefit of Provisional Application Ser. No. 60/541,907, filed on Feb. 6, 2004.

BACKGROUND

The invention relates to the encoding of video signals, and more particularly, encoding of video allowing control of bitrate to meet a target while ensuring that good video quality will result when the encoded stream is decoded.

Video compression is a popular topic since there are a plethora of existing and upcoming applications, products and services of digital video. With tend towards higher resolution/quality digital video, the bandwidth requirements of uncompressed digital video becomes quite significant, necessitating the use of compression. Thus a number of video compression schemes have been developed, some proprietary while others that are standards. The goal in video encoding is to be able to generate a compressed representation of video material that can be decoded for playback by suitable devices or in software. Typically, good quality encoding can be computationally intensive and expensive and thus it is preferable to generate coded content just once, and decode it for play back often, as needed. This requires interoperability between encoded compressed representations (bitstreams) and decoders capable of playing it. A guarantee of interoperability also implies that decoder from different manufacturers would be able to decode compliant bitstreams resulting in decoded video of identical quality. Further, since video coding/decoding can be computationally expensive, to reduce decoder costs, economies of scale are often exploited. Both for the reasons of interoperability as well as that of economies of scale, considerable effort has been put in standardization of video compression schemes, although many proprietary schemes also co-exist.

Earlier MPEG audio and video coding standards such as MPEG-1 and MPEG-2 have enabled many familiar consumer products. For instance, these standards enabled video CD's and DVD's allowing video playback on digital VCRs/set-top-boxes and computers, and digital broadcast video delivered via terrestrial, cable or satellite networks, allowing digital TV and HDTV. While MPEG-1 mainly addressed coding of non-interlaced video of Common Intermediate Format (CIF) resolution at data-rates of 1.2 Mbit/s for CD-ROM offering VHS-like video quality, MPEG-2 mainly addressed coding of interlaced TV resolution video at 4 to 9 Mbit/s and high definition TV (HDTV) video at 15 to 20 Mbit/s. At the time of their completion the MPEG-1 (1992) and the MPEG-2 (1994) standards represented a timely as well as practical, state-of-the-art technical solution consistent with the cost/performance tradeoffs of the products intended an within the context of implementation technology available. MPEG-4 was launched to address a new generation of multimedia applications and services. The core of the MPEG-4 standard was developed during a five year period however MPEG-4 is a living standard with new parts added continuously as and when technology exists to address evolving applications. The premise behind MPEG-4 was future interactive multimedia applications and services such as interactive TV, internet video etc where access to coded audio and video objects might be needed. The MPEG-4 video standard is designed as a toolkit standard with the capability to allow coding and thus access to individual objects, scalability of coded objects, transmission of coded video objects on error prone networks, as well as efficient coding of video objects. From coding efficiency standpoint, MPEG-4 video was evolutionary in nature as it was built on coding structure of MPEG-2 and H.263 standards by adding enhanced/new tools with in that structure. Thus, MPEG-4 part 2 offers a modest coding gain but only at the expense of a modest increase in complexity.

The H.264/MPEG-4 AVC standard is a new state of the art video coding standard that addresses aforementioned applications. The core of this standard was completed in the form of final draft international standard (FDIS) in June 2003. It promises significantly higher compression than earlier standards. The standard evolved from the original work done by ITU-T VCEG in their H.26L project over the period of 1999-2001, and with MPEG joining the effort in late 2001, a joint team of ITU-T VCEG and ISO MPEG experts was established for co-developing the standard. The resulting joint standard is called H.264 by VCEG and is called either MPEG-4 part 10 or MPEG-4 Advanced Video Coding (AVC) by MPEG. Informally, the standard is also referred to as the Joint Video Team (MVT) standard since it was a result of collaborative activity of VCEG and MPEG standards groups. The H.264/MPEG-4 AVC standard is often quoted as providing up to a factor of 2 improvement over MPEG-2, and as one would expect the significant increase in compression efficiency comes at the expense of substantial increase in complexity. As in the case of earlier standards, only the bitstream syntax and the decoding semantics are standardized, encoder is not standardized. However, to obtain good results, encoding needs to be performed in a certain manner, and many aspects of encoding are implemented demonstrated in collaborative software developed by JVT, known as the Joint Model (JM).

Rate control, since it is a major encoding issue and further it can be fairly application dependent and complex; it has not been addressed sufficiently in JVT. Despite ongoing effort of over a year, and while it can have a significant impact on coded video quality, the JM software still does not include a solution for rate control. While an important requirement in rate control is to ensure that on the average, coding bitrate does not exceed target bitrate, this has to be done while maintaining acceptable video quality. Thus adaptive quantization is also closely related to rate control as adaptation of quantizer used in transform coding is a common approach to control rate of generation of bits in video coding. More successful techniques for rate control have to be generally aware of characteristics of the content, features of video coders, as well as spatial/temporal quality expectations from an application. Being aware of codec features typically involves knowing about, individual picture types (I-, P-., B- and others) and their bitrate needs, picture coding structures that can be derived from picture types, tradeoffs in motion coding versus transform coding, impact of quantizer adjustment vs. frame dropping etc. Among the many solutions for rate control available, the rate control of MPEG-2 Test Model 5 (TM5) still offers a reasonable starting point and can be the basis of design for a new, custom rate controller. The TM5 rate controller consists of three main steps—target bit allocation, virtual buffer based bit rate control, and adaptive quantization. But TM5 rate controller, while a reasonable starting point, was designed for MPEG-2, a very different codec than H.264/MPEG-4 AVC. Even for MPEG-2 it has well documented shortcomings, and further it was intended for higher bit-rate coding only so its performance may not be good at lower bitrates. Besides, there are several new issues with H.264 as compared to earlier standards that one needs to be careful about in designing a rate controller. Here is a list of some of the issues that are relevant to bitrate and quality control while coding as per the H.264/MPEG-4 AVC standard.

- Since coding occurs at relatively lower bitrates then earlier standards, relatively larger bitrate fluctuations can easily occur during coding causing difficulties in rate control.
- The nature of quantizer in this standard may not allow sufficient precision in quantizer adaptation at normal coding bitrates at the expense of too much precision at higher bitrates, causing difficulties in rate control.
- Since in this standard, changes in quantizer impact loop filtering, during rate control, care needs to be taken in changing quantizer to avoid introducing spatio-temporal variations that can cause visible artifacts.
- The bitrates for B-pictures are generally smaller but can vary a lot with respect to earlier standards and thus add to difficulties in rate control.
- Quantizer changes need to be carefully restricted based on scene complexity, picture types, and coding bitrate to prevent adverse impact on picture quality.
- Low complexity motion estimation, mode decision, and reference selection can result in excessive bits generated for certain frames, making bitrate control difficult.
- Macroblock quantizer or RDopt lambda changes if not performed carefully can introduce visible spatio-temporal quality variations in areas of fine texture.

Thus, at present none of the rate control techniques provide a good solution for bitrate and picture quality controlled encoding with H.264/MPEG-4 AVC standard over a range of bit-rates and video content. This is so because none of the existing techniques were designed to address nuances of H.264/MPEG-4 AVC, which is a complex, new standard. Thus what is needed in the art is a new rate controller that is effective for bitrate control, producing good picture quality, while keeping low complexity and delay when encoding with H.264/MPEG-4 AVC standard. Before discussing such a rate controller that is the subject of this invention, we introduce several basic concepts in design of a rate controller, by using example of a MPEG-2 TM5, a prior art rate controller.

FIG. 1 illustrates a prior art generalized MPEG encoder with a TM5 rate controller, and FIG. 2 illustrates details of components of a TM5 rate controller. MPEG encoder with TM5 rate controller 100 shown in FIG. 1 is useful for bitrate-controlled coding of video material to achieve a given bitrate budget for storage on disk or for constant bitrate transmission over a network.

Video frames or fields referred to here as pictures to be coded are input via line 102 to an MPEG encoder 150 and to TM5 rate controller 140. An example of such an encoder is MPEG-1, MPEG-2, or MPEG-4 video encoder known to those of skill in the art. TM5 rate controller 140 takes as input, coding parameters on line 104, and coding statistics on line 152 and inputs them to picture target bits computer 110. The coding parameters on line 104 consist of bit-rate, picture-rate, number of I-, P- and B-pictures, universal coding constants for P- and B-pictures, and others. The coding statistics on line 152 consist of actual coding bits, quantizer used for the picture of a certain type just coded, and others; this statistics is output by the MPEG encoder 150. Based on this information, picture target bits computer 110 outputs target bits for each picture of a pre-known picture type to be coded. Virtual buffer based quantizer computer 120 takes as input, target bits on line 112 for a picture of a certain type being coded, a subset of coding parameters (bit-rate, picture-rate, and universal coding constants for P- and B-pictures) on line 118, and subset of coding statistics (partial bits generated in current picture up to current macroblock) on line 116 to output on line 122, a new quantizer value for each macroblock. The quantizer value output on line 122 is derived from fullness of internal virtual buffer of a picture of the type being coded and is updated every macroblock. Line 122 is also an input to activity based quantizer computer 130, at the other input 124 of which, are video pictures input to TM5 rate controller via line 140. The activity based quantizer computer 130 performs the function of modulating the buffer based quantizer available on line 122, with an activity measure for the picture being coded, outputting an activity based quantizer on line 132 for use by MPEG encoder 150 for quantization of DCT coefficients of picture blocks during encoding. The MPEG Encoder 150 outputs encoded video bitstream on line 154 and this coded bitstream can then be stored or transmitted for eventual consumption by a matching decoder to produce decoded video pictures.

FIG. 2A shows details of picture target bits computer 110 introduced in FIG. 1 and as is known in the art. In order to explain this we first introduce the terminology used by TM5 rate controller. A video sequence may be divided into groups-of-pictures (GOPs) of known size. A GOP can be identified by its length N (e.g. 15 meaning there are 15 frames in a GOP) and distance M between P-pictures (e.g. M=3, meaning 2 B-picture pattern, which would cause a coding pattern of I B B P B B P . . . from pictures in input order). Let:

$S_I$, $S_P$, $S_B$ correspondingly represent actual bits generated in coding any I-, P-, B-pictures, $Q_I$, $Q_P$, $Q_B$ correspondingly represent actual average quantizer values generated in coding of any I-, P-, B-pictures, $X_I$, $X_P$, $X_B$ correspondingly represent resulting complexity measures ($X_I=S_I Q_I$, $X_P=S_P Q_P$, $X_B=S_B Q_B$), $N_I$, $N_P$, $N_B$ correspondingly represent number of I-, P-, B-, pictures remaining in a GOP, $T_I$, $T_P$, $T_B$ correspondingly represent target bits for coding any I-, P-, B-pictures, and $K_P$, $K_B$ represent corresponding universal constants (e.g., $K_P=1.0$, $K_B=1.4$) in coding.

Further, let bitrate represent bitrate to be used in coding, and picturerate represent frame rate of video, G represent total bits (G=bitratexN/picturerate) assigned to a GOP, and R represent bits remaining (after coding a picture, $R=R-S_{i,p,b}$) during coding of a GOP. TM5 specifies equations for calculation of corresponding target bits $T_I$, $T_P$, $T_B$ of I-, P- and B-pictures, such that each of $T_I$, $T_P$, $T_B$ are a function of R, $N_P$, $N_B$, $X_I$, $X_P$, $X_B$, $K_P$, $K_B$, bitrate, and picturerate. With this introduction of terminology, now we are ready to discuss FIG. 2A.

Coding parameters on line 104, are separated into $N_I$, $N_P$, $N_B$ on line 214, and $K_P$, $K_B$ on line 216, and are applied to I-, P-, B-picture target bits equations implementer 220, that also receives as input, complexity values $X_I$, $X_P$, $X_B$ on line 206. Line 152 provides feedback in the form of coding statistics, $Q_I$, $Q_P$, $Q_B$ on line 202, $S_I$, $S_P$, $S_B$ on line 204 and R on line 208. The respective $Q_I$, $Q_P$, $Q_B$ on line 202 and $S_I$, $S_P$, $S_B$ on line 204 are multiplied in 205 resulting in $X_I$, $X_P$, $X_B$, on line 206 for input to I-, P-, B-picture target bits implementer 220 Implementer 220 also takes, as an input, the output of differencer in 210, which represents the remaining bits R generated as noted above ($R=R-S_{i,p,b}$).

Dividers 225, 230 and multiplier 235 collectively generate a signal having a value $$\frac{bitrate}{8*picrate}.$$

A selector 240 (labeled "MAX") selects the greater of the two values output respectively from the implementer 220 and the multiplier 235 as the target rate value $T_{i,p,b}$.

FIG. 2B is a block diagram of a Virtual Buffer Based Quantizer Computer 120 suitable for use with TM5 applications. The Quantizer Computer 120 may generate a buffer based quantizer $q_{buf}$ on a macroblock-by-macroblock basis for coding of input pictures. The quantizer parameter may be calculated as:

$$q_{buf} = \frac{r}{31}\left(d_{X0} + B_{j-1} - \frac{T_X \times (j-1)}{MB\_cnt}\right), \text{ where}$$

X=I, P or B depending upon the type of picture being coded, $T_x$ are the target rate values computed by the TBC 110. The Quantizer Computer 120 may includes an initial $d_0^{I,B,P}$ computer 250 that calculates $d_{x0}$ (x=I, P or B) values according to:

$$d_{I0} = 10 \times \frac{r}{31}, d_{P0} = K_P \times d_{I0}, \text{ and } d_{B0} = K_B \times d_{I0}.$$

FIG. 2C is a block diagram of an Activity Based Quantizer Computer 130 suitable for use in a TM5-base rated controller. Responsive to input video data vidin, the quantizer computer 130 calculates variances, minimum variances and minimum activity for each 8×8 block in an input frame (box 280). A picture average minimum activity computer 285 averages minimum variances for the macroblocks. A MB normalized minimum 8×8 block activity computer 290 generates normalized values of block activity. A MB activity quantizer computer generates a quantizer value $q_p$ based on the normalized activity identified by computer 290 and also based on an assigned picture type value ptyp and previous quantizer values $q_{buf}$. The $q_p$ value is selected for each macroblock in an input picture.

The inventors identified a need in the art for a rate controller that is effective for bitrate control, that produces good picture quality and maintains low complexity and delay when encoding with H.264/MPEG-4 AVC standard.

BRIEF DESCRIPTION OF TIRE DRAWINGS

FIG. 1 illustrates a prior art TM5 Rate Controller;

FIG. 2A-2C provide block diagrams of processing systems suitable for use with a TM5 Rate Controller;

FIG. 11A-11C show block diagrams of pixel difference with block average and entropy computer, motion compensated sum of absolute difference computer, and entropy exception variance modifier according to an embodiment of the present invention.

FIG. 12A illustrates exemplary bits-per-limit threshold (bpplmt) values for use in a look up table of a content characteristics and coding rate analyzer according to an embodiment of the present invention.

FIG. 29A-29C illustrate exemplary I-frame quantizer limit ($q_{Ilmt}$) values, P-frame quantizer limit ($q_{plmt}$) values and B-frame delta quantizer limit ($q_{bdlmt}$) values according to an embodiment of the present invention.

DETAILED DESCRIPTION

Embodiments of the present invention provide a rate and quality controller (RQC) for use in video coding applications. According to an embodiment, the RQC may control coding rates applicable to I-, P- and B-frames in a manner that maintains a desired coding rate at acceptable quality. The RQC may set coding rates based in part on observed complexity in video content of the frames, allocating perhaps a higher coding rate to complicated frames than for relatively uncomplicated frames. In another embodiment, the RQC may set coding rates according to a balance of a first rate estimate based on frame complexity and another estimate based on historical values. While rate estimates may be met by quantizer adjustments for many rate control situations, in other situations quantizer control may be employed as part of an overall rate control solution which also may include selective zeroing of DCT coefficients and/or motion vectors, control of the number of motion vectors used per frame and frame decimation, among other things.

Figure 1:
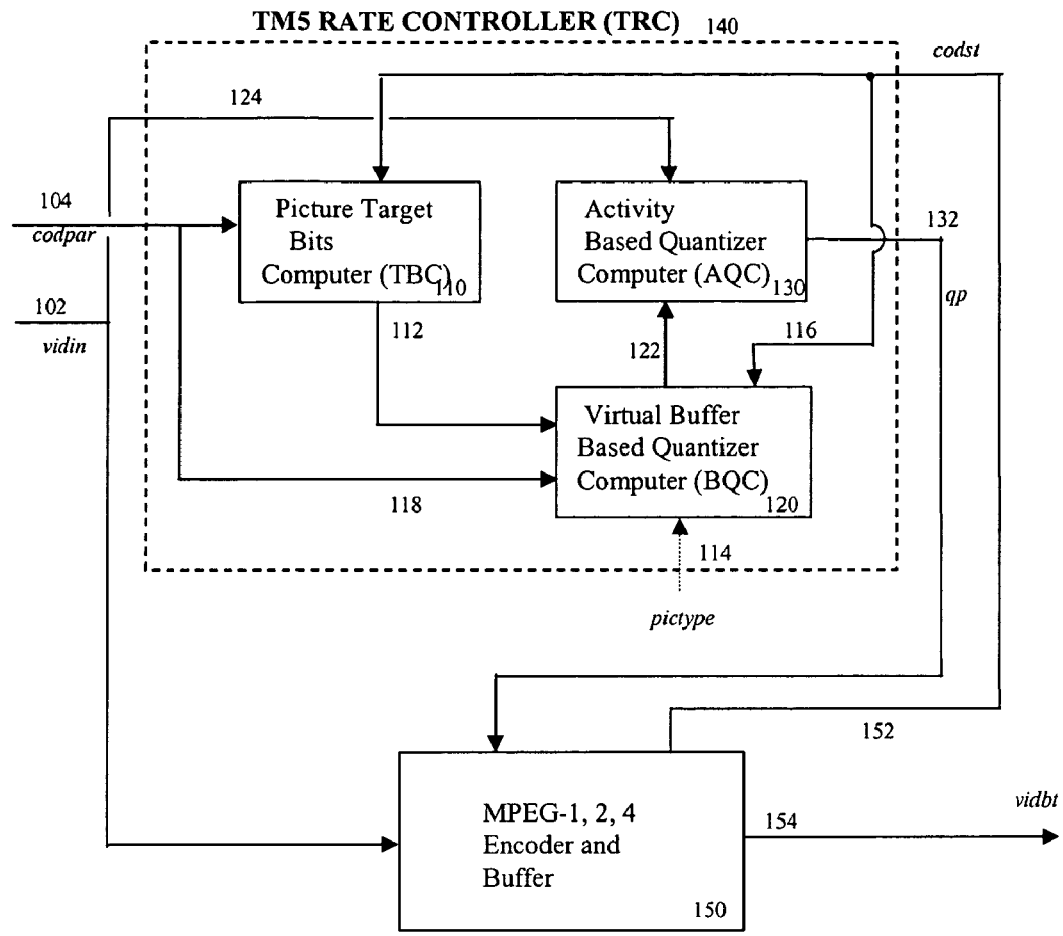
Figure 2A:
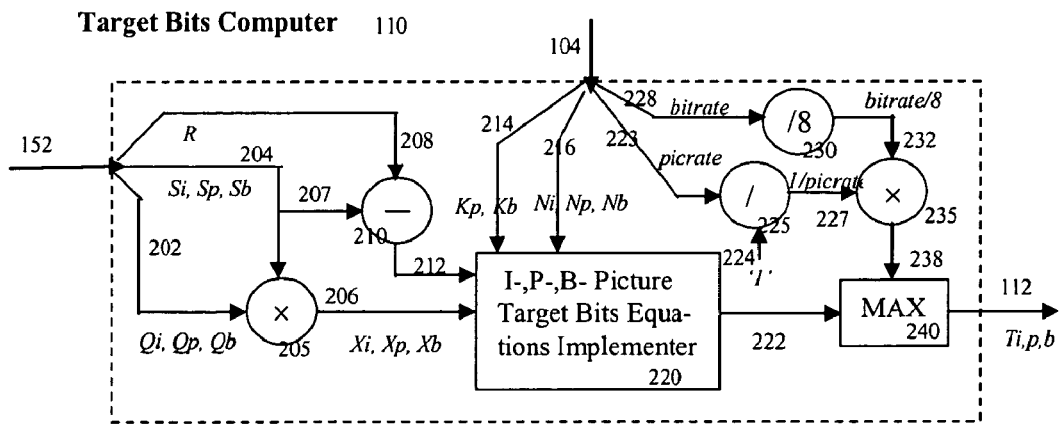
Figure 2B:
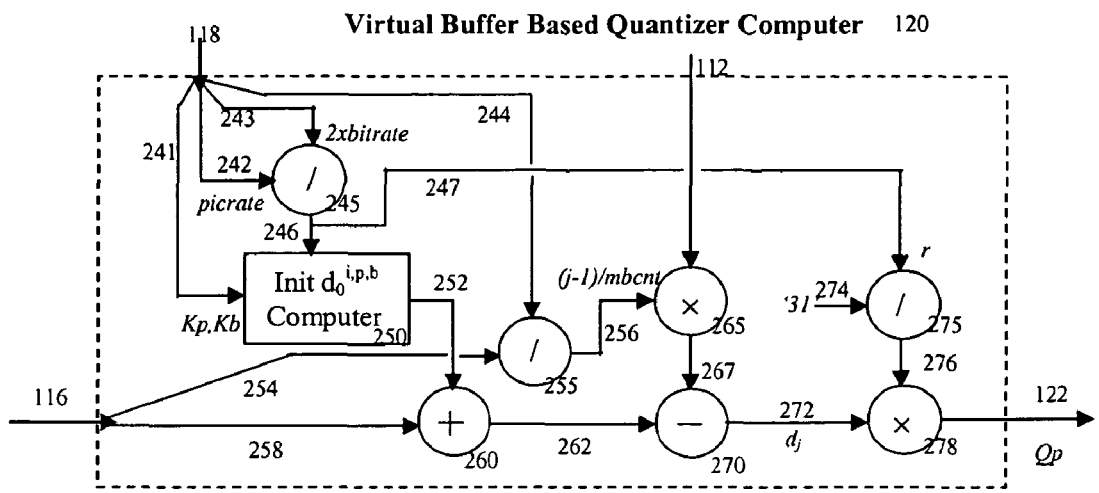
Figure 2C:
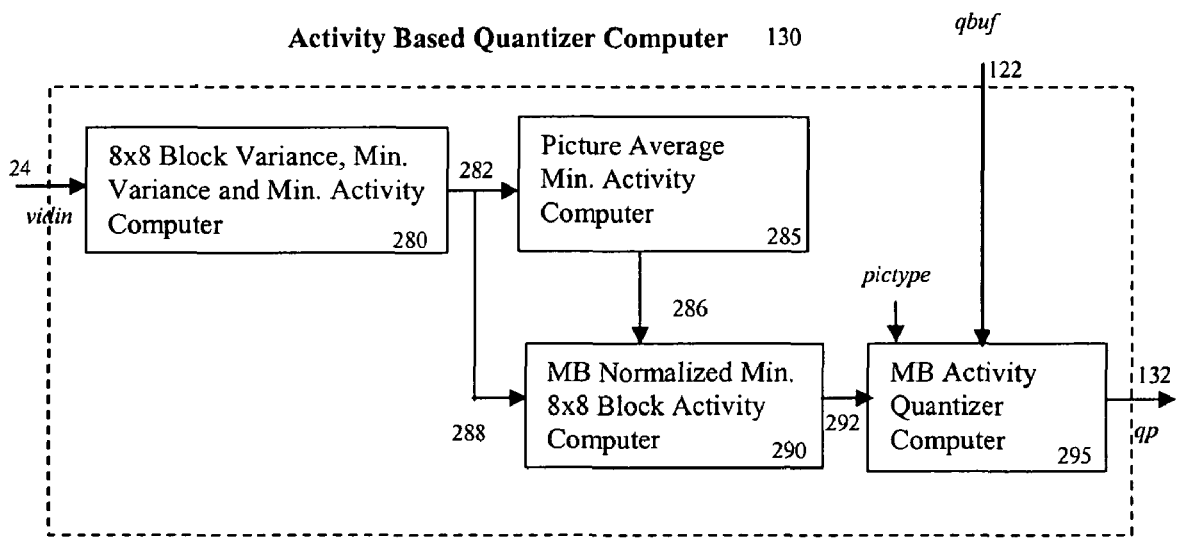
Figure 3:
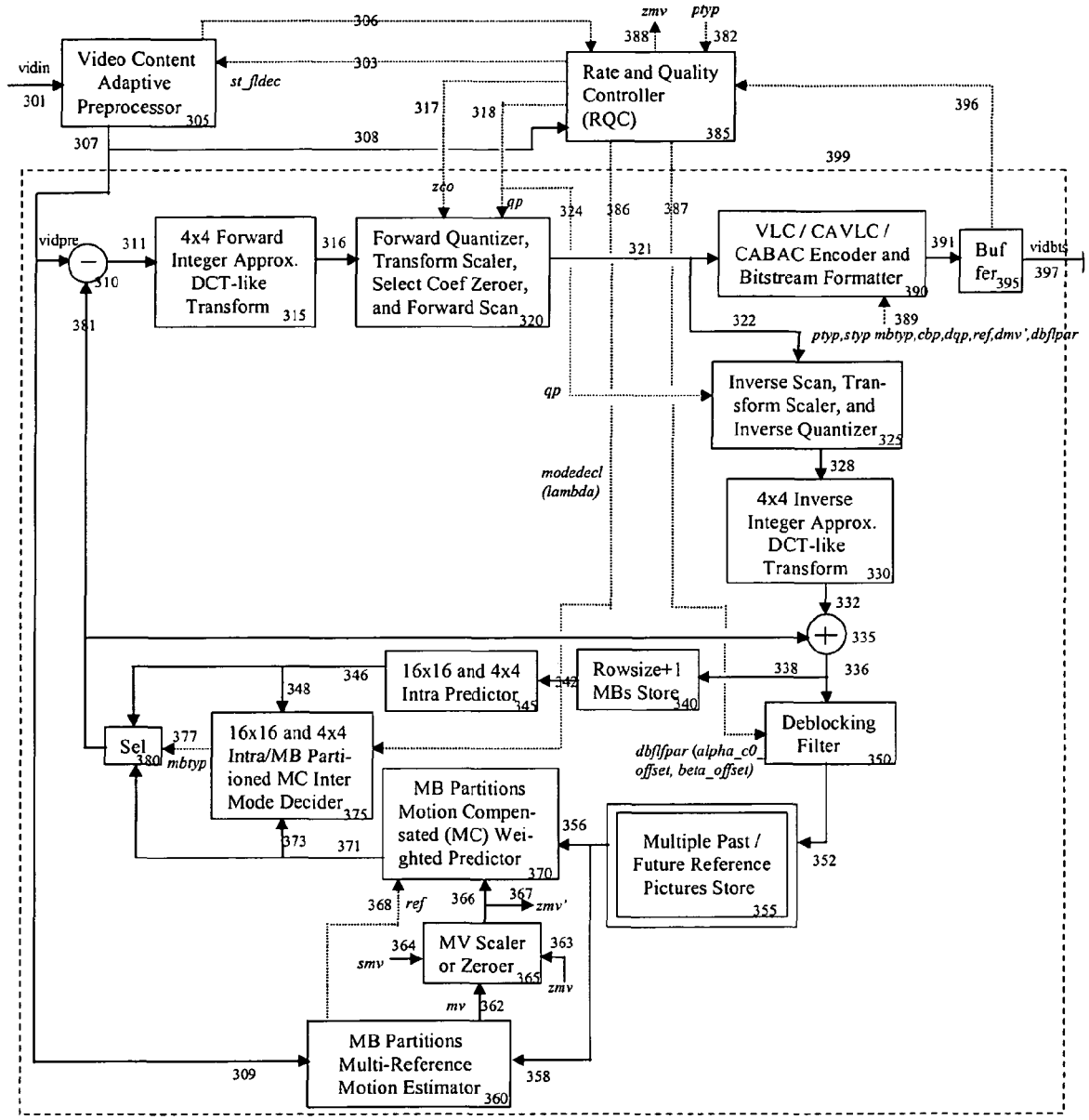
FIG. 3 illustrates a block diagram of a rate and quality controlled H.264/MPEG-4 AVC video encoder according to an embodiment of the present invention.

FIG. 3 is a simplified block diagram of an AVC coder integrated with an RQC controller 300 according to an embodiment of the present invention. In an embodiment, the AVC coder 300 may include a video control adaptive preprocessor 305 that receives source video data 310 and prepares it for video coding. Preprocessing 305 generally may include filtering, organizing frame data into blocks and macroblocks and possibly frame decimation. In an embodiment, frame decimation may be performed under control of the RQC 385 (shown as st_fldec signal 303). Video data from the preprocessor 305 (vidpre) may be output to the RQC 385 and to a coder 399.

The coder 399 may perform a variety of spatial and temporal predictions of video data for a current frame being coded. A subtractor 310 determines a difference between video data of the current frame (vidpre) and predicted video data on line 381. The different is subject to transform coding, quantization, transform scaling, scanning and variable length coding, represented by boxes 315, 320 and 390. In an AVC coder, 4 pixel by 4 pixel blocks output by the subtractor 310 are coded by a high correlation transform (such as a discrete cosine transform or the integer approximation transforms proposed for use in the AVC standard) to yield transform coefficients. The coefficients are scaled by a quantizer parameter $q_P$ output by the RQC 385 (box 320). Typically, the coefficient values are divided by $q_P$ and rounded to the nearest integer. Many coefficients are rounded to zero according to this quantization.

Additionally, when so commanded by the RQC 385 (signal zco), select DCT coefficients may be set to zero even if they otherwise would have been reduced to some non-zero value as a result of the quantization.

Scaled coefficients that remain may be scanned according to a run length code, variable length coded and formatted for transmission to a decoder (boxes 320, 390). Thereafter, the coded data may be transferred to a transmit buffer 395 to await transmission to a channel 397. Typically, channels are communication channels established by a computer or communication network. Storage devices such as electrical, magnetic and/or optical storage devices also may be used as channels.

Modern video coders include a decoding chain to decode coded video data. For lossy coding applications, the decoding chain permits the encoder to generate reconstructed video data that is likely to be obtained at a decoder. For temporal prediction, for example, the video coding process overall is made more accurate by predicting video data for a current frame based on the decoded video data of a past frame (as opposed to source video data for the past frame).

An AVC coder 300, therefore, may include processing to invert the processes applied by boxes 320 and 315. The decoding chain may perform an inverse scan, an inverse transform scaler and inverse quantization (box 325). In so doing, the decoding chain may multiply any recovered coefficients by the quantization parameter $q_P$ used for the frame. The decoding chain also may include an inverse DCT transform 330 to generate recovered pixel residuals for 4×4 blocks. An adder 335 generates an output video signal by adding predicted video data (line 381) to the recovered residuals (line 332). The output video data may be forwarded to storage 340 and to a deblocking filter 350.

Storage device 340 may store previously decoded macroblocks for use in spatial prediction. The storage device 340 typically stores all previously coded macroblocks that are immediate neighbors of a current macroblock. Therefore, storage 340 is sized to store at least the number of macroblocks that are present in a row of the video data plus one. An intra predictor 345 generates predicted video data for a current macroblock based upon recovered macroblocks that previously were coded for the frame. The predicted video data is output to a mode decision unit 375 and to a selector 380.

A deblocking filter 350 performs filtering across a recovered video frame to ameliorate discontinuities that may occur at block boundaries in a recovered video signal. The deblocking filter 350 also may clean up noise artifacts that may arise from video capture equipment (e.g., cameras) and other sources. In H.264, a deblocking filter operates according to parameters alpha and beta (α, β), which typically are maintained at predetermined values. According to an embodiment, the RQC 385 may control the deblocking parameters α, β according to its rate policies and observable rate conditions. Thus, FIG. 3 illustrates a deblocking filter parameter signal dbflpar having alpha and beta offset components to control the deblocking filter 350.

The decoding chain may include a macroblock partitions multi-reference motion estimator 360 which compares video data of a current frame to co-located elements of reconstructed video data of reference frames available in storage 355 to identify a closely matching block from a stored frame. A motion vector (mv) generally represents spatial displacement between the closely matching stored block and the input block. For AVC coding, the estimator may generate a first motion vector for all video data in a macroblock (a 16 pixel by 16 pixel area of video data) and additional motion vectors for blocks and sub-blocks therein. Thus, there may be a set of four motion vectors for each 8×8 block in the macroblock. There may be separate motion vectors for 8×16 and 16×8 blocks covering the macroblock. There also may be separate motion vectors for each of 16 4×4 blocks within the macroblock. The macroblock partitions multi-reference motion estimator 360, the motion vector scaler or zeroer 365 and the macroblock partitions motion compensated (MC) weighted predictor 370 cooperate to calculate motion vectors of the various block sizes and types. A mode decider 375 ultimately determines which motion vectors, if any, will be used to predict video data of an input macroblock.

The mode decider 375 selects either the temporally predicted video data or the spatially predicted video data for use to code an input macroblock. Responsive to the mode decision, the mode decider 375 controls the selector to pass the selected predicted macroblock data to the subtractor 310. According to an embodiment of the present invention, a coding selection may be imposed upon the mode decider 375 by the RQC 385 to satisfy a rate control condition that the RQC 385 decides.

Figure 4:
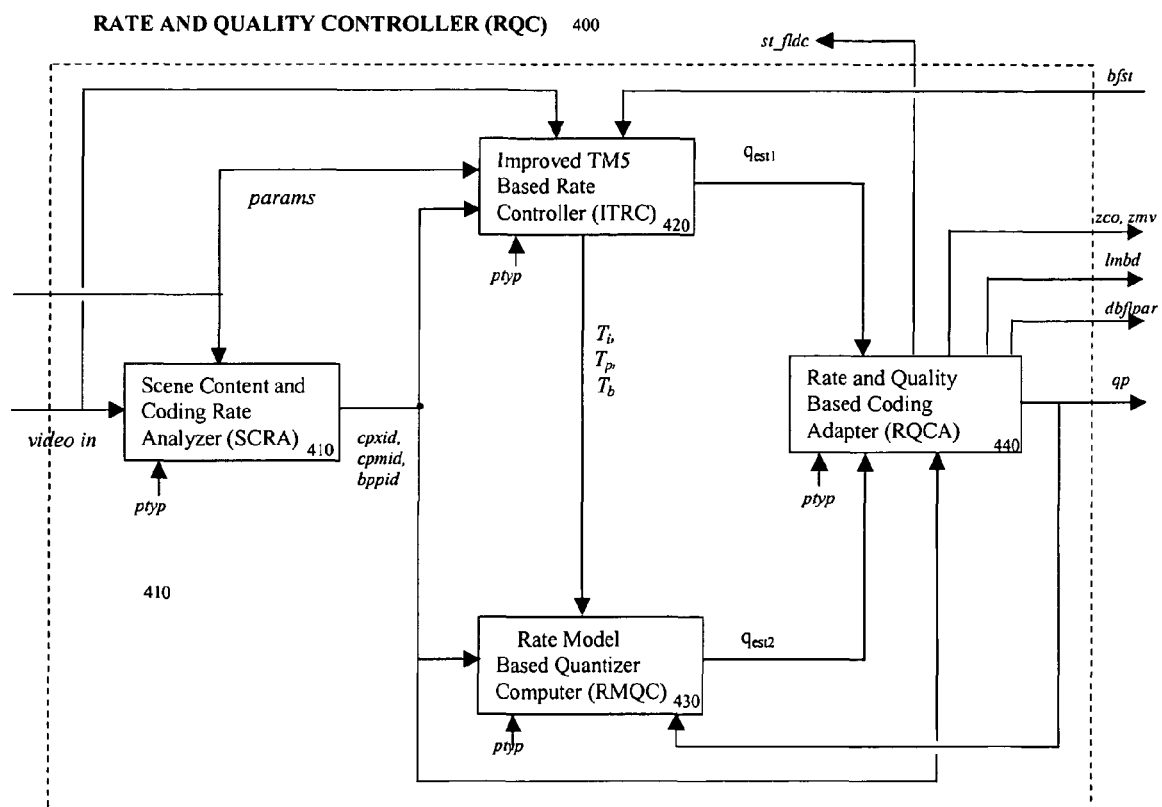
FIG. 4 is a block diagram of rate and quality controller according to an embodiment of the present invention.

FIG. 4 is a high level block diagram of a rate and quality controller (RQC) 400 according to an embodiment of the present invention. The RQC 400 may include a scene content and coding rate analyzer (SCRA) 410, an improved TM5-based Rate Controller (ITRC) 420, a Rate Model-based Quantizer Computer (RMQC) 420 and a Rate and Quality-base Coding Adapter (RQCA) 440. Each of these units receive as one input a picture type indicator (ptyp) signal to indicate a mode decision that had been made for an input frame of video data, for example whether the new frame is to be coded as an I-frame, a P-frame or a B-frame.

Video data of a new frame is input to the RQC 400 and, specifically, to the SCRA 410 and the ITRC 420. Additionally, parameter data (pdrams) is input to the SCRA 410 and the ITRC 420. The parameter data may include information such as the frame rate of the video sequence, the frame size and bitrate. Responsive to such input data, the SCRA 410 may analyze the content of a video frame and generate complexity indicator signals therefrom. The complexity indicator signal may provide an estimate of spatial complexity of the frame (cpxid), an estimate of motion complexity of the frame (cpmid) and an indicator of the bits per pixel in the frame (bppid). The complexity indicator signals (cpxid, cpmid, bppid) may be scaled according to complexity expectations for each type of frame coding (I-frame, P-frame or B-frame) that has been assigned to the input frame. The complexity indicator signals may be output to the remaining components of the RQC 400—the ITRC 420, the RMQC 430 and the RQCA 440.

As its name implies, the improved TM5-based Rate Controller (ITRC) 420 is based in part on the TM5 rate controller used in MPEG coding applications. In response to input video data, the ITRC 420 generates an estimated quantizer value ($q_{est1}$) to be applied to the frame. Whereas traditional TM5 rate controllers generate quantizer values on a macroblock-by-macroblock basis (multiple quantizer values per frame), it is sufficient for the ITRC 420 to generate a single quantizer value for the entire frame according to one embodiment of the present invention. The ITRC's 420 estimated quantizer value can be influenced by an indicator of fullness at a transmit buffer within the video coder (bfst), the complexity indicator signals (cpxid, cpmid, bppid) and by the type of coding assigned to the frame as identified by the ptyp signal. In another embodiment, the ITRC's 420 quantizer selection can be influenced by prior behavior of the RQC 400, e.g. whether the RQC historically has caused an encoder to code data at rate that is greater than or less than the target rate.

According to an embodiment, the ITRC 420 may generate an output representing a target coding rate T for the input frame ($T_I$ for I frames, $T_P$ for P frames and $T_B$ for B frames). The ITRC 420 may generate an output target rate signal $T_x$, where x is I, P or B as indicated by the ptyp signal. This $T_x$ output may be input to the RMQC 420.

The RMQC 430 also generates its own quantizer estimate ($q_{est2}$). This second estimate can be generated from data representing quantizers and bit rates of previously coded frames ($q_{prev}$, $S_{prev}$) and can be influenced by the complexity indicator signals (cpxid, cpmid, bppid) of the SCRA 410. Generally, the RMQC 430 generates a new quantizer estimate from a linear regression analysis of the old quantizer values and bit rate values. The RMQC 430 can operate in a context specific manner as determined by the ptyp signal. That is, linear regression may be performed in a similar manner for all I frames, similarly for all P frames (but in a manner that is different from the regression performed for I frames) and for all B frames.

Quantizer estimates from the ITRC 420 and the RMQC 430 are input to the RQCA 440, which resolves any differences between them. In so doing, the RMQC 430 generates a quantizer parameter $q_P$ that minimizes quality degradations in the coded signal output from the video coder. The RMQC 430 also may generate ancillary control signals (zco, zmv, st fldc, lmbd, dbflpar) as necessary to achieve further bit reductions than would be achieved by the quantizer parameter $q_P$ alone. Again, these ancillary control signals may be generated in a manner to maintain the highest possible quality in the output signal when decoded.

Figure 5:
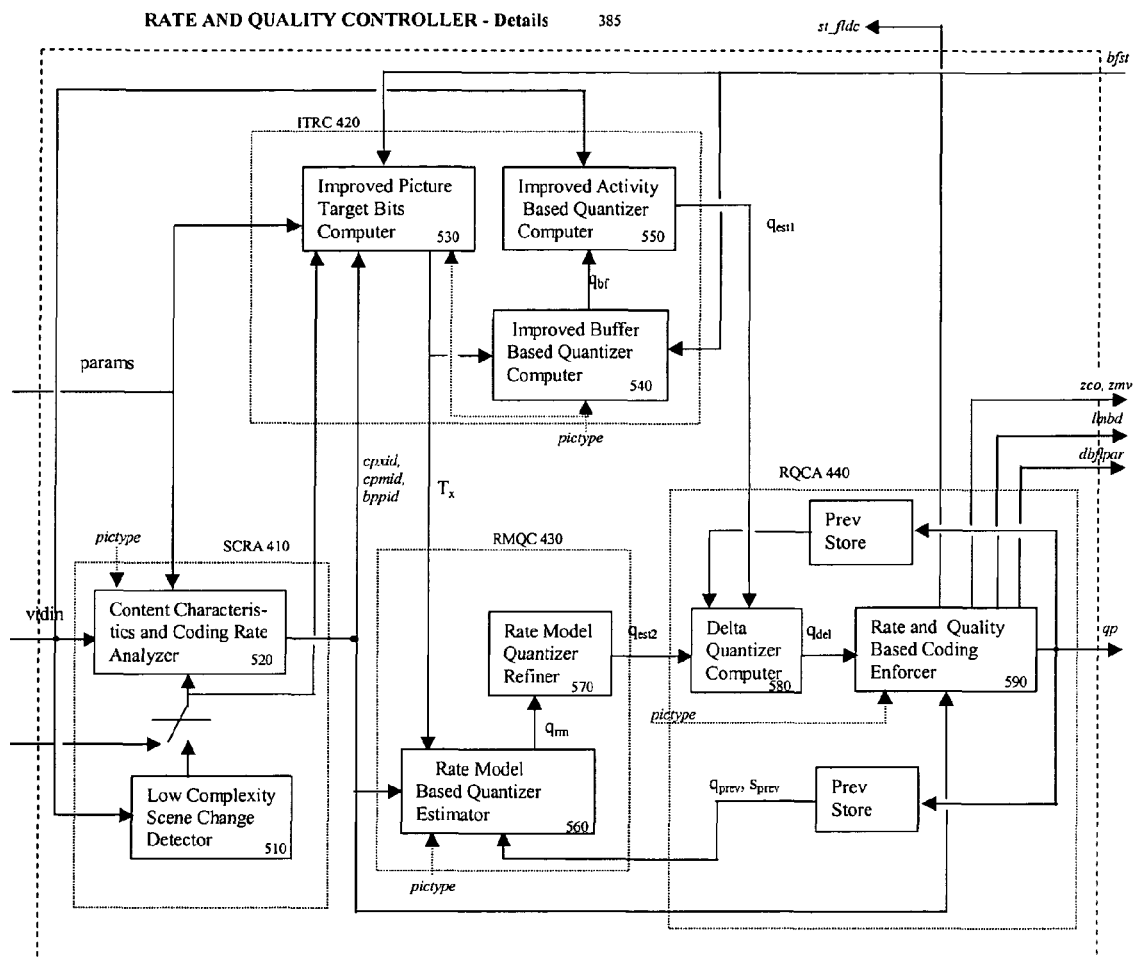
FIG. 5 is a detailed block diagram of rate and quality controller according to an embodiment of the present invention.

FIG. 5 illustrates an RQC 500 according to an embodiment of the present invention. The SCRA 410 is illustrated as including a scene change detector 510 and a contents characteristics analyzer 520. Responsive to a picture type signal ptyp and to coding parameter values params, the analyzer 520 may analyze input video data vidin and generate the complexity indicators (cpxid, cpmid, bppid). The scene change detector 510, as it name implies, identifies scene changes from the source video data. A control switch is illustrated as part of the SCRA 410 to emphasize that the SCRA 410 may be used in conjunction with other scene change detectors (not shown) that are external to the RQC.

The ITRC 420 is illustrated as including an Improved Picture Target Bits Computer 530, an improved buffer based quantizer computer 540 and an Improved Activity Based Quantizer Computer 550. The Improved Picture Target Bits Computer 530 generates target bitrate values $T_x$ (x=I, P or B) based on coding parameters param, the complexity indicators from the Contents Characteristics and Coding Rate Analyzer 520 and a fullness indicator from the video coder's transmit buffer (bfst). The target bitrate calculation may be made specific to the picture type assignments (ptyp). Target bitrate values $T_x$ may be output to the Improved Buffer Based Quantizer Computer 540 and to the RMQC 430.

The Improved Buffer Based Quantizer Computer 540 may generate a quantizer estimate $q_P$ based on the target bitrate $T_x$ calculated by the Improved Picture Target Bits Computer 530 and the buffer fullness indicator bfst. Operation of the Improved Buffer Based Quantizer Computer 540 may be controlled by the picture type assignment made for a current frame. A buffer based quantizer estimate $q_{bf}$ may be output to the Improved Activity Based Quantizer Computer 550.

The Improved Activity Based Quantizer Computer 550 generates a final quantizer estimate $q_{est1}$ from the ITRC 420. From source video data, the Improved Activity Based Quantizer Computer 550 calculates an activity level of a current frame which may be scaled according to activity levels of other like-kind frames previously observed (e.g., if the current frame is an I picture, activity may be normalized for all I frames but not P or B frames). It may generate a final quantizer estimate $q_{est1}$ from the quantizer estimate supplied by the Buffer Based Quantizer Computer 540 scaled according to the activity of the current frame.

The RMQC 430 is illustrated as including a Rate Model Based Quantizer Estimator 560 and a Rate Model Quantizer Refiner 570. The Rate Model Based Quantizer Estimator 560 may perform a linear regression analysis of previous quantizer selections ($q_{prev}$) and actual coding rates achieved thereby ($S_{prev}$) to assign a quantizer estimate for a current frame. According to an embodiment, the linear regression analysis of a frame assigned for coding according to a particular type (determined by ptyp) may be performed on historical quantizer values only of like-kind frames. The linear regression analysis also may be influenced by the complexity indicators from the SCRA 410. Additionally, during initialization, the linear regression analysis may be 'seeded' by target bitrate calculations $T_x$ from the ITRC 420. A rate model-based quantizer estimate $q_{rm}$ generated by the Rate Model Based Quantizer Estimator 560 may be output to the Rate Model Quantizer Refiner 570.

The Rate Model Quantizer Refiner 570 may generate a final quantizer estimate ($q_{est2}$) from the RMQC 430. It may test certain results generated from the linear regression analysis to determine if they are valid. If they are, the quantizer estimate may be output from the RMQC 430 untouched. If not, the quantizer estimate may be replaced by a quantizer estimate generated according to an alternate technique.

The RQCA 440 may reconcile differences between two competing quantizer estimates ($q_{est1}$, $q_{est2}$), one output from the ITRC 420 and the RMQC 430. The RQCA 440 is illustrated as including a delta quantizer computer 580, a Rate and Quality Based Enforcer 590 and storage. The delta quantizer computer 580 may determine a difference between the quantizer estimates output from the ITRC 420 and the RMQC 430 ($q_{del}$). Certain difference values may be clipped to predetermined maximum or minimum values. The quantizer difference obtained thereby may be input to the Rate and Quality Based Enforcer 590, which assigns a final quantizer selection ($q_P$). In an embodiment the Rate and Quality Based Enforcer 590 may also control other rate-influencing parameters such as mode assignments, coefficient and/or motion vector decimation, and frame decimation among others to provide a comprehensive coding control system.

Figure 6A:
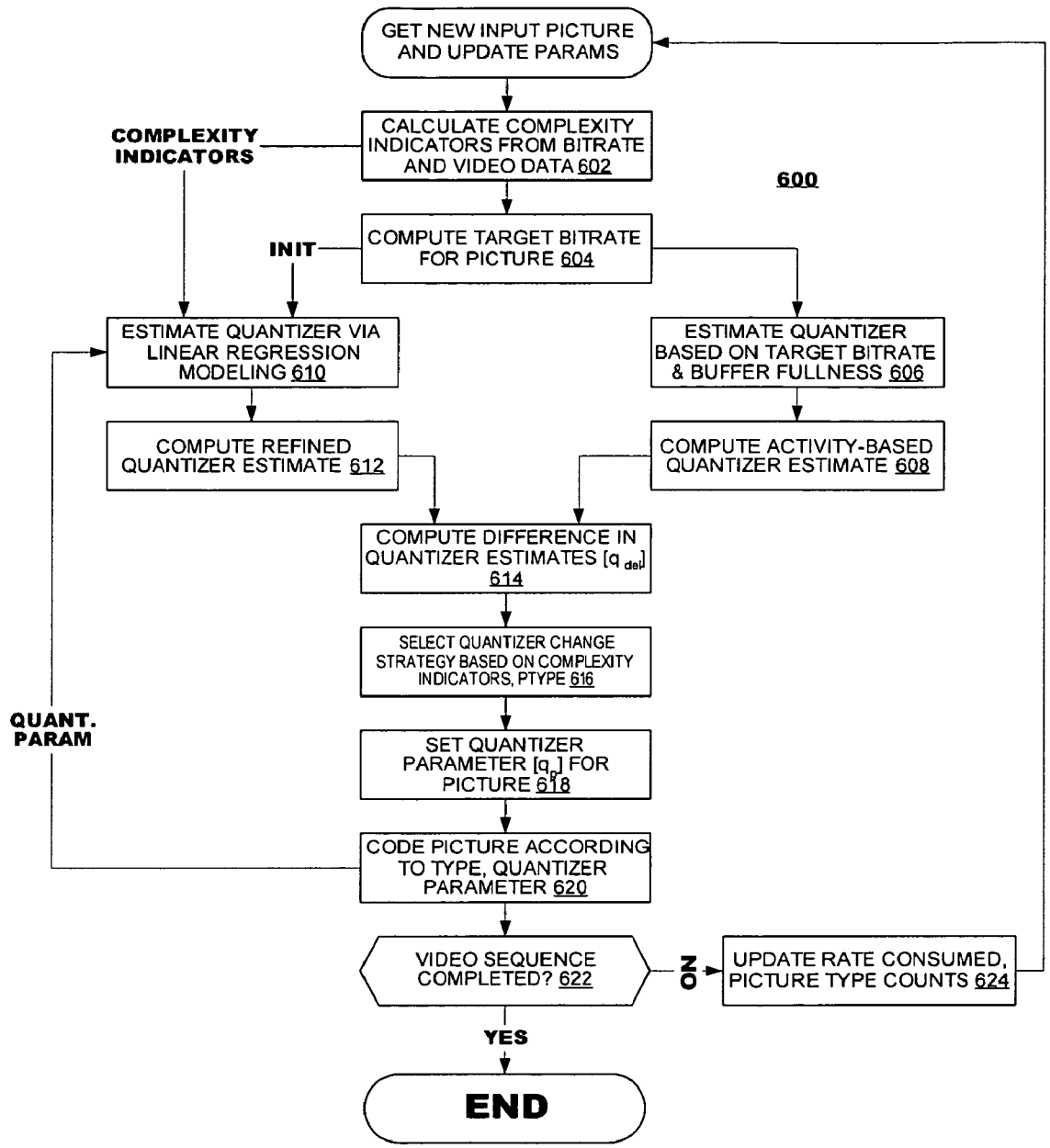
FIG. 6A-6B illustrate rate control methods according to embodiments of the present invention.

FIG. 6A illustrates a rate control method according to an embodiment of the present invention. Responsive to an input frame of video data, the method 600 may analyze the video data and its bitrate to calculate video analysis parameters such as the complexity parameters (box 602). Based on the complexity indicators, the method 600 may compute a target bitrate to be used for the new input picture (box 604). Responsive to the target bitrate and based on fullness of a transmit buffer, the method may estimate a quantization parameter to be used for the picture (box 606). The method may refine the quantizer estimate based on the complexity indicators obtained from the picture analysis (box 608). This first branch generates a first quantizer estimate for the new input picture.

In parallel, the method may estimate a quantizer for the picture by linear regression modeling (box 610). The quantizer estimate may be refined further to account for spurious values obtained from the linear regression analysis, typically by substituting another quantizer estimate for the estimate obtained by linear regression (box 612). This second branch generates a second quantizer estimate for the new input picture.

Thereafter, the method 600 may determine a quantizer difference $q_{del}$ from the two quantizer estimates (box 614). Based on this quantizer difference $q_{del}$ and based further on complexity indicators calculated from the picture's video data, the method may set a quantizer change strategy (box 616). The method 600 thereafter may set the quantizer parameter to be used for the picture and may code the picture data itself (boxes 618, 620). The selected quantizer parameter, of course, may be used for linear regression modeling of subsequent pictures. Once the picture is coded, unless the current picture is the last picture of a video sequence (box 622), the method may advance to a next picture. In so doing, the method may update all values of picture counts and consumed bitrates (box 624).

Figure 6B:
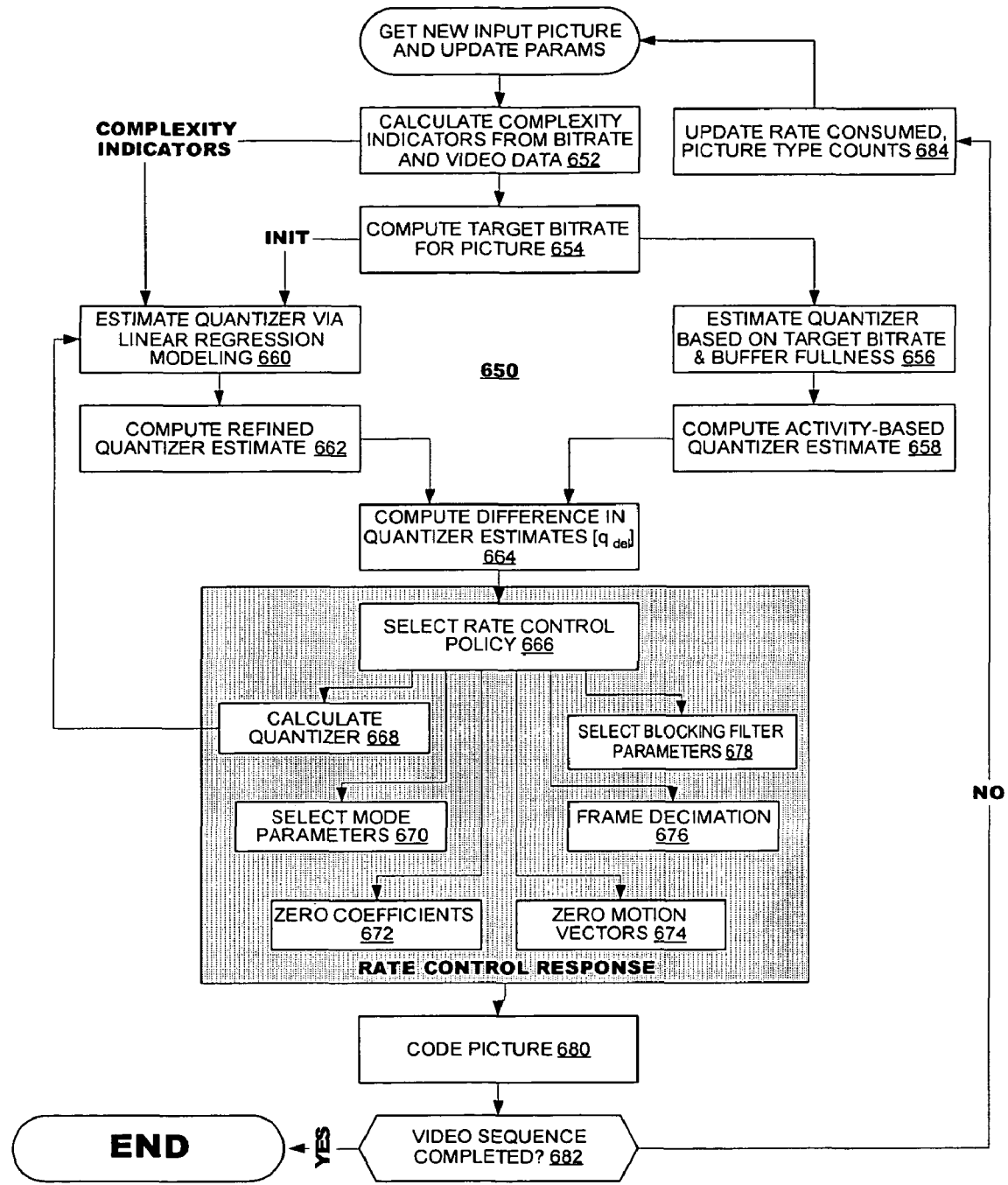

FIG. 6B is a flow diagram of a method 650 according to another embodiment of the present invention. Responsive to an input frame of video data, the method 650 may analyze the video data and its bitrate to calculate video analysis parameters such as the complexity parameters (box 652). Based on the complexity indicators, the method 650 may compute a target bitrate to be used for the new input picture (box 654). Responsive to the target bitrate and based on fullness of a transmit buffer, the method may estimate a quantization parameter to be used for the picture (box 656). The method may refine the quantizer estimate based on the complexity indicators obtained from the picture analysis (box 658). This first branch generates a first quantizer estimate for the new input picture.

In parallel, the method may estimate a quantizer for the picture by linear regression modeling (box 660). The quantizer estimate may be refined further to account for spurious values obtained from the linear regression analysis, typically by substituting another quantizer estimate for the estimate obtained by linear regression (box 662). This second branch generates a second quantizer estimate for the new input picture.

Thereafter, the method 650 may determine a quantizer difference $q_{del}$ from the two quantizer estimates (box 664). Based on the quantizer difference $q_{del}$ and based further on complexity indicators generated for the current frame, the method may select a rate control policy for the picture (box 666). Pursuant to the rate control policy, the method 600 may set a quantizer parameter for the current picture (box 668) but it also may engage one or more coding controls, which can include setting a mode decision for coding of macroblocks (box 670), zeroing one or more DCT coefficients for blocks (box 672), zeroing one or more motion vectors for blocks or macroblocks (box 674), decimating select frames from source video (box 676) or setting block filtering performance (box 678). Thereafter, the method 600 may code the picture according to its assigned type and using the selected quantizer parameter (box 680). Once the picture is coded, unless the current picture is the last picture of a video sequence (box 682), the method may advance to a next picture. In so doing, the method may update all values of picture counts and consumed bitrates (box 684).

Figure 7:
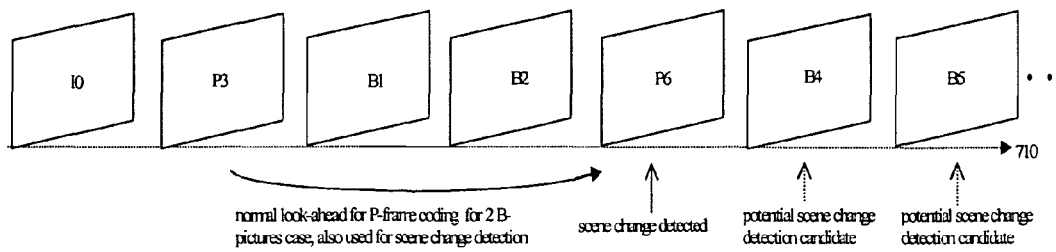
FIG. 7 illustrates an exemplary progression of video frames in coding order.

FIG. 7 illustrates a coding order that may be applied to frames according to an embodiment of the present invention. In FIG. 7, numeric designations indicate a temporal order among frames when the frames are input to the video coder and during display (the display order). As is known, however, input frames typically are not coded in order. For example, bidirectionally coded frames (B frames) are coded with reference to a pair of reference frames, one ahead of the B frame in display order and one behind the B frame in display order. Thus, using the I B B P B B P coding pattern described above, a coder may code frame 0 as an I frame, then code frame 3 as a P frame. Thereafter, the coder may code frames 1 and 2 as B frames. Following the coding of frame 2, the coder may skip ahead to frame 6 coding it as a P frame before coding frames 4 and 5. Frames 4 and 5 may be coded as B frames using frames 3 and 6, both of them are P frames, as reference frames. Thus, while the input order of the frames is 0 1 2 3 4 5 6, FIG. 7 illustrates that the coding order may be 0 3 1 2 6 4 5. In implementation, the coding order may vary from the example of FIG. 7 as dictated by the frame assignments and coding patterns that govern. In some implementations, the frame assignments and coding patterns may be dynamically assigned.

Embodiments of the present invention employ a scene change detector that operates with a small amount of look ahead in the coded bitstream. In one implementation, a scene change analysis may be limited to P frames in the video signal (e.g., frames 3 and 6 in the example of FIG. 7). Hypothetically, if the scene change analysis indicated that a scene change occurred between frames 3 and 6, then it would be possible that the scene change occurred in frame 4, 5 or 6. In an embodiment of the invention, when a scene change is identified between a pair of P frames, an RQC 385 may cause B frames that occur between the two P frames to be coded at lower bitrates than other frames in the video sequence even if it would cause correspondingly lower image quality to be obtained. Ordinary viewers typically require about $\frac{1}{6}^{th}$ of a second to adjust to an abrupt change in video content. Therefore, this rate control policy permits the video coder to achieve a lower coding rate without significant observable quality consequences.

Figure 8A:
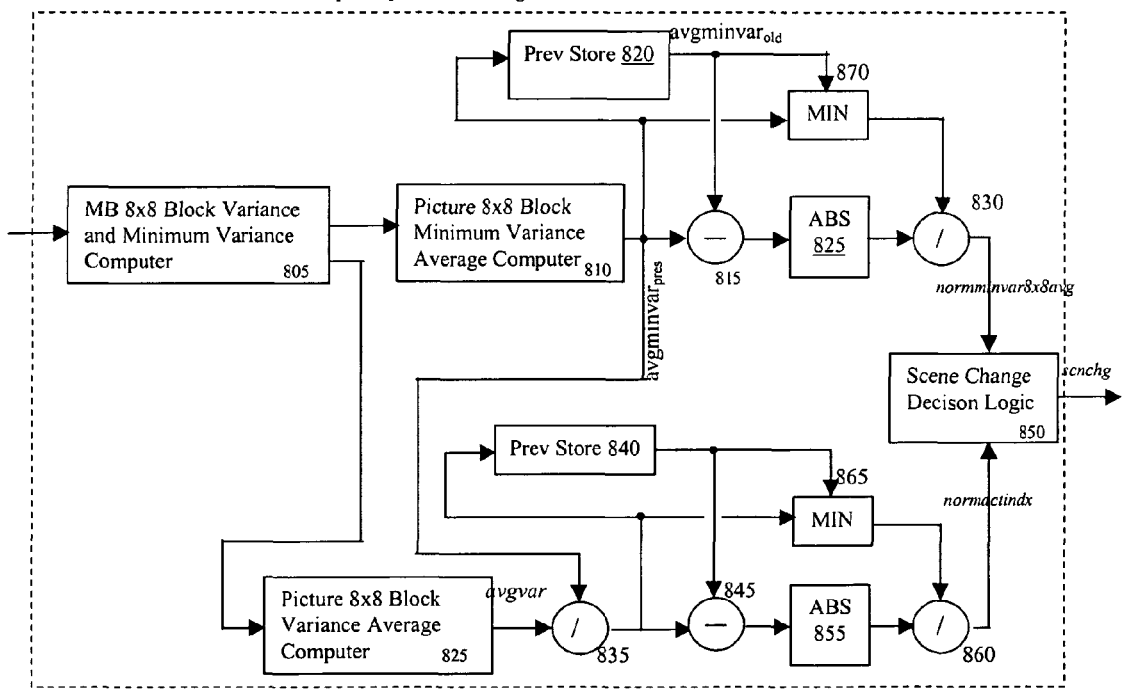
FIG. 8A-8B are block diagrams of a low complexity/delay scene change detector according to an embodiment of the present invention.

FIG. 8A is a block diagram of a scene change detector 800 according to an embodiment of the present invention. Input video data may be input to a macroblock 8×8 block variance and minimum variance computer 805. For each 16×16 pixel macroblock, computer 805 determines a variance among the four 8×8 blocks contained therein. The computer 805 also identifies a minimum variance among the four 8×8 blocks. The minimum variance values, one for each macroblock in the picture, are output to a picture minimum variance averager 810 that generates a signal (avgminvar$_{pres}$) representing an average value of the minimum variances. This average value signal avgminvar$_{pres}$ can be stored in a buffer memory 820 for use in a later iteration of the detector 800.

At a subtractor 815, the avgminvar$_{pres}$ signal is compared to a corresponding value of a previous processed frame (avgminvar$_{old}$). The absolute value of this comparison (box 825) is input to a first input of a divider 830. A second input of the divider 830 may be obtained from a second comparison between the avgminvar$_{pres}$ and avgminvar$_{old}$ values to determine which is the smallest value (minimum detector 870). The divider 830 may generate an output representing the normalized average minimum variance among blocks (norm-minvar8×8avg).

The MB variance signal obtained from computer 805 may be input to a Picture 8×8 Block Variance Averager 825. This unit generates an output signal (avgvar) representing an average of variances across a current frame. A divider 835 generates a signal representing a ratio between the avgvar signal and the avgminvar$_{pres}$ signal from computer 810. This ratio signal is output to a buffer 840 for later use. A comparator (subtractor 845 and absolute value generator 855) may determine the magnitude of the difference between the ratio signal of a present frame and a past frame. This difference signal is output to the first input of another divider 860. A minimum detector 865 generates, from the ratio signals of the present and past frames, a signal representing the minimum of these two values, which is input to divider 860. The output of the divider 860 (normactindx) represents a normalized level of activity in the current frame with respect to the prior processed frame. An output of the divider 860 is output to the scene change decision logic 850. The scene change decision logic 850 generates an output signal (scnchg) indicating whether a scene change has been detected or not.

Figure 8B:
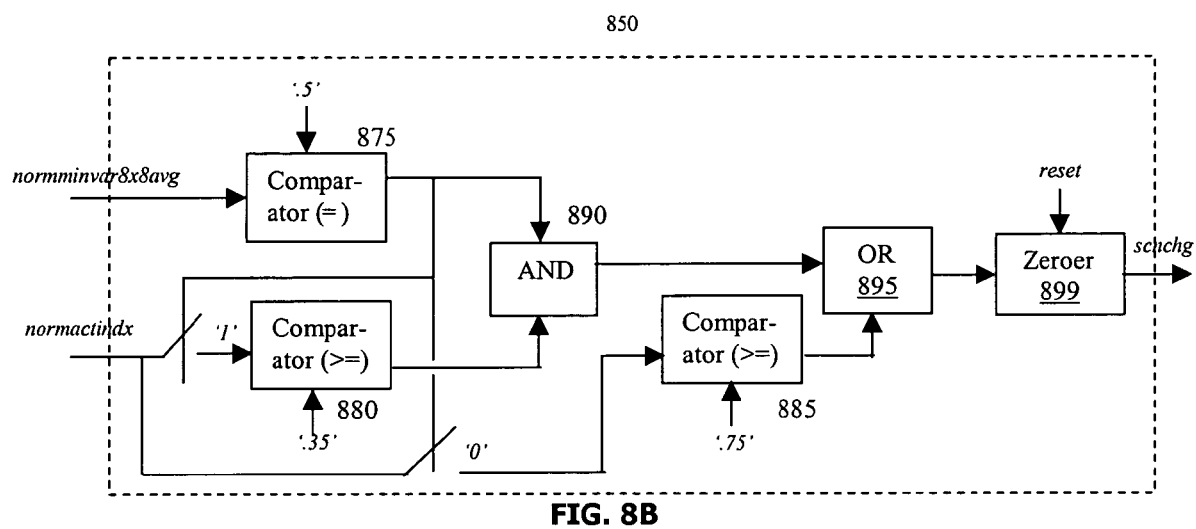

FIG. 8B is a block diagram of scene change decision logic 850 according to an embodiment of the present invention. The scene change decision logic 850 may include three threshold comparators 875, 880 and 885. The first comparator 875 compares the norminvar8×8avg signal to a predetermined threshold (e.g., 0.5) and generates a binary signal representing whether the norminvar8×8avg signal exceeds the threshold. The second and third comparators respectively compare the normactindx signal to low and high thresholds (e.g., 0.35, 0.75). Only one of the two comparators 880, 885 will be active at a time, based upon the output of comparator 875. Thus, when the norminvar8×8avg signal exceeds the threshold of comparator 875, comparator 880 is active. Otherwise, comparator 885 is active.

The outputs of comparator 875 and comparator 880 are input to an AND gate 890. The outputs of AND gate 890 and 885 are input to an OR gate 895. An output of the OR gate is input to a zeroer 899, which generates the scnchg signal. A reset input to the zeroer may cause the zeroer 899 to mask an output from the OR gate 895 that otherwise could indicate a scene change.

Figure 9:
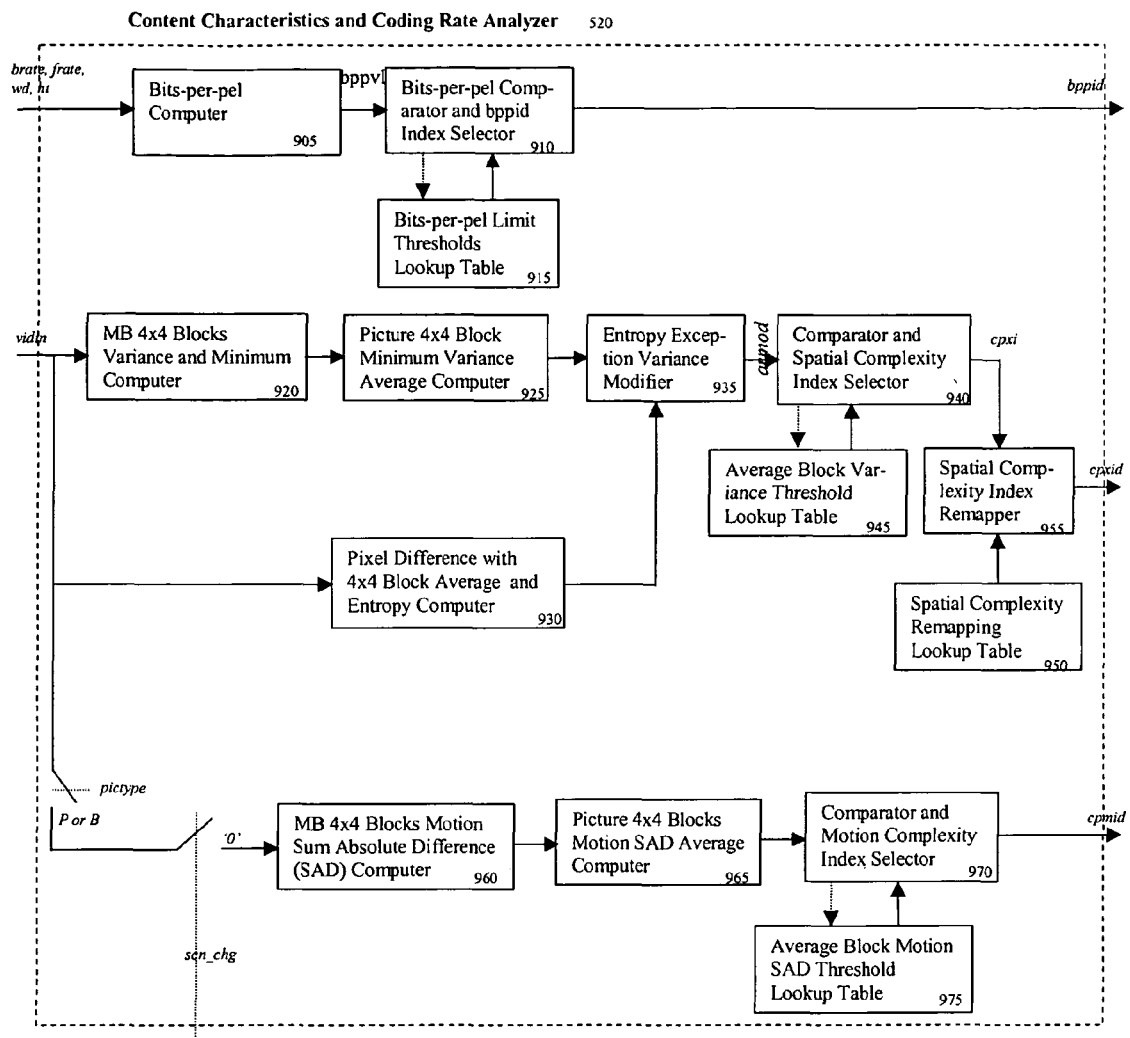
FIG. 9 is a block diagram of content characteristics and coding rate analyzer according to an embodiment of the present invention.

FIG. 9 is a block diagram of a Content Characteristics and Coding Rate Analyzer 900 according to an embodiment of the present invention. The analyzer 900 may receive inputs for a source video signal (vidin) and parameters data representing a bitrate (brate) of the video signal, its frame rate (frate), and the width and height (wd, ht) of the picture in pixels. Additionally, the analyzer 900 may receive a scnchg signal indicating whether a current frame is the first frame of a new scene and a ptyp signal identifying a type of coding to be applied to the frame (e.g., whether it is an I-frame, P-frame or B-frame).

A bit-per-pixel computer 905 may generate a signal bppvl representing the number of bits allocated per pixel in the source video stream. The bppvl signal may be input to a Bits-per-pixel Comparator and BPPID Index Selector 910, which generates an index signal bppid representing the number of bits allocated per pixel in the input data stream. The Bits-per-pixel Comparator and BPPID Index Selector 910 may operate cooperatively with a Bits-per-pixel Limits Thresholds Lookup Table 915 to generate the bppid signal. Exemplary values for table 915 are illustrated in FIG. 12A.

A Macroblock 4×4 Blocks Variance and Minimum Computer 920 may calculate variances in image data across a plurality of blocks in the source video data. It may output the variances to a Picture 4×4 Block Minimum Variance Average Computer 925 which determines the minimum variance among the blocks of a frame. In parallel, analyzer 900 may determine pixel differences in the source video data and determine differences in entropy from one frame to the next (box 930). Based on observed differences in entropy, the variances output by averager 925 may be increased. Variance values output from box 935 may be input to a spatial complexity index selector.

Figures 12B, 12C, 12D, 13, 945, 955, 975:
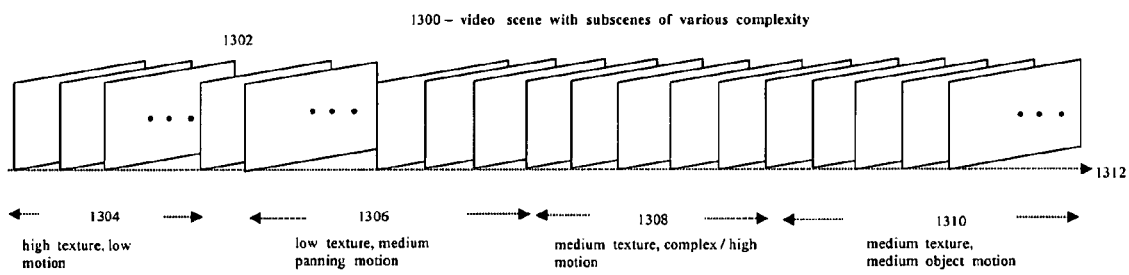
FIG. 12B illustrates exemplary 4×4 block variance threshold (var4×4thresh) example values for use in a look up table of a content characteristics and coding rate analyzer according to an embodiment of the present invention.
FIG. 12C illustrates exemplary spatial complexity limit (cpxlmt) example values for use in a look up table of a content characteristics and coding rate analyzer according to an embodiment of the present invention.
FIG. 12D illustrates exemplary motion complexity limit (cpmlmt) example values for use in a look up table of a content characteristics and coding rate analyzer according to an embodiment of the present invention.
FIG. 13 is a diagram showing subset frames of a video scene representing sub-scenes of different complexities.

Responsive to the entropy-modified variance signal varmod, the analyzer 900 may select an initial spatial complexity index cpxid (box 940). In so doing, the index selector 940 may compare the modified variance signal to a value read from an average block variance threshold look up table 945. Exemplary values of one such lookup table are shown in FIG. 12B. The initial spatial complexity index signal cpxid may be output to a spatial complexity index remapper 955, which generates the spatial complexity id signal cpxid, again with reference to a lookup table, called a spatial complexity remapping lookup table 950. Exemplary values for the remapping lookup table are shown in FIG. 12C.

The analyzer 900 also may include a coding branch devoted to coding motion complexity in a frame. This coding branch is active when coding frames as either P-frames or B-frames. The analyzer 900 may include a macroblock 4×4 difference computer 960 to identify prediction errors that may occur between blocks of a current frame and "source blocks," blocks from a reference frame that can be used as a basis to predict image content of the blocks in the current frame. While temporal redundancy often causes blocks in reference frames to closely approximate co-located blocks in a current frame, the source blocks rarely match perfectly. Residuals represent differences among the blocks. The computer 960 sums up the magnitudes of these residuals.

A picture 4×4 Blocks motion SAD average computer 965 may determine the average magnitude of these residual values across each 4×4 block in the current frame. Responsive to these average values, a motion complexity index selector 970 generates a complexity indicator for motion cpmid. In doing so, the index selector may refer to an average block motion SAD threshold lookup table 975. One exemplary table is shown in FIG. 12D.

Accordingly, a frame analyzer 900 generates signals representing the complexity of video content in various frames of a video sequence. The complexity indicators can identify spatial complexity in the image cpxid or motion complexity in the image cpmid. The analyzer 900 also generates an indicator of the bits used per pixel in the source video data. All of this information comes from an analysis of the content of the video data itself.

Figure 10A:
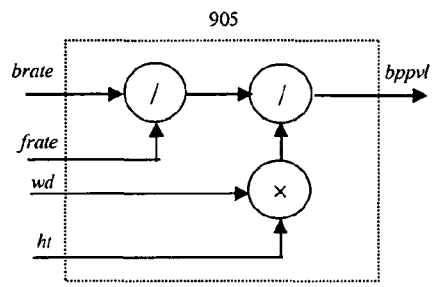
FIG. 10A-10D show block diagrams of bits-per-pixel computer, picture 4×4 block minimum variance average computer, picture 4×4 block motion SAD average computer, and, comparator and index selector according to an embodiment of the present invention.

FIG. 10A is a simplified block diagram of a bits-per-pixel computer (BBPC) 905 according to an embodiment of the present invention. The BBPC 905 divides the bitrate (e.g. bits per second) of the source video signal by its frame rate (e.g., frames per second) to determine a bit rate per frame. The BBPC 905 also may determine the pixel area of a frame by multiplying its width and height. By dividing the bit rate per frame by the frame's pixel area, the BPPC 905 may determine the number of bits per frame bppvl.

Figure 10B:
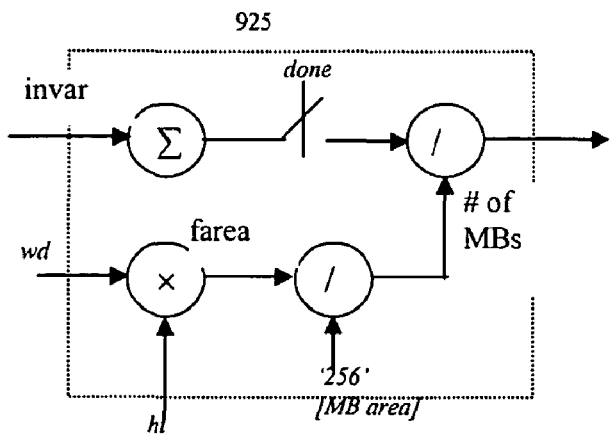

FIG. 10B is a block diagram of a Minimum Variance Averaging Computer (MVAC) 925 according to an embodiment of the present invention. The MVAC 925 may sum up the variances of all blocks output by the A Macroblock 4×4 Blocks Variance and Minimum Computer 920. The MVAC 925 may determine the number of blocks present in the frame by first determining the area of a frame in pixels (farea), obtained from a multiplication of the frame's height and width, and dividing by a value representing the area of a single macroblock (e.g., 256 for an 16×16 macroblock). By dividing the summed variances by the number of macroblocks in the frame, the MVAC 925 determines the average minimum variance values across the frame.

Figure 10C:
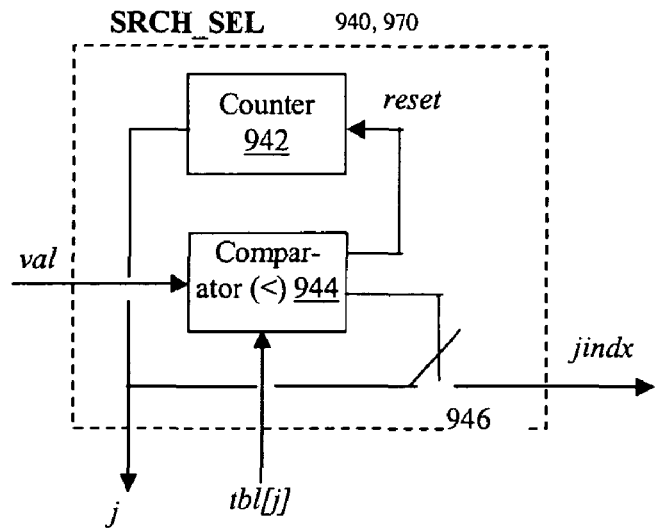

FIG. 10C is a block diagram of a generalized complexity index search selector according to an embodiment of the present invention. The complexity index search selector may find application as the spatial complexity index selector 940 or the motion complexity index selector 970 of FIG. 9. The index selector may include a counter 942 that maintains a count value j that increments according to some periodic interval. A comparator 944 compares an input value val against a value read from the corresponding lookup table tbl[j] using the count value j as an index. The comparator 944 may generate a binary output that is applied to a switch 946. If the va/value is less than the value tbl[j], the output is low and the count is permitted to increment. Eventually, the value read from the table will exceed the input value val. When this occurs, the comparator's output changes, which causes the switch 946 to close and output the then current value j as the index selector's output $j_{indx}$. The comparator's output also resets the counter 942 for another operation.

Figure 10D:
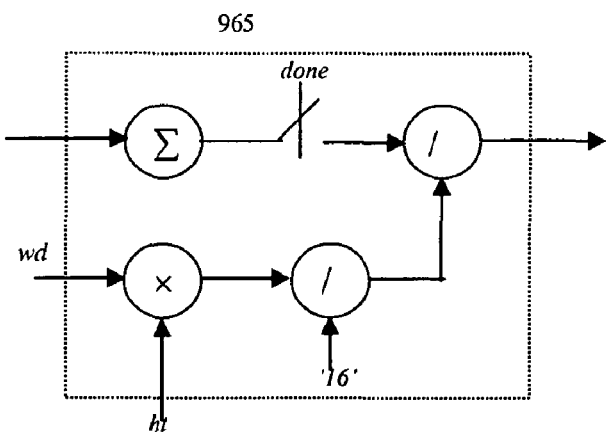

FIG. 10D illustrates a Picture 4×4 Block Motion SAD Average Computer (PBMSAC) 965 according to an embodiment of the present invention. In this embodiment, the PBMSAC 965 sums the motion variances input to it to generate an aggregate SAD value. The PBMSAC 965 also uses the picture's frame area from the height and width inputs (ht, wd) and divides by the area of a picture block to obtain the number of 4×4 blocks used. Dividing the variance sum by the number of 4×4 blocks, the PBMSAC 965 determines the average block motion value.

FIG. 11A illustrates a Pixel Entropy Difference Calculator (PEDC) 930 according to an embodiment of the present invention. Responsive to a frame input video data vidin, computer 930 calculates average pixel values for each 4×4 block therein (box 930.1). A subtractor 930.2 determines a difference between the actual pixel values in a 4×4 block and the average value for the block as a whole. The PEDC 930 develops a histogram of these pixel differences representing the number of times each difference value appears in the frame (box 930.3). From there, the PEDC 930 further develops a probability distribution that each difference value will appear in the frame (box 930.4). The PEDC 930 then calculates a partial entropy value E(i) for the frame according to:

$$E(i) = -p(i) * \frac{\log(p(i))}{\log 2} \qquad (1.)$$

(box 930.5). The entropy value E for a present frame can be calculated as a sum of partial entropy values E(i), for all i (boxes 930.6, 930.7).

FIG. 11B illustrates Macroblock 4×4 Blocks Motion SAD Computer 960 according to an embodiment of the present invention. There, the computer 960 includes a 8×8 Pixel Block Motion Estimator/Compensator Unit 962 that identifies blocks of data from a reference frame that can be used as a basis for prediction of blocks in a current frame. Unit 962 outputs data of the source block to a subtractor 963, which generates a residual signal representing a difference between the pixel data of the blocks in the current frame and the source blocks from which they may be predicted. A Macroblock 4×4 Block Motion Sum of Absolute Differences computer 964 may sum across the magnitudes of these values to generate an aggregate residual as an output.

FIG. 11C illustrates an Entropy Exception Variance Modifier (EEVM) 935 according to an embodiment of the present invention. There, the EEVM 935 may include a minimum variance average comparator 936 that compares a minvar4×4avg value obtained from the Picture 4×4 Block Minimum Variance Average Computer 925 to a predetermined limit represented by MINVAR4×4LMT The comparator's 936 output is a binary signal, which is input to an AND gate 937.

The EEVM 935 also may include a pixel difference entropy comparator 938 which compares an entropy differential signal entd to an entropy differential limit represented by ENTDLMT. The comparator's output 938 may be a binary signal, which also is input to the AND gate 937.

The EEVM 935 further may include an adder 939 having inputs for the minvar4×4avg signal and for a second input. On the second input, the adder 939 may receive a variance offset signal (MINVAR4×4Off) depending on the output of the AND gate 937. If the minvar4×4avg value is less than the MINVAR4×4LMT limit and if the entd value is greater than the ENTDLMT limit, the MINVAR4×4OFF will presented to the adder. Otherwise, it is not. Thus, the EEVM 935 generates an output representing minvar4×4avg+minvar4×4avg or MINVAR4×4OFF.

FIG. 13 illustrates an exemplary progression of frames in a video sequence having varying levels of complexity. In a first temporal region 1304, the video sequence may include pictures having relatively high levels of texture but low levels of motion between frames. Frames in this region, therefore, may be assigned relatively high cpxid assignments but relatively low cpmid assignments. In region 1306, frames may possess relatively low texture but a medium level of motion due to, for example, a camera pan. Complexity indicators cpxid and cpmid may be revised to low and medium levels respectively. In region 1308, frames may possess medium levels of texture and high levels of motion. Complexity indicators cpxid and cpmid may be revised accordingly, to medium and low levels respectively. In the fourth temporal region 1310, the frames may possess medium texture and exhibit medium levels of motion. Complexity indicators also would be set to medium levels.

Embodiments of the present invention may tune target bit rate calculations to dynamically changing video content to provide enhanced quality. In one embodiment, for each P frame in the video sequence, complexity indicators of the picture may change allocation of bits between P and B frames in a group of pictures. For example, in a period of relatively low motion, it may be preferable to shift bit allocations toward P frames within a GOP and away from B frames. Alternatively, periods of high motion may warrant a shift of bit allocations toward B frames and away from P frames. The complexity indicators can achieve shifts of these kinds.

Figures 14, 15A, 15B:
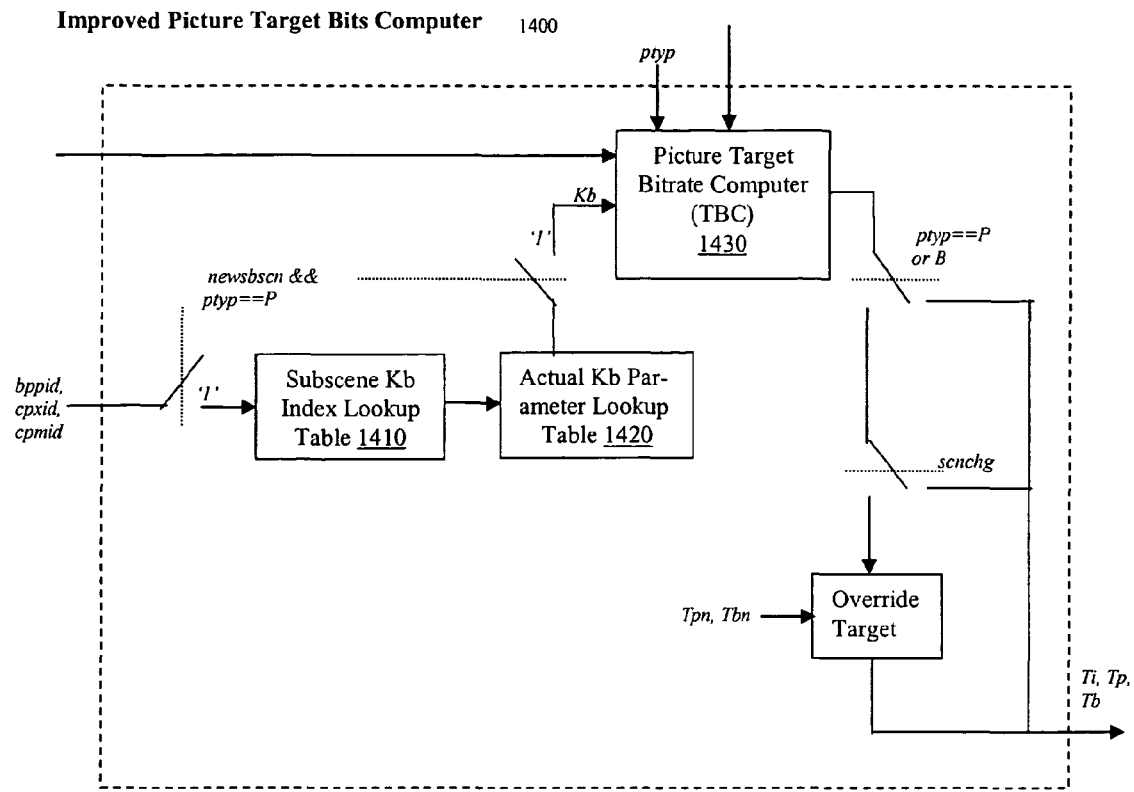
FIG. 14 is a block diagram of an improved target bitrate computer according to an embodiment of the present invention.
FIG. 15A-15B are diagrams showing exemplary $K_B$ values and KB index values according to an embodiment of the present invention.

FIG. 14 is a block diagram of an improved picture target bits (IPTB) computer 1400 according to an embodiment of the present invention. The IPTB computer 1400 may include a picture target bitrate computer (TBC) 1430 that receives the source video vidin, an identifier of the frame's assigned type ptyp and parameter data params. The TBC 1430 also receives a signal $K_B$ representing a ratio of quantizers typically used between I- and B-frames. Responsive to these values, the TBC 1430 may generate an output $T_x$ (x=I, P or B) representing the target bitrate of the frame. Although three outputs are shown in FIG. 14, the TBC 1430 generates only one of these target indicators per frame (e.g., $T_I$ when the frame is an I-frame, $T_P$ when the frame is a P-frame or $T_B$ when the frame is a B-frame).

The $K_B$ value may be generated from the complexity indicators bppid, cpxid and/or cpmid. In an embodiment, these complexity indicators can be used as an index into a Subscene Index Lookup Table 1410 on each occurrence of a P frame. Responsive to the complexity indicators, the $K_B$ Index Lookup Table 1410 may output an index value which can be applied to a second table, called the $K_B$ Parameter Lookup Table 1420. The second table outputs the $K_B$ value to the TBC 1430. In an embodiment, the $K_B$ Parameter Lookup Table 1420 can take a structure and employ exemplary values as shown in FIG. 15A. This embodiment also may find application with $K_B$ Index Lookup Tables 1410 having the structure and values as shown in FIG. 15B.

The foregoing dual table structure provides a convenient mechanism from which to map various combinations of complexity indicators to $K_B$ values. For example, the values illustrated in FIG. 15A are stored in generally ascending order. Having decided upon and stored an array of KB for use in a video coding application, it is administratively convenient to design a second table to map various combinations of complexity indicators to the table entries storing the $K_B$ values. Of course, if desired, a single table structure may be employed to retrieve $K_B$ values directly from the complexity indicators.

In the embodiment illustrated in FIG. 14, a new $K_B$ value is retrieved from the lookup tables 1410, 1420 each time a new sub-scene is detected and the ptyp signal indicates that the input frame is a P picture. The $K_B$ value remains valid until another sub-scene and P frame occurs. Alternatively, the $K_B$ value could be updated on each P frame or on each new group of pictures.

Returning to FIG. 14, for I-frames, the corresponding target value $T_I$ can be output from the IPTB computer 1400 directly. According to an embodiment, target values for P-frames and B-frames ($T_{P1}$, $T_B$) may be modified in certain circumstances. When a scene change is detected, target values from the TBC may be overridden in favor of predetermined normalized target values, represented as $T_{pn}$ and $T_{bn}$ respectively.

According to an embodiment, target values $T_I$, $T_P$ and $T_B$ may be calculated as follows:

$$T_i = \max\left\{\frac{R}{\left(1 + \frac{N_P X_P}{X_I K_P} + \frac{N_B X_B}{X_I K_B}\right)}, \frac{\text{bitrate}}{8 * \text{picturerate}}\right\} \quad (2.)$$

$$T_P = \max\left\{\frac{R}{\left(N_P + \frac{N_B K_P X_B}{K_B X_P}\right)}, \frac{\text{bitrate}}{8 * \text{picturerate}}\right\} \quad (3.)$$

$$T_B = \max\left\{\frac{R}{\left(N_B + \frac{N_P K_B X_P}{K_P X_B}\right)}, \frac{\text{bitrate}}{8 * \text{picturerate}}\right\} \quad (4.)$$

where R represents bits available in a group of pictures to which the frame belongs, $N_I$, $N_P$ and $N_B$ represent the number of frames of each type in a group of pictures, $X_I$, $X_P$ and $X_B$ are relative complexity estimates for the I-, P- or B-frames in the group of pictures and $K_P$ and $K_B$ represent a general ratio of quantizers between I and P frames ($K_P$) and between I and B frames ($K_B$). For ease of calculation, $K_P$ can be set to 1 and $K_B$ scaled accordingly. $K_B$ may be established as shown in FIG. 14. By examination of eqs. 3 and 4, however, it can be seen that as $K_B$ increases, it causes an increase in the $T_P$ value calculated from eq. 3 and also causes a decrease in the $T_B$ value obtained from eq. 4. A decrease in the $K_B$ value may cause a decrease in $T_P$ and an increase in $T_B$.

Figure 16:
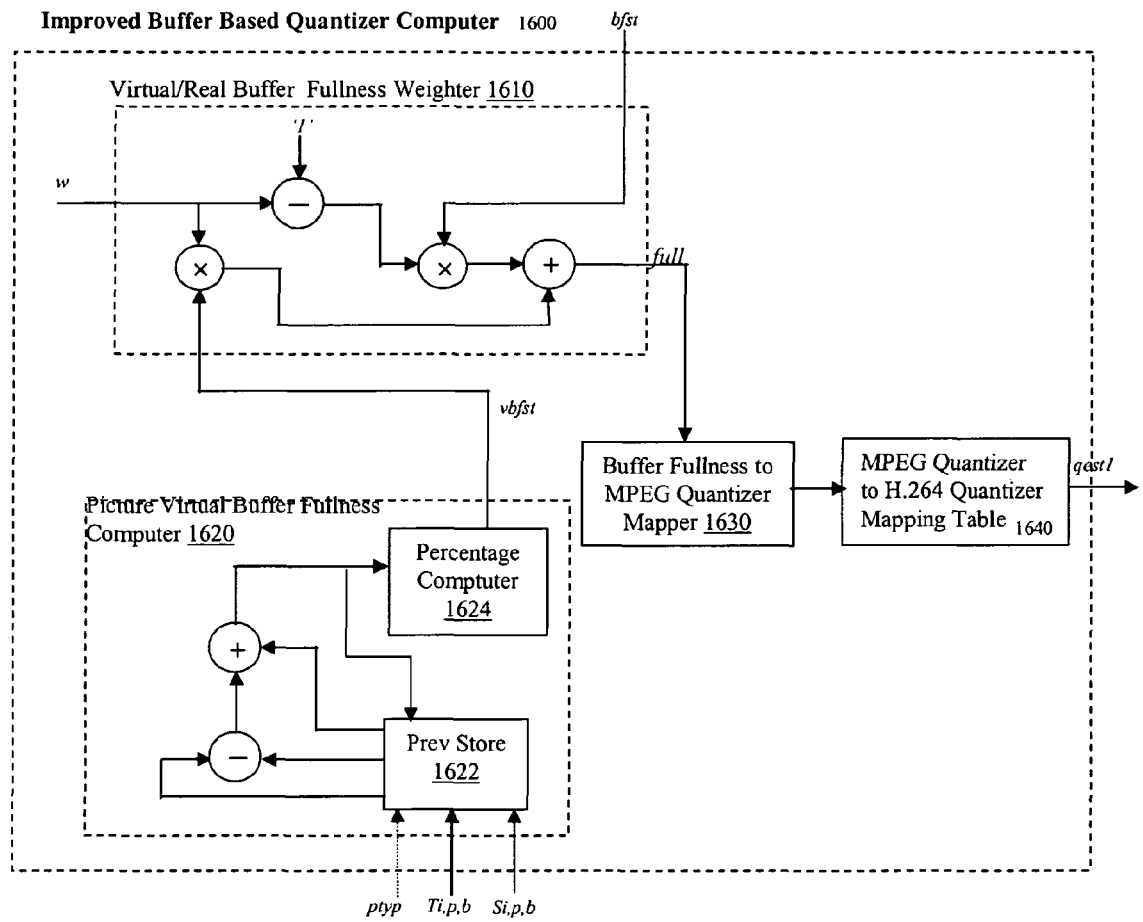
FIG. 16 is a block diagram of an improved buffer based quantizer computer according to an embodiment of the present invention.

FIG. 16 is a block diagram of an improved buffer-based quantizer (IBQ) computer 1600 according to an embodiment of the present invention. The IBQ computer 1600 may include a virtual/real buffer fullness weighter 1610 and a picture virtual buffer fullness comparator 1620. The virtual buffer fullness comparator 1620 generates a virtual buffer fullness indicator vbfst from the target rate identifiers ($T_I$, $T_P$, $T_B$) and actual bit rate identifiers ($S_I$, $S_P$, $S_B$) of past frames. The virtual/real buffer fullness weighter 1610 may generate a buffer fullness indicator full from a comparison between an actual buffer fullness indicator bfst and the virtual buffer fullness indicator vbfst The operation of weighter 1610 may be weighted according to a variable w. In one embodiment, w may be set according to an application for which the video coder is to be used (e.g., a first weight value for video conferencing applications, another weight value for use with stored video playback, etc.).

In an embodiment, the picture virtual buffer fullness comparator 1620 includes storage 1622 to store data representing coding of prior frames. The storage 1622 may store data representing the previous frames' type ptyp, the target rate calculated for the frame $T_X$(x=I, P or B) and the actual bitrate of the frame that was achieved during coding $S_X$(x=I, P or B). The picture virtual buffer fullness comparator 1620 may calculate for a frame j an intermediate variable $d_{xj}$ according to:

$$d_{xj} = d_{xj-1} + S_{xj-1} - T_{xj-1}, \quad (5.)$$

where x=I, P or B. For I frames, it is computed with reference to $d_I$, $T_I$ and $S_I$ values of a previous I frame. For P and B frames, it is computed with reference to similar values for previous P and B frames respectively. The $d_I$, $d_P$ and $d_B$ values represent bits accumulated on a running basis for frames of each type in a given group of pictures or video segment. When the group of pictures/segment concludes, the $d_I$, $d_P$ and $d_B$ values may be reset to initial values. In one embodiment the initial values can be determined as:

$$d_{I0} = 10 * \frac{r}{31}, \quad (6.)$$

$$d_{P0} = K_P * d_{I0}, \text{ and} \quad (7.)$$

$$d_{B0} = K_B * d_{I0}, \text{ where} \quad (8.)$$

$$r = \frac{2 * \text{bit\_rate}}{\text{picture\_rate}}. \quad (9.)$$

The $d_I$, $d_P$ and $d_B$ values may be input to a percentage computer 1624 which determines what percentage of the overall bit rate allocated for each type of frame in the group of pictures has been consumed $$\left(\text{e.g., } vbfst_{I,B,P} \propto \frac{d_{I,P,B}}{\text{bit\_budget}_{I,P,B}}\right).$$

The vbfst signal may be output to the virtual/real buffer fullness weighter 1610.

As noted, the virtual/real buffer fullness weighter 1610 receives both a virtual buffer fullness indicator vbfst and an actual buffer fullness indicator bfst. The actual buffer fullness indicator bfst may represent an amount of coded video data that is queued for transmission out of a video coder. Typically, the coded video data remains pending in a transmission buffer, which is filled at a coding rate and drained at a transmission rate. The virtual/real buffer fullness weighter 1610 may generate an estimate of buffer fullness full from these two input signals according to:

$$\text{full} = (w * vbfst) + (1-w) * bfst \quad (10.)$$

where w is the weighing variable.

The buffer fullness indicator may be mapped to a quantizer estimate $q_{est2}$. In an embodiment, the buffer fullness indicator may be input to a MPEG Quantizer Mapper 1630. An output therefrom may be input to an H.264 Quantizer Mapping Table 1640. In one embodiment, the table may have a structure as illustrated in FIG. 18B. Thus the improved buffer-based quantizer computer 1600 may generate a first estimate of a quantizer value $q_{est1}$ to be used for coding the current frame.

Figure 17:
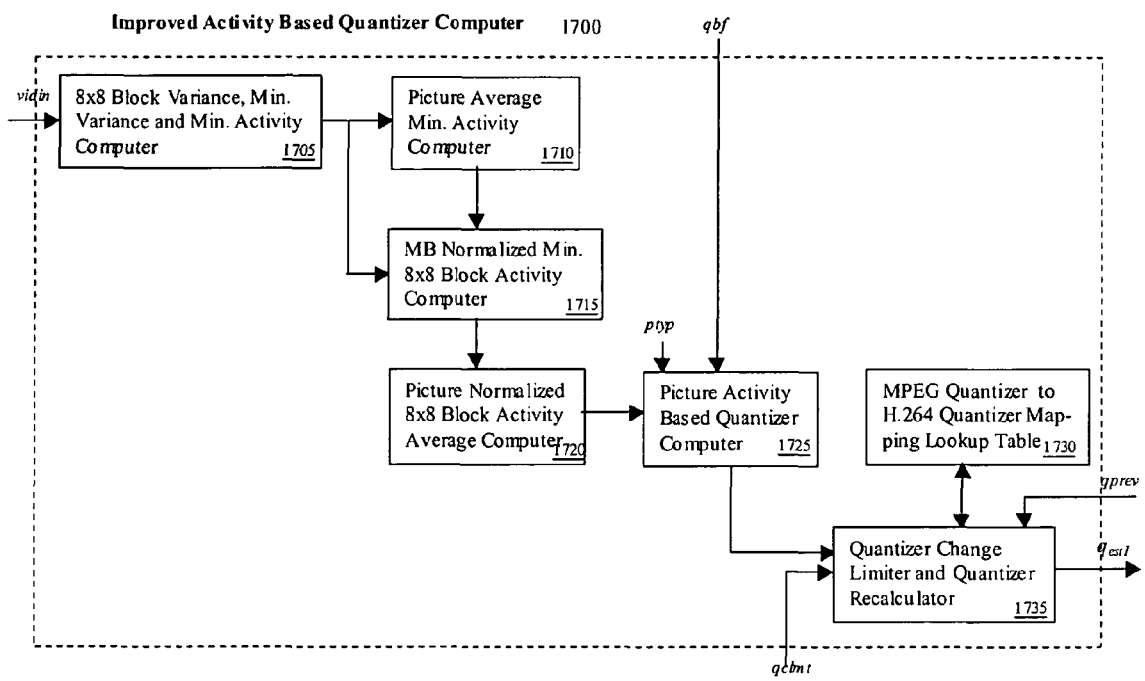
FIG. 17 is a block diagram of an improved activity based quantizer according to an embodiment of the present invention.

FIG. 17 illustrates an improved activity base quantizer computer 1700 according to an embodiment of the present invention. Quantizer computer 1700 may include an 8×8 block variance, minimum variance and minimum activity computer 1705 that computes variance values for each 8×8 block in the input frame. For each macroblock, computer selects the minimum variance value of the four 8×8 blocks therein and computes an activity value therefrom—the macroblock's minimum activity value (actmin$_{MB}$). A picture average minimum activity computer 1710 may calculate an average minimum activity values for all macroblocks in the current picture. A MB normalized minimum 8×8 block activity computer 1715 may calculated normalized minimum activity values of the 8×8 blocks within each macroblock. A picture normalized 8×8 block activity average computer 1720 may generate a normalized activity value for each 8×8 block across a picture.

In an embodiment, the minimum activity of a macroblock actmin$_{MB}$ may be calculated as actmin$_{MB}$=1+ min (blkvar1, blkvar2, blkvar3, blkvar4), where blkvar represents the variances of 8×8 blocks within the macroblock. The normalized activity per MB may be expressed as:

$$actnorm = \frac{(2 \times actmin) + actminavg}{actmin + (2 \times actmin\ 8avg)}, \text{ where}$$

actminavg is a sum of actmin values for all macroblocks in a previously processed picture. Actnorm values may be averaged for all macroblocks in a picture to obtain actnormavg value.

A picture activity based quantizer computer 1725 may derive a quantizer value for the picture based on the average normalized block activity values, the picture type assignment and the buffer based quantizer value $q_{bf}$ obtained from the Improved Buffer Based Quantizer Computer according to:

$$q_{est1_x} = q_{bf_x} \times actnormavg_x (x=I, P \text{ or } B).$$

The quantizer value may be mapped to a quantizer estimate via an MPEG to H.264 mapping (represented by table 1730) and by a limiter 1735. The limiter 1735 may determine if a difference between a current quantizer estimate $q_p$ and a previously selected quantizer $q_{prev}$ exceeds a predetermined quantizer change limit ($qc_{lmt}$) and, if so, may reduce the quantizer estimate to fit the within the limit.

In an embodiment, the H.264 Quantizer Mapping Lookup Table 1730 may be shared with the corresponding unit of the improved buffer-based quantizer computer 1600.

Figure 18A:
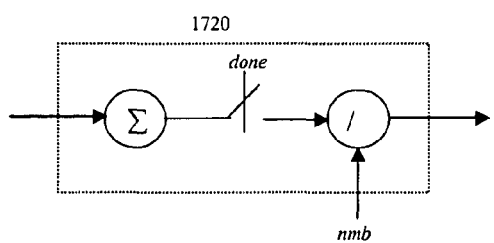
FIG. 18A-18C illustrate block diagrams of picture normalized 8×8 block activity average computer, a diagram of MPEG quantizer (qmpeg) to H.264 quantizer (qh264) mapping values in lookup table, and a block diagram of change limiter and quantizer recalculator, used by improved activity based quantizer.
Figures 18B, 18C:
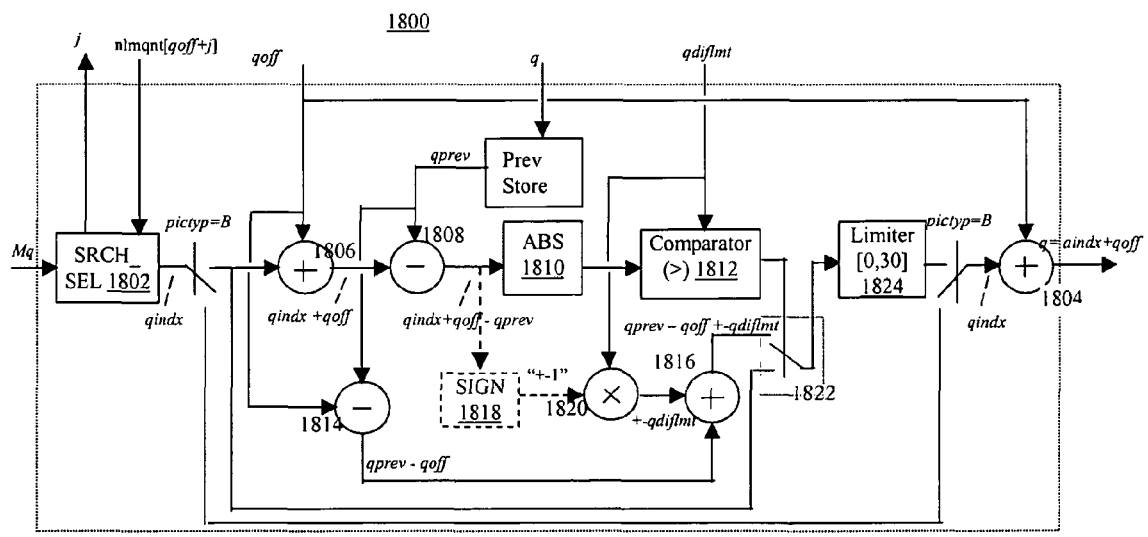

FIG. 18A is a block diagram of a Picture Normalized 8×8 Block Activity Averager 1720 according to an embodiment of the present invention. The averager 1720 may include an adder to sum up all the block activity indicators from the Macroblock Normalized Minimum 8×8 Block Activity Computer 1715 and a divider to divide the summed activity value by the number of blocks in the picture. The averager 1720 thus determines a normalize average of block activity across the current frame.

FIG. 18C is a block diagram of a quantizer change limiter and quantizer recalculator 1800 according to an embodiment of the present invention. An activity based quantizer estimate $q_{act}$ may be input to the recalculator 1800 and applied to a search selector 1802. For I pictures or P pictures, the output of the search selector 1802 ($q_{indx}$) may be input to an adder 1804, which adds a quantizer offset $q_{off}$ thereto and outputs the result from the recalculator 1800.

For B pictures, the $q_{indx}$ value may be subject to some exception testing processing. An adder 1806 also adds the quantizer offset value $q_{off}$ to the $q_{indx}$ value. The output of adder 1806 is input to a subtractor 1808, which subtracts the value of a quantizer from a previous picture $q_{prev}$. An absolute value generator 1810 and a comparator 1812 cooperatively determine if the magnitude of the subtractor's output ($q_{indx}$+$q_{off}$−$q_{prev}$) is greater than a quantizer differential limit $q_{diflmt}$.

Another subtractor 1814 determines a difference between $q_{prev}$ and $q_{off}$. At an adder 1816, the value qdiflmt is either added to or subtracted from the output of the subtractor 1814, generating a value of $q_{prev}$−$q_{off}$±$q_{diflmt}$. The sign of the $q_{diflmt}$ term may correspond to the sign of the output from subtractor 1808 (represented in FIG. 18C as sign controller 1818 and multiplier 1820). Based on the output of comparator 1812, a switch 1822 causes one of two values to be output to a limiter 1824:

$q_{indx}$, if $|q_{indx}+q_{off}-q_{prev}|>q_{diflmt}$ or $q_{prev}-q_{off}\pm q_{diflmt}$, otherwise.

The limiter 1824 may clip any input values that fall outside the range [0,30] to values of 0 or 30. The output of the limiter 1824 may be added to the quantizer offset value $q_{off}$ at adder 1804 to generate the quantizer output value for B pictures.

Figures 19, 20A:
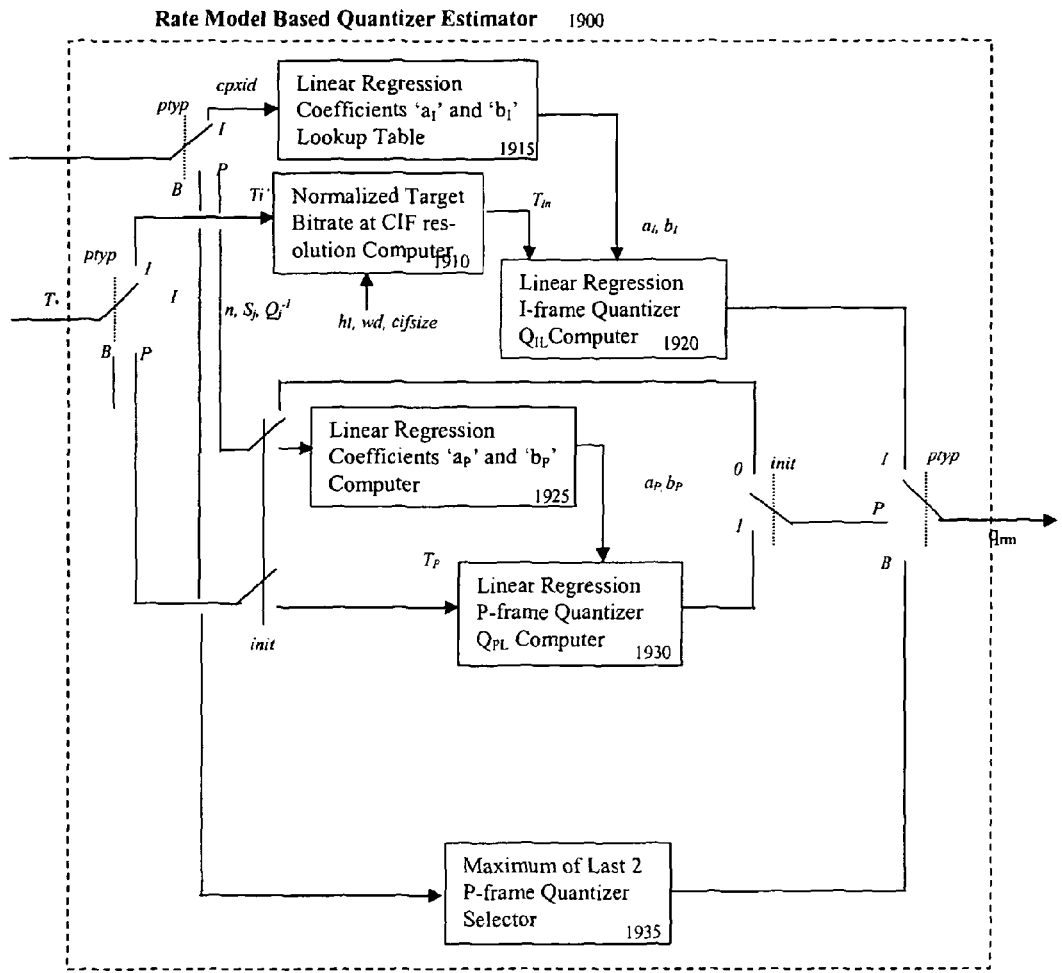
FIG. 19 is a block diagram showing rate model based quantizer estimator according to an embodiment of the present invention.
FIG. 20A-20B illustrate exemplary values for $a_i$ and $b_i$ linear regression coefficients according to an embodiment of the present invention.

FIG. 19 is a block diagram of a rate model-based quantizer estimator (RMQE) 1900 according to an embodiment of the present invention. The RMQE 1900 operates based upon a linear regression analysis of previously coded picture frames to propose a quantizer for use on a current frame. In an embodiment, the RMQE 1900 is context-specific providing a different coding analysis for I frames, for P frames and for B frames. Thus the RMQE 1900 may include a processing chain for I frames (elements 1910, 1915 and 1920), another processing chain for P frames (elements 1925 and 1930) and for B frames (element 1935). One of the processing chains may be activated for a given frame based on the state of the ptyp signal for that frame.

Figures 20B, 21A:
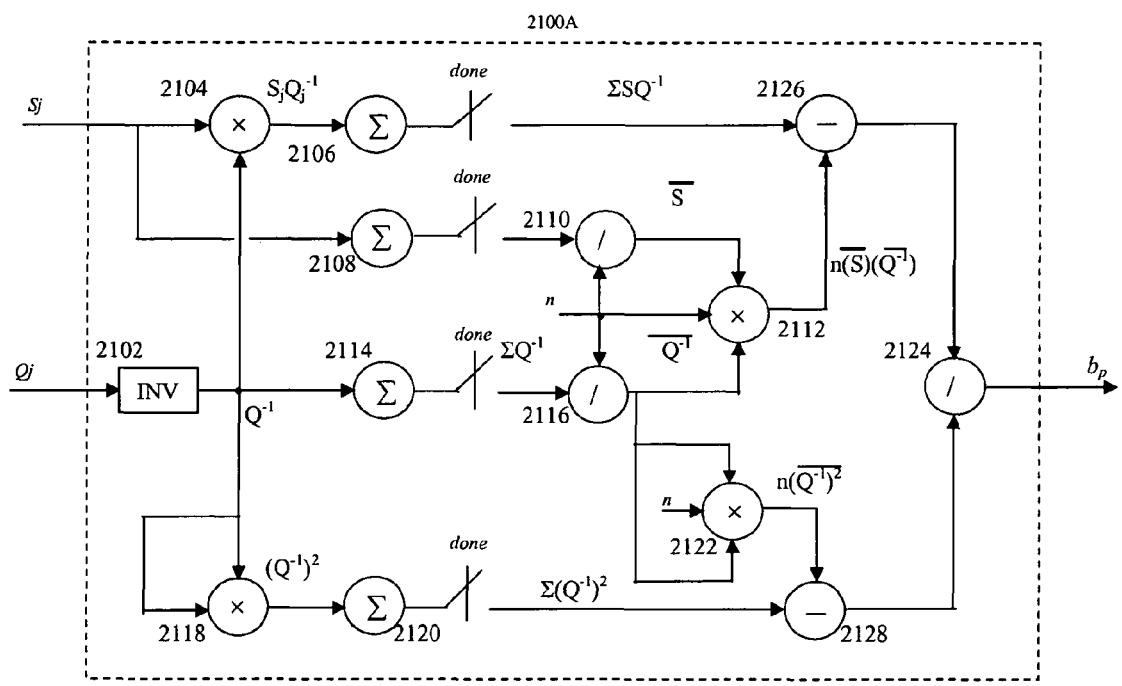
FIG. 21A-21B are block diagrams for a $b_p$ linear regression model coefficient computer and an $a_p$ linear regression model coefficient computer according to an embodiment of the present invention.

Consider the RMQE 1900 when processing I-frames. Responsive to a target bitrate indicator $T_I$, the RMQE 1900 may determine a normalized target bitrate at CIF resolution $T_{in}$ (box 1910). Responsive to a spatial complexity indicator cpxid the RMQE 1900 may retrieve linear regression coefficients $a_I$ and $b_I$ from a lookup table 1915. FIG. 20A illustrates exemplary values of coefficient $a_i$ and FIG. 20B illustrates exemplary values of coefficient bi for use in the lookup table 1915. Responsive to the values $a_I$, $b_I$ and $T_{in}$, the RMQE may generate a quantizer estimate $q_{baseI}$ according to:

$$q_{baseI} = \frac{b_I}{T_I - a_I}. \tag{11.}$$

Thus, the RMQE 1900 may generate a quantizer estimate based upon the target rate $T_I$ and the spatial complexity indicator cpxid.

Consider the RMQE 1900 when processing P-frames. There, the RMQE 1900 may perform linear regression on n prior values of S, Q to generate coefficients $a_p$, $b_p$. Responsive to these coefficients and to a target value $T_P$, a linear regression P-frame quantizer computer generates a proposed quantizer $q_{basep}$. During an initialization period, the target value $T_P$ may be employed to 'seed' the linear regression analysis. Thereafter, however, the influence of the target value $T_P$ may be removed and the linear regression analysis may be run autonomously using only the $S_j$, $Q_j^{-1}$ values.

The linear regression for P frames may be performed by exploiting a mathematical relationship between S, the number of bits used per frame, and Q, the quantizer used for those frames:

$$S=a+b/Q, \tag{12.}$$

Extending over a set of linear equations S, Q and solving for coefficient $a_P$ and $b_P$ yields:

$$a_p + \overline{S} - b\overline{Q^{-1}} \tag{13.}$$

$$b_p = \frac{\sum (S)(Q^{-1}) - n(\overline{S})(\overline{Q^{-1}})}{\sum (Q^{-1})^2 - n(\overline{Q^{-1}})} \tag{14.}$$

where S and $\overline{Q^{-1}}$ represent matrices of S and Q values for prior P frames and n represents the number of (S, Q) pairs over which the linear regression is performed. Although n can be any number high than 2, in some embodiments it is limited to 3-5 frames to consider frames that are most likely to be similar to the frame currently under study. Having calculated coefficient values $a_P$ and $b_P$ from prior P frames, the RMQE 1900 may estimate a quantizer for the current picture using the target bitrate estimate $T_P$ according to:

$$Q_{baseP} = \frac{b_P}{T_P - a_P}. \tag{15.}$$

For B frames, the RMQE 1900 simply may use a median of the quantizers used by the video encoder over the past n P-frames, for some value of n (box 1935).

FIG. 21A is a block diagram of a P-frame linear regression coefficient computer 2100A according to an embodiment of the present invention. Computer 2100A may calculate coefficient $b_p$ according to eq. 14 above. In an embodiment, computer 2100 may include an inverter 2102 that generates $Q_j^{-1}$ values from input quantizer values $Q_j$. A multiplier 2104 generates $S_j Q_j^{-1}$ values, which are summed at summer 2106 to obtain a value $\Sigma(S)(Q^{-1})$. The output of summer 2106 generates the first term of the numerator in eq. 14.

The second term of the numerator in eq. 14 is supplied by two averagers and a multiplier. The first averager may include summer 2108, which is coupled to the $S_j$ input, and divider 2110. An output of the divider 2110 ($\overline{S}$) is input to a multiplier 2112. The second averager, composed of summer 2114 and divider 2116, generates an average of the $Q^{-1}$ values ($\overline{Q^{-1}}$).

The multiplier 2112 generates an output $n(\overline{S})(\overline{Q^{-1}})$, which is the second term in the numerator of eq. 14.

The first term in the denominator of eq. 14 may be provided by multiplier 2118 and summer 2120. Multiplier 2118 squares the $Q^{-1}$ values from which summer 2120 generates an output $\Sigma(Q^{-1})^2$. The second term of the denominator of eq. 14 may be provided by multiplier 2122, which generates a value $n(Q^{-1})^2$. Divider 2124 generates the coefficient value $b_P$ from the outputs of subtractors 2126 and 2128.

Figure 21B:
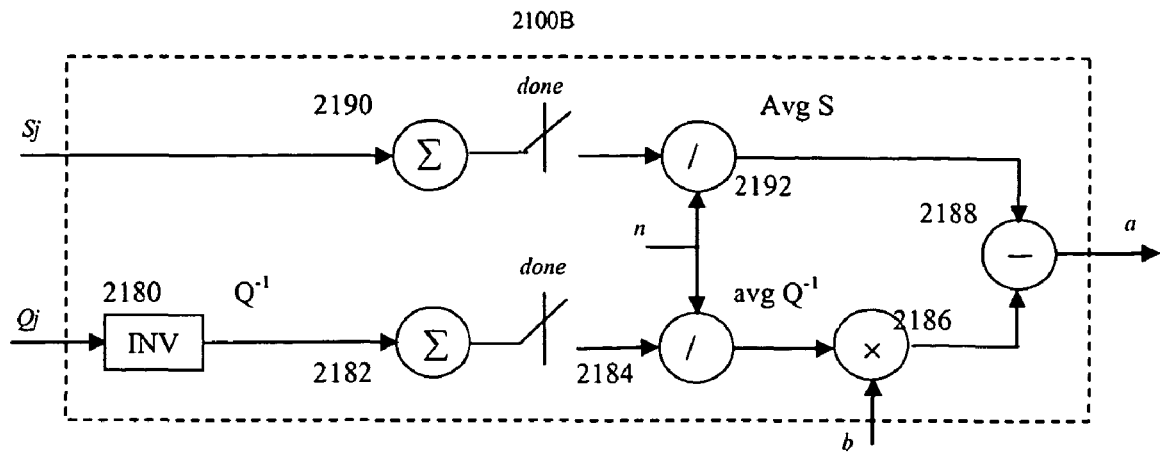

FIG. 21B illustrates a P-frame linear regression coefficient computer 2100B to calculate coefficient $a_P$ according to an embodiment of the present invention. An inverter 2180 accepts input values $Q_j$ of prior P frame quantizers to generate values $Q_j^{-1}$. A summer and divider 2182, 2184 average the $Q_j^{-1}$ values. A multiplier 2186 multiplies coefficient b to the average $Q_j^{-1}$ values. The multiplier's output is a first input to a subtractor 2188. This represents the second term of eq. 13. Input values Sj are averaged by summer and divider 2190, 2192 and presented to the subtractor 2188. This input represents the first term of eq. 13.

Figure 22A:
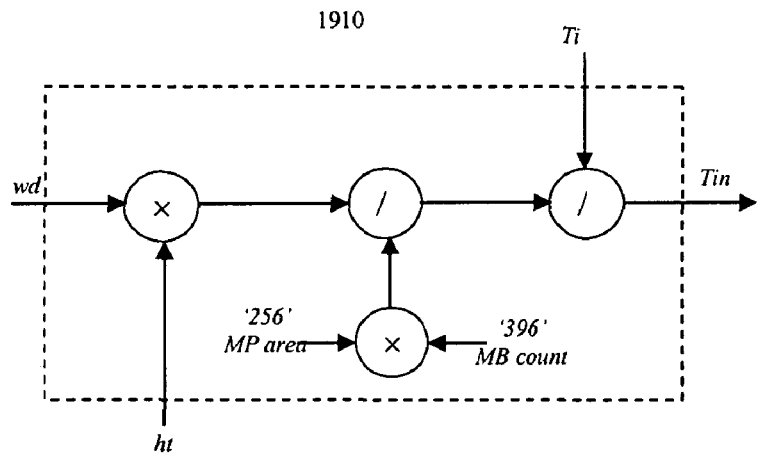
FIG. 22A-22B are block diagrams of a normalized target bitrate at CIF resolution computer and an linear regression quantizer computer according to an embodiment of the present invention.

FIG. 22A illustrates operation of a Normalized Target Bitrate computer 1910 according to an embodiment of the present invention. In the embodiment, the computer 1910 may calculate a frame area farea from height and width indicators (ht, wd) in the system. The computer may divide the frame area by the number of pixels per macroblock (256 for 16×16 pixel macroblocks) and by the macroblock count per picture (396 for CIF frames). The normalized target bitrate value $T_{in}$ may be obtained by diving the target bitrate value $T_A$ by this value.

Figure 22B:
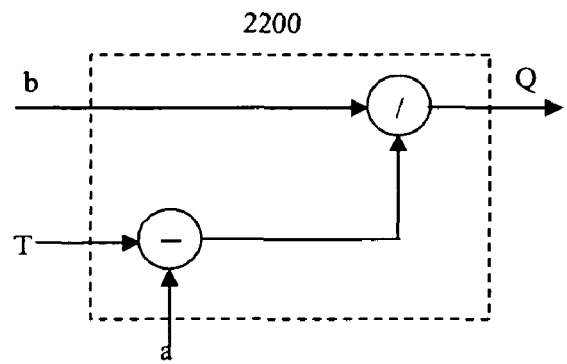

FIG. 22B illustrates operation of a generic quantizer computer 2200 according to an embodiment of the present invention. The quantizer computer 2200 may find application in the processing chains for I-frames and P-frames (elements 1920, 1930 respectively) to generate proposed quantizer values in accordance with Eqs. 11 and 15. The quantizer computer 2200 may generate a signal representing the retrieved coefficient $b_x$ divided by a difference between the input target rate $T_x$ and the retrieved coefficient $a_x$ (x=I or P). This value may be taken as the quantizer value proposed by the quantizer computer 2200.

Figure 23:
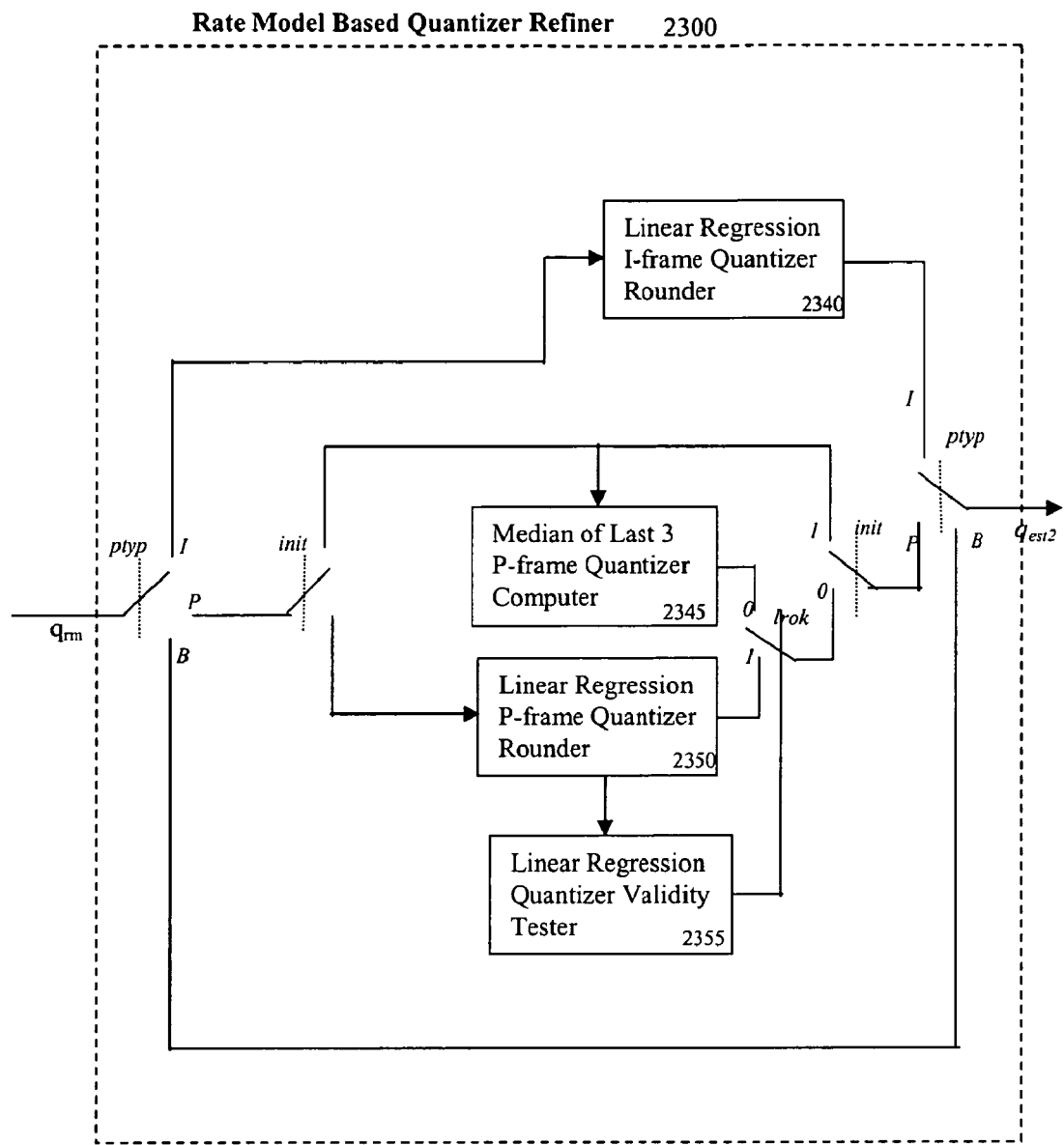
FIG. 23 is a block diagram of a rate model quantizer refiner according to an embodiment of the present invention.

FIG. 23 is a block diagram of a rate model based quantizer refiner (RMQR) 2300 according to an embodiment of the present invention. The RMQR 2300 also may operate in a context-specific manner, having different processing chains for I-, P- and B-frames. For B-frames in this embodiment, for example, no refinement may be necessary; the quantizer estimate may be output from the RMQR without alteration. Similarly, for P-frames during an initialization period, the input quantizer estimate Q may be output from the RMQR 2300 without alteration.

Figure 24A:
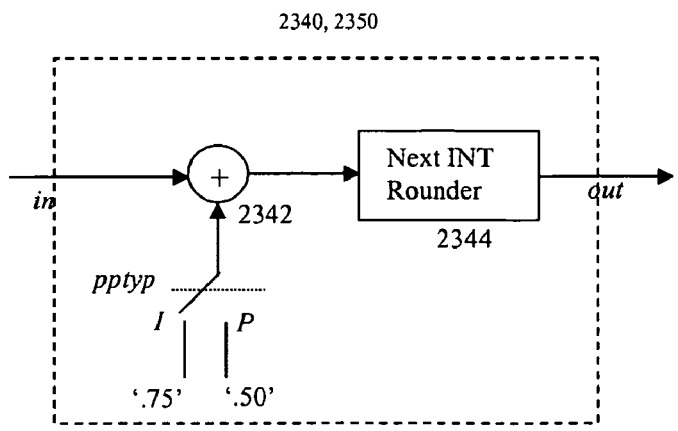
FIG. 24A-24B are block diagrams of a rounder and a validity tester of linear regression based quantizer according to an embodiment of the present invention.

For I-frames, a quantizer rounder 2340 may round the quantizer estimate to a neighboring integer. Shown in FIG. 24A, for example, a quantizer rounder may add 0.75 to an input quantizer estimate at adder 2342 and then round to the nearest integer 2344. The output quantizer estimate thereafter may be output from the RMQR 2300.

For P-frames, outside of the initialization mode, the input quantizer estimate may be input to a linear regression quantizer rounder 2350 (FIG. 23). Shown in FIG. 24A, a quantizer rounder for P frames may add 0.5 to an input quantizer estimate at adder 2342 and then round to the next integer 2344. The output of the rounder 2350 may be input to a linear regression quantity tester 2355 which determines if the rounded quantizer estimate is valid. If so, the rounded quantizer estimate from block 2350 may be output from the RMQR 2300. If not, however, the RMQR 2300 may generate a quantizer estimate representing a median of the quantizers used in the last three P-frames (block 2345).

Figure 24B:
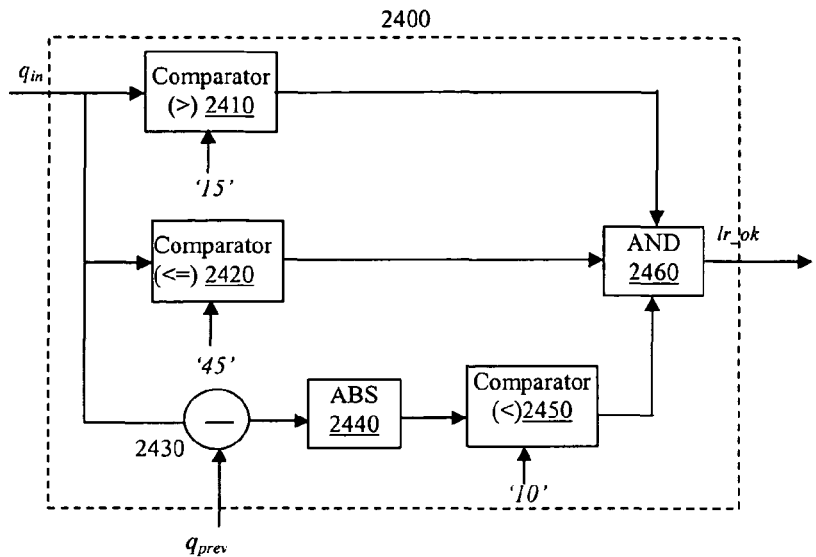

FIG. 24B illustrates a linear regression quantity tester 2400 according to an embodiment of the present invention. The tester 2400 may include a pair of comparators 2410, 2420, which compare the rounded quantizer estimate Q to respective high and low thresholds. Exemplary values of 15 and 45 are shown in FIG. 24B.

The tester 2400 also may include a subtractor 2430 and absolute value generator 2440 to determine a difference between the input quantizer estimate and the quantizer of a previous P frame. A third comparator 2450 determines whether the absolute value of differences among the two quantizers is less than a third predetermined threshold (e.g., $|q_{est}-q_{prev}|<$Thresh). If the conditions of all three comparators are met, if the input quantizer estimate is within bounds established by the high and low thresholds and if the difference between the input quantizer estimate and a prior quantizer value is lower than a third threshold, the tester 2400 may generate an output signaling that the linear regression estimate is valid (Irok). If any one of these conditions are not met, however, the tester 2400 may determine that the quantizer estimate obtained by the linear regression analysis is invalid.

Figure 25:
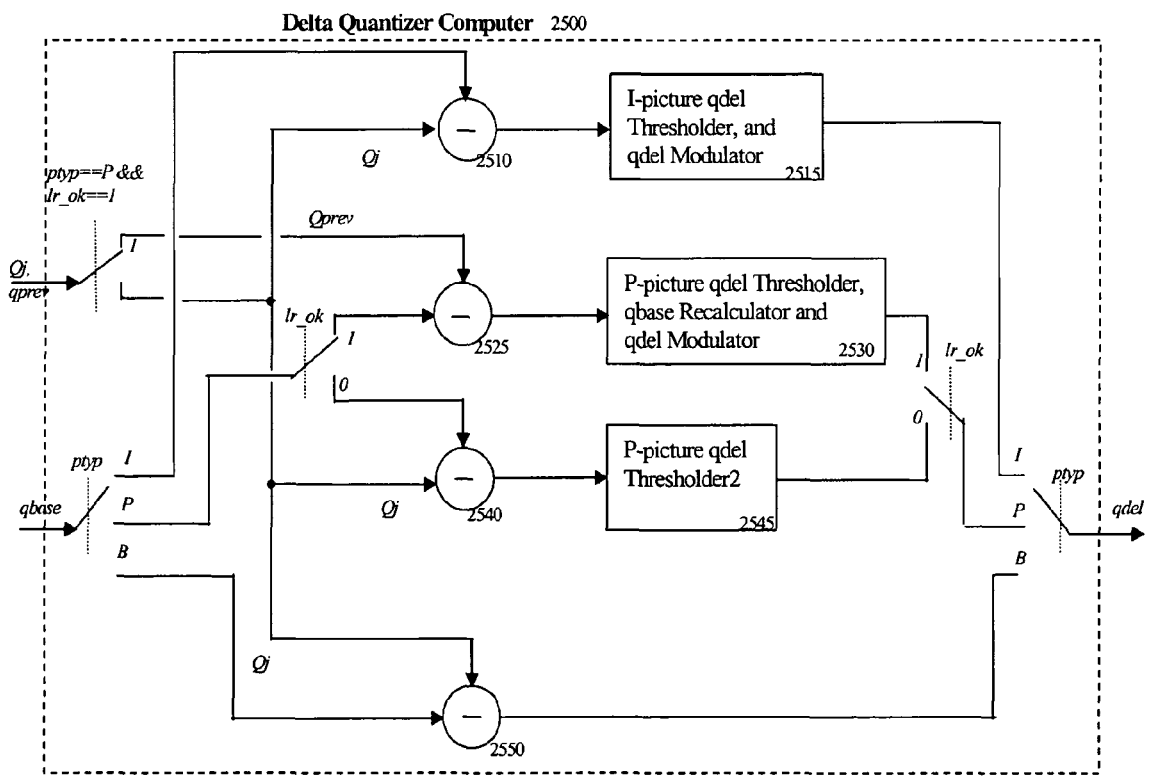
FIG. 25 is a block diagram of a rate and activity based delta quantizer computer according to an embodiment of the present invention.

FIG. 25 is a block diagram of a delta quantizer computer 2500 according to an embodiment of the present invention. In an embodiment, the delta quantizer computer 2500 operates in a context-specific manner, having separate processing chains for I-frames, for P-frames and for B-frames. The delta quantizer computer 2500 accepts quantizer estimates from the ITRC 420 and the RMQC 430 of, for example, FIG. 4 (labeled $Q_{base}$ and $Q_j$, $q_{prev}$, respectively).

For I frames, the delta quantizer computer 2500 may include a subtractor 2510 and an $q_{del}$ thresholder and modulator 2515. The subtractor 2510 may determine a difference $q_{del}$ between the input quantizer values ($q_{del}=Q_{base}-Q_j$). If the $q_{del}$ value is outside a predetermined window of values, the I-picture $q_{del}$ Thresholder and $q_{del}$ Modulator 2515 may clip the $q_{del}$ value at a predetermined maximum or minimum value. Thereafter, the I-picture $q_{del}$ Thresholder and $q_{del}$ Modulator 2515 may scale the $q_{del}$ value by a predetermined factor.

For P-frames, the delta quantizer computer 2500 may include a pair of processing 'sub-chains,' one of which will be used depending on the validity of the linear regression analysis (Irok, FIG. 23). When the linear regression is valid, a subtractor 2525 may determine a $q_{del}$ value represented by a difference of $Q_{pref}$ and $Q_{base}$ (e.g., $q_{del}=Q_{base}-Q_{prev}$). The qdel value may be input to a P-picture $q_{del}$ Thresholder, $Q_{base}$ Recalculator and $q_{del}$ Modulator 2530, which computes a quantizer value based on $q_{del}$ and $q_{prev}$.

When the linear regression analysis is not valid, the delta quantizer may compute an output from $q_{base}$ and $Q_j$. A subtractor 2540 generates a $q_{del}$ value from $Q_{base}-Q_j$. A thresholder 2545 thereafter clips the $q_{del}$ value at a minimum or maximum value if the $q_{del}$ value falls outside a predetermined quantizer range. The output of the thresholder 2545 may be taken as the $q_{del}$ value for the P-frame.

For B-frames, the delta quantizer computer 2500 may generate a $q_{del}$ value from a difference of the $Q_{base}$ and $Q_j$ values ($q_{del}=Q_{base}-Q_j$) at a subtractor 2550. The output of the subtractor 2550 may be output from the delta quantizer computer 2500 as the final $q_{del}$ value.

Figure 26A:
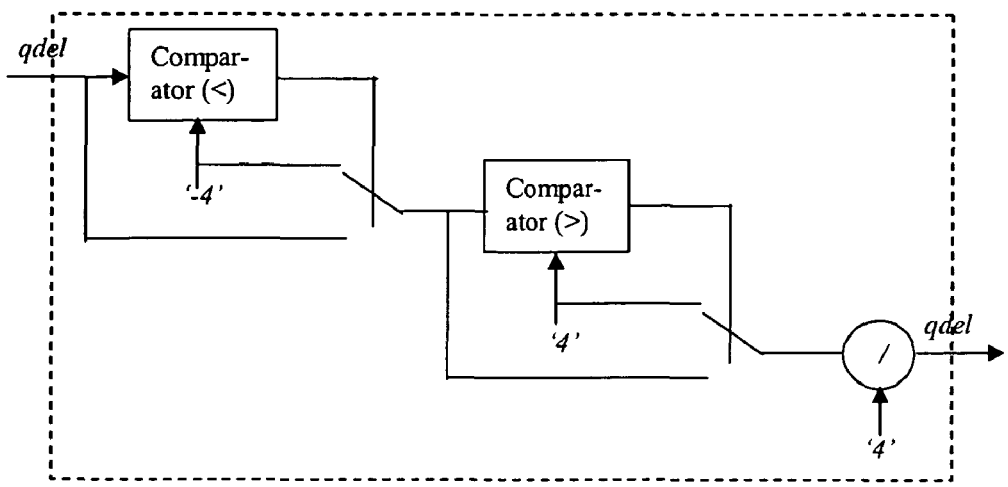
FIG. 26A-26C are block diagrams of an I-picture $q_{del}$ thresholder and $q_{del}$ modulator; a P-picture $q_{del}$ thresholder, $q_{base}$ recalculator and $q_{del}$ zeroer; and a P-picture $q_{del}$ thresholder according to an embodiment of the present invention.

FIG. 26A is a block diagram of a I-picture $q_{del}$ Thresholder and $q_{del}$ Modulator 2515 according to an embodiment of the present invention. Thresholder/Modulator 2515 may include first and second comparators 2516 and 2517. The first comparator 2516 may compare the $q_{del}$ value to a predetermined low threshold (e.g., −4) and, if the $q_{del}$ value is lower than the low threshold, substitute the low threshold for the $q_{del}$ value. The second comparator 2517 may compare the output of the first comparator 2516 to a high threshold (e.g., 4) and, if the signal is greater than the high threshold, substitute the high threshold for the $q_{del}$ value. Thereafter, a divider 2518 may scale the resulting value by a scaling factor (e.g., 4). Thus, the output $q_{del}$ value will take a value of:

$$q_{del} = \frac{\text{LowThreshold}}{\text{Scale Factor}}, \text{ if the input } q_{del} > \text{Low Threshold,}$$

$$q_{del} = \frac{\text{High Threshold}}{\text{Scale Factor}}, \text{ if the input } q_{del} < \text{High Threshold,}$$

or $$q_{del} = \frac{q_{del}}{\text{Scale Factor}}, \text{ otherwise.}$$

Using the exemplary values shown in FIG. 26A, the output $q_{del}$ value would be between −1 and 1.

Figure 26B:
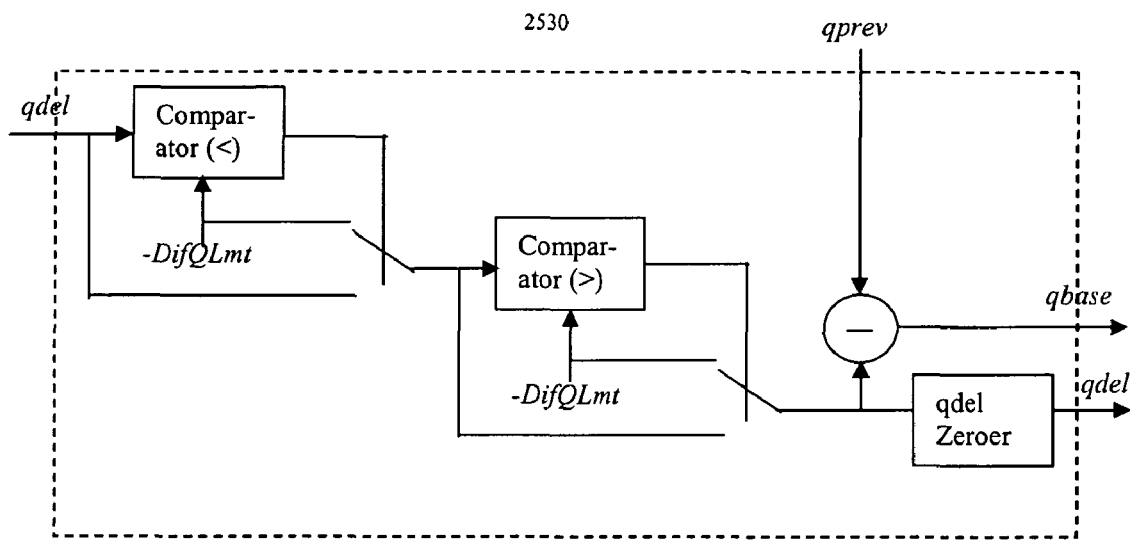
Figure 26C:
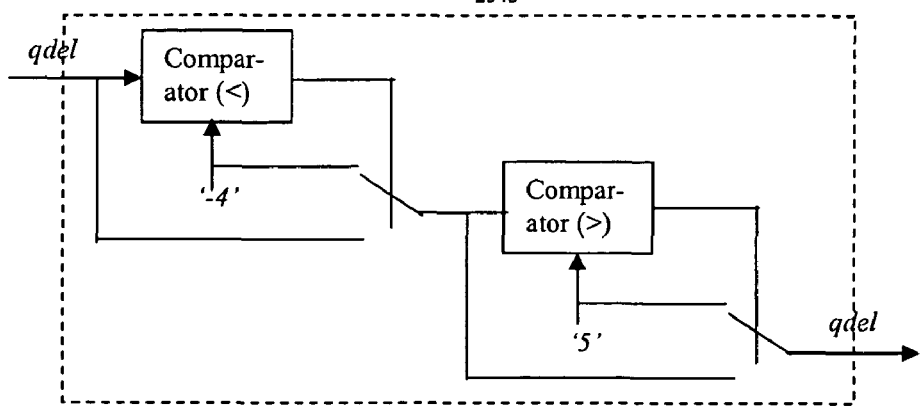

FIG. 26B is a block diagram of a P-picture $q_{del}$ Thresholder, $Q_{base}$ Recalculator and $q_{del}$ Modulator 2530 according to an embodiment of the present invention. This unit may include a pair of comparator 2531, 2532, which compare the input $q_{del}$ value to high and low thresholds respectively. In this embodiment, the high and low thresholds are presented as a differential quantizer limit, which is (represented as—DifQLmt and DifQLmt respectively). Any $q_{del}$ value that exceeds the high threshold or is less than the low threshold will be clipped to the corresponding threshold. $Q_{del}$ values that fall within the limits of the two thresholds are not altered by the comparators.

A subtractor 2533 generates a $q_{base}$ output as a difference between the previous quantizer value $q_{prev}$ and the value output by the comparators 2531, 2532. Thus, the output $q_{base}$ may take the values:

$q_{base} = q_{prev} + \text{Dif}QLmt$, if $q_{del}$ is less than—Dif$QLmt$, $q_{base} = q_{prev} - \text{Dif}QLmt$, if $q_{del}$ is greater than Dif$QLmt$,
or $q_{base} = q_{prev} - q_{del}$, otherwise.

The $q_{del}$ value, however, may be set to zero (element 2534).

Figure 27:
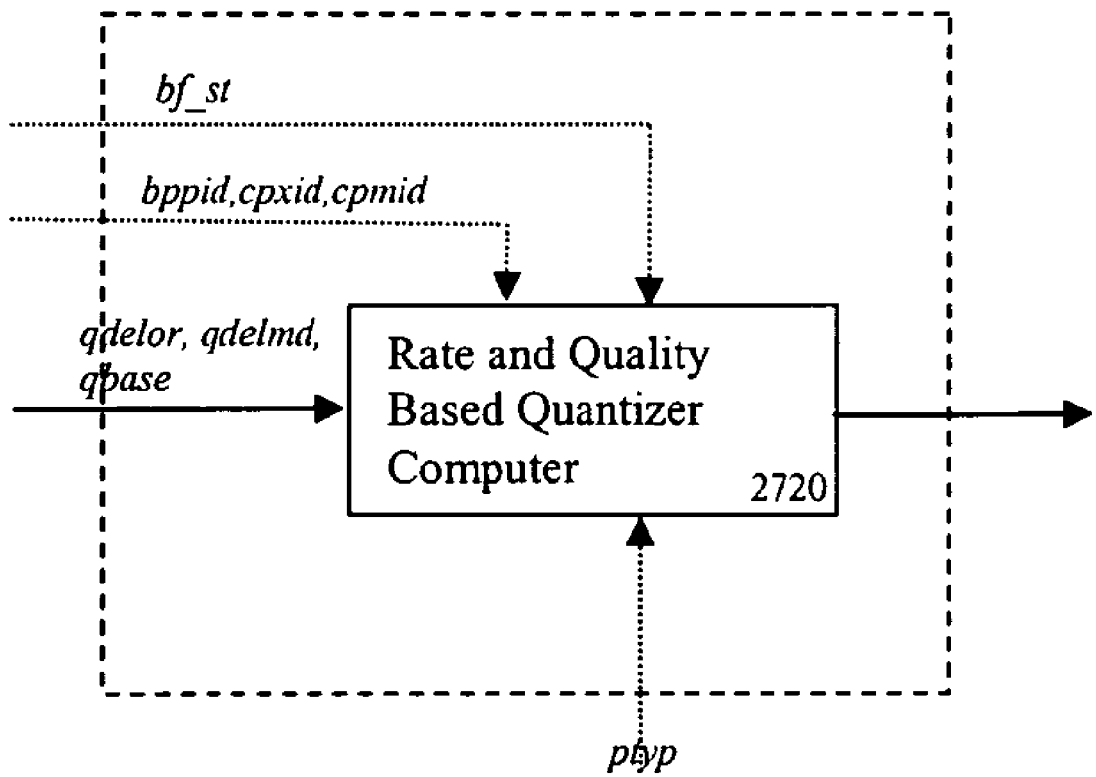
FIG. 27 is a block diagram of a rate and quality based coding enforcer according to an embodiment of the present invention.

FIG. 27 illustrates signal input of a Rate and Quality-based Coding Enforcer (RQCE) 2700 according to an embodiment of the present invention. The RQCE 2700 may generate a final quantizer selection $Q_{frame}$ based on the complexity indicators (cpxid, cpmid, bppid), the buffer status indicator bfst, the picture type signal ptyp and input $q_{base}$. The quantizer selection of the RQCE 2700 ($Q_{frame}$) is the quantizer that is used to code image data of the respective frame.

Figure 28:
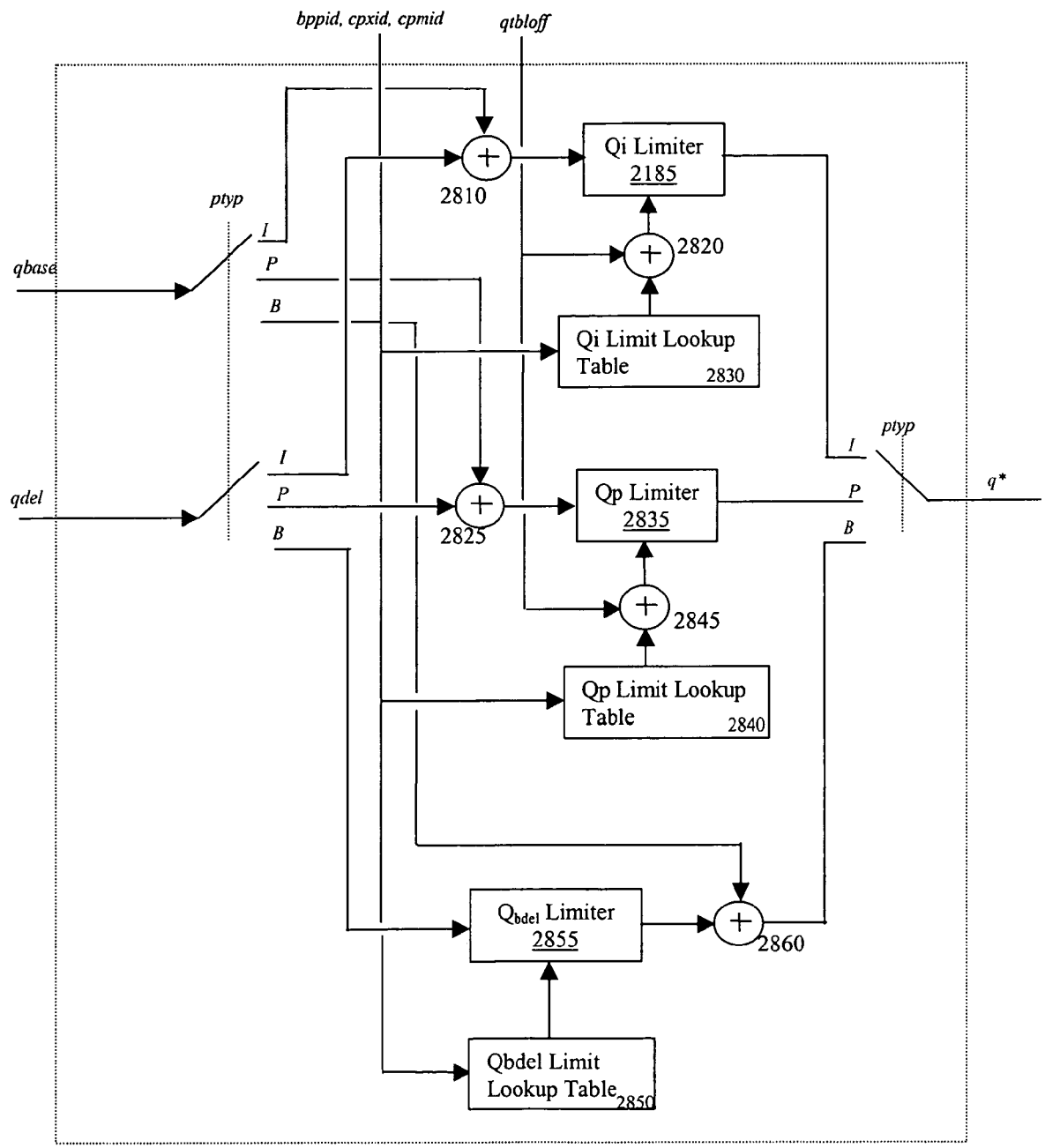
FIG. 28 is a block diagram of a rate and quality based quantizer computer according to an embodiment of the present invention.

FIG. 28 is a block diagram of a Rate and Quality-Based Quantizer Computer (RQQC) 2800 according to an embodiment of the present invention. The RQQC 2800 may include a plurality of processing chains, each dedicated to processing of specific frame type (e.g., I-frames, P-frames, B-frames).

For I-frames, input values $q_{base}$ and $q_{del}$ are summed at an adder 2810 and its result is input to a $Q_I$ Limiter unit 2815. Complexity indicators (cpxid, cpmid, bppid) are input to a $Q_I$ Limit Lookup Table 2830, which outputs a limit value to another adder 2820. A $q_{tbloff}$ value is added to the limit value and a result therefrom may be input to the $Q_I$ Limiter 2815. The $Q_I$ limiter 2815 may generate an output having a value of either $Q_{base} + q_{del}$ or limit+$q_{tbloff}$, whichever is lower.

The RQQC 2800 in an embodiment, may possess a similar structure for P-frames. An adder 2825 may sum the input values $Q_{base}$ and $q_{del}$ and pass the resulting value to a $Q_P$ limiter 2835. Complexity indicators cpxid, cpmid, bppid may address a $Q_P$ Limit Lookup Table 2840 and cause a limit value to be output therefrom, which is added to a $q_{tbloff}$ value at an adder 2845. The output of adder 2845 may be input to $Q_P$ limiter 2835. The $Q_P$ limiter 2835 may generate an output having a value of either $Q_{base} + q_{del}$ or limit+$q_{tbloff}$, whichever is lower.

For B-frames, the $q_{del}$ value may be input directly to a $Q_{Pdel}$ limiter 2855. The complexity indicators cpxid, cpmid, bppid may be used to address a $Q_{Bdel}$ Limit Lookup Table 2850 and retrieve a limit value therefrom. The limiter 2855 may generate an output that is the lesser of qdel or the limit value. This output may be added to the $Q_{base}$ value at an adder 2860 and output from the RQQC 2800.

FIGS. 29A, 29B and 29C illustrate exemplary lookup tables for use in the RQQC 2800. FIG. 29A illustrates limit values for use in a $Q_I$ Limit Lookup Table 2830. FIG. 29B illustrates limit values for use in a $Q_P$ Limit Lookup Table 2840 and FIG. 29C illustrates limit values for use in a $Q_{bdel}$ Limit Lookup Table 2850.

FIG. 29A-29C are diagrams showing example values in lookup tables, I-frame quantizer limit ($q_{Ilmt}$) example values, P-frame quantizer limit ($q_{plmt}$) example values, B-frame delta quantizer limit ($q_{Bdlmt}$) example values, used by rate and quality based quantizer computer.

Figure 30:
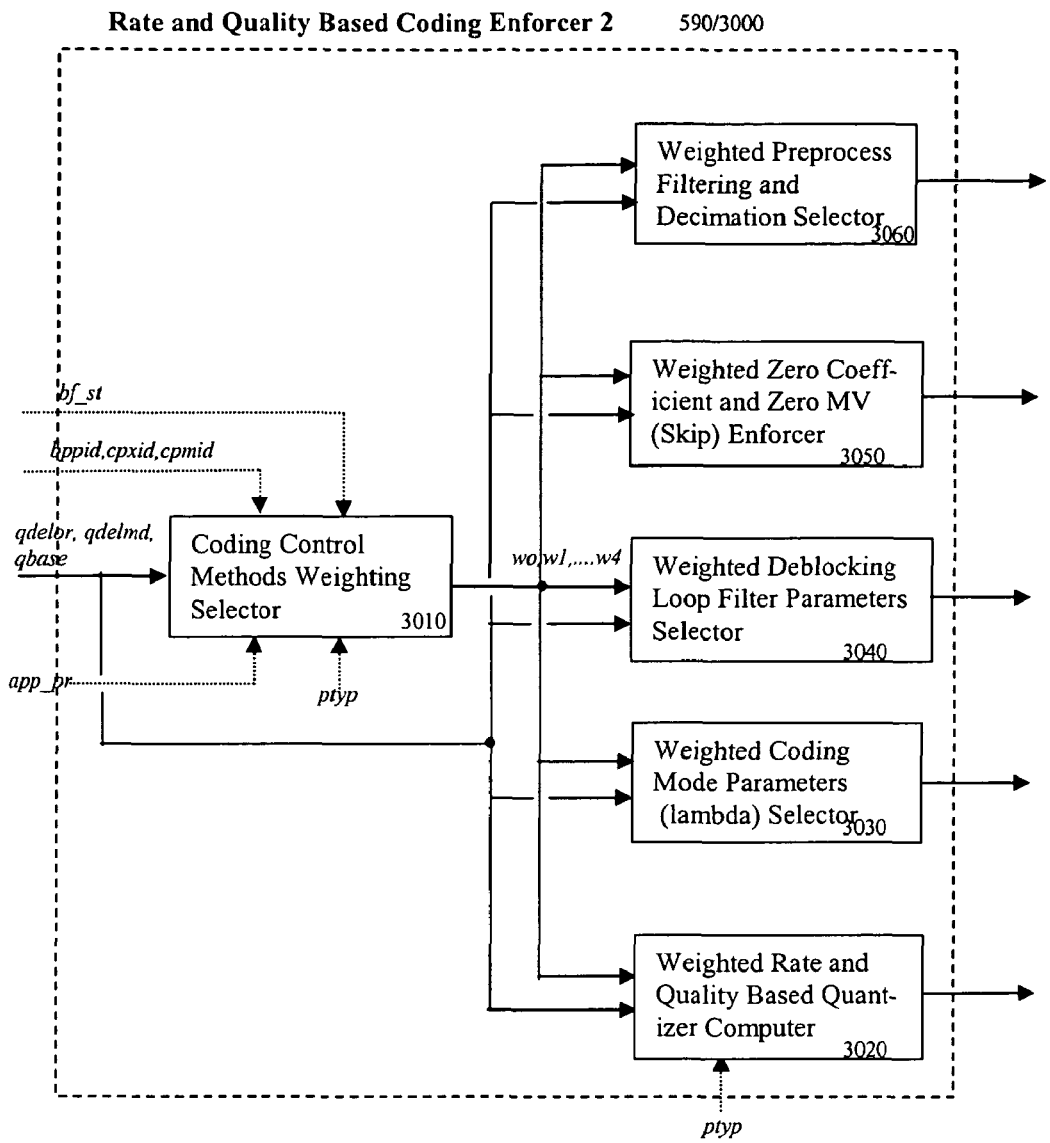
FIG. 30 is a block diagram of a rate and quality based coding enforcer according to another embodiment of the present invention.

FIG. 30 illustrates another embodiment of a RQQC 3000 according to the present invention. In this embodiment, the RQQC 3000 may include a Coding Control Method Selector 3010 that coordinates operation of other rate controlling features within the video coder. In addition to quantizer selection 3020, such rate controlling features may include: mode decision parameter selection 3030, deblocking loop filter parameter selection 3040, motion vector and texture coefficient truncation 3050 and preprocess filtering and decimation 3060. As noted, quantizer selection contributes to rate control because it controls the number of bits that are allocated to represent texture coefficients. Control of coding mode decisions can control coding rates because it may limit the number of motion vectors that are allocated per macroblock (e.g., 2, 4, 8 or 16 motion vectors may be transmitted per frame). Control of a deblocking loop filter improves coding performance at various bitrates by controlling block-based artifacts that may occur in the decoding loop of an encoder, which could propagate across a series of coded video frames. Vector and coefficient truncation can cause selected motion vectors or texture coefficients to be forced to zero regardless of whether they would be truncated by conventional scaling. When these values are run length coded, the discarded values further reduce coding rates. Preprocess filtering can cause a video coder to discard frames, which would reduce coding rates further.

The coding control method selector 3010 may introduce a graduated response to coding difficulties, beyond simply adjusting the quantizer on its own, and further retain video quality at the decoder. In response to the complexity indicators cpxid, cpmid, bppid, the picture type ptyp, the buffer status bfst, inputs, $q_{del}$, and $q_{base}$ and app_pr, the coding control method selector 3010 generates a series of weight values w0, w1, . . . , w4 that determine how strongly each coding control feature is to be engaged. The app_pr value is a policy indicator that may be set, for example, based on the application for which the rate controller is to be used. For example, the rate controller may operate according to a first rate control policy for video conferencing applications but another rate control policy for stored video playback applications; the app_pr signal may distinguish among these policies.

Figure 31:
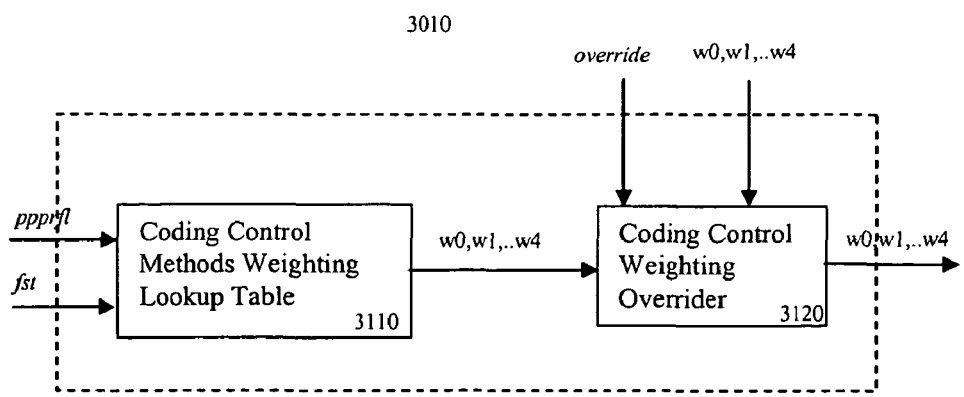
FIG. 31 illustrates coding control methods weighting selector used by rate and quality based coding enforcer.

FIG. 31 illustrates operation of a coding control method selector 3010 according to an embodiment of the present invention. The coding control method selector 3010 may include a coding control lookup table 3110, which may be indexed by the buffer status indicator bfst, app_pr. The coding control lookup table may be a multi-dimensional array in which weighting factors for each of the coding control features are located. In response to an input value, the lookup table may produce a set W of weighting factors w0, w1, ..., w4. An override signal, in certain instances, may cause the default weighting factors to be replaced by other weighting factors to account for certain events in the video stream. For example, scene changes are events in a video sequence that cause an increase in the number of coded bits per picture under ordinary coding schemes. They may cause problems for rate control. So, while first set of weights may define a default rate control policy, the default rate control policy may be overriden for pictures surrounding the scene change. Thus, to reduce buffer contents, overriding weights may define an alternate policy which would cause video data immediately following a scene to be coded poorly or to be skipped altogether.

In another example, a certain segment of pictures may contained text and graphics such as occur during the opening credits of movies or television programs. Text and graphics contain sharp edges. To retain good coding quality, a video coder may have to retain accurate spatial coding but, temporally, it may be permissible to reduce the sequence's frame rate. Thus, for video sequences that possess text and/or graphics, a normal weighting array may be overriden in favor of alternate weights that emphasize temporal decimation.

Figures 32, 33:
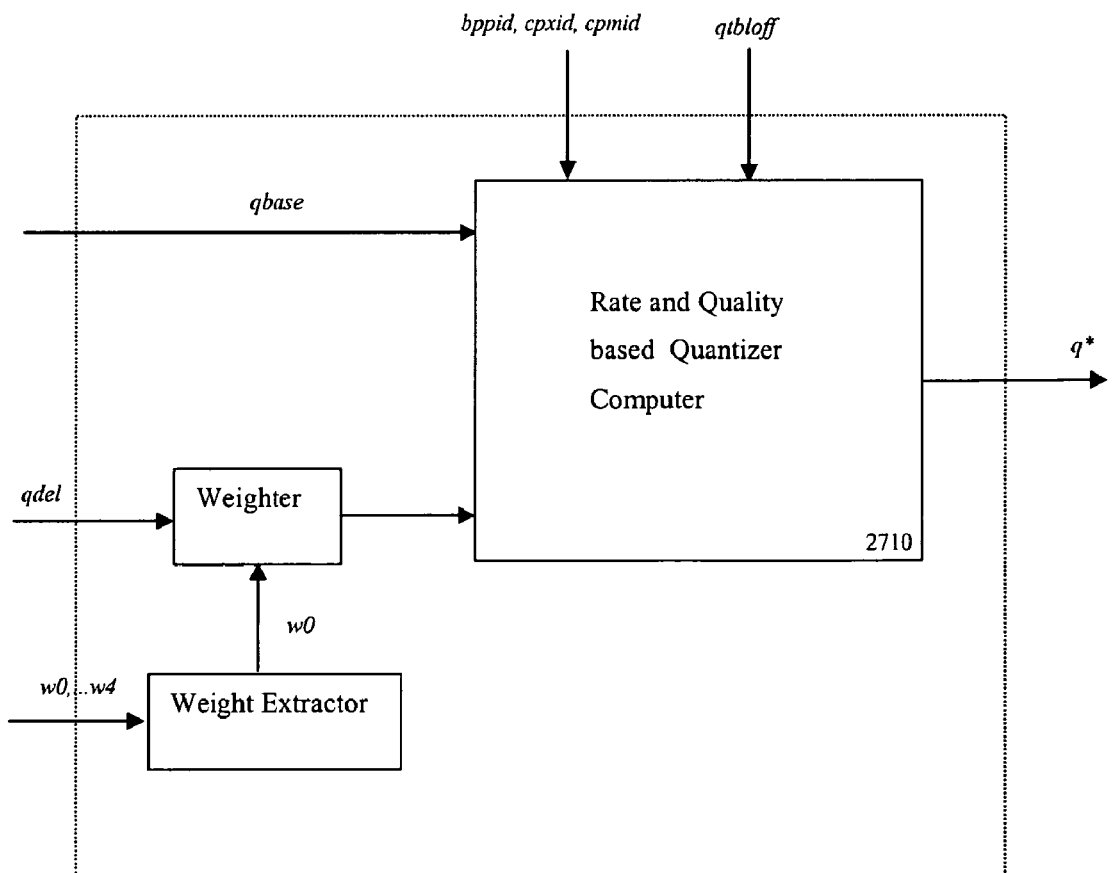
FIG. 32 illustrates coding control methods weighting lookup table used by coding control methods weighting selector according to an embodiment of the present invention.
FIG. 33 is a block diagram of a weighted rate and quality based quantizer computer according to an embodiment of the present invention.

FIG. 32 illustrates exemplary weighting values for the coding control lookup table 3110 according to an embodiment of the present invention.

FIG. 33 illustrates a Weighted Rate and Quality-based Quantizer Computer (WRQQC) 3020 according to an embodiment of the present invention. The WRQQC 3020 may be based on and include a rate and quality based quantizer computer as described in the foregoing embodiments, for example, FIGS. 27 and 28. Additionally, the WRQQC may include a multiplier 3022 that multiplies the $q_{del}$ value by a weight corresponding to the WRQQC (here, $w_0$). Thus, a scaled value of $q_{del}$ may be input to the rate and quality based quantizer computer 2710 for further processing.

Thus, the inventors have developed a quantizer selection scheme that controls video coding rates while at the same time remaining sensitive to quality of the decoded video obtained therefrom. As shown above, the quantizer parameters may be selected on a picture-by-picture basis in response to complexity indicators representing spatial complexity, motion complexity and bits per pel in the source data. The principles of the foregoing embodiments may be extended to provide various quantizer parameters for units within a picture, if desired. For example, some video coders organize video data of a picture into slices and define quantizer parameters for each slice. Indeed, in some video coders, the number of slices per picture is dynamically assigned. The principles of the present invention may find application with such coders by calculating complexity indicators and target bits for each slice of a picture and applying the operations of the ITRC and RMQC on a slice-by-slice basis. Extension to other units of video data, smaller than a picture, are within the spirit and scope of the present invention.

Several embodiments of the present invention are specifically illustrated and described herein. However, it will be appreciated that modifications and variations of the present invention are covered by the above teachings and within the purview of the appended claims without departing from the spirit and intended scope of the invention. For example, much of the foregoing description has characterized various embodiments of the invention as embodied in hardware circuits. In many applications, however, the foregoing embodiments actually may be embodied by program instructions of a software application that executes on a processor structure such as a microprocessor or a digital signal processor. Thus, the foregoing description should be interpreted as applying equally to application specific electronic circuits or to program instructions executing on general processing structures.

I claim:

1. A non-transitory computer-readable medium encoded with a set of instructions which, when performed by a computer, perform a method of estimating a quantizer for pictures of a video sequence, said method comprising:
for an I picture, estimating a quantizer according to a linear regression analysis upon assumed values of quantizers and coding rates, the assumed values derived from a complexity indicator of the I picture,
for a P picture, estimating the quantizer according to the linear regression analysis upon values of quantizers and coding rates of prior P pictures, and
for a B picture, selecting the quantizer estimate from a maximum of quantizer selections of two most-recent P pictures.

2. The non-transitory computer-readable medium of claim 1, further comprising rounding the quantizer estimate to a nearest integer.

3. The non-transitory computer-readable medium of claim 1, further comprising retrieving the assumed quantizer and coding rate values from a table based on the complexity indicator of the I picture.

4. The non-transitory computer-readable medium of claim 3, wherein the complexity indicator represents spatial complexity of the I picture.

5. The non-transitory computer-readable medium of claim 1, wherein the quantizer estimate $Q_I$ is given by:

$$Q_I = \frac{b}{T_I - a}, \text{ where}$$

a and b are the coefficients.

6. The non-transitory computer-readable medium of claim 1, wherein the target coding rate $T_i$ is determined by:

$$T_i = \max\left\{\frac{R}{\left(1 + \frac{N_P X_P}{X_I K_P} + \frac{N_B X_B}{X_I K_B}\right)}, \frac{\text{bitrate}}{8 * \text{picturerate}}\right\}, \text{ where}$$

R represents a number of bits allocated to code a group of pictures in which the I picture resides,
$N_P$ and $N_B$ respectively represent the number of P and B pictures that appear in a group of pictures,
$X_I$ and $X_P$ respectively represent complexity estimates for the I and P pictures in the group of pictures,
$K_P$ and $K_B$ determine relative bit allocations between P and B pictures in the group of pictures,
bitrate represents the number of bits allocated for coding of the group of pictures, and picturerate represents the number of pictures in the group of pictures.

7. The non-transitory computer-readable medium of claim 1, wherein for a P picture, the linear regression analysis derives a quantizer estimate from a target bitrate assigned to the P picture.

8. The non-transitory computer-readable medium of claim 7, wherein the quantizer estimate for a P picture is given as:

$$Q_P = \frac{b}{T_P - a}, \text{ where}$$

$Q_P$ is the quantizer estimate of the P picture, $T_P$ is a target bitrate calculated for the P picture and b and a are coefficients derived from a set of previous quantizer selections and previous coding rates (respectively Q and S) according to:

$$a_P + S - bQ^{-1}$$

$$b_P = \frac{\sum (S)(Q^{-1}) - n(\overline{S})(\overline{Q^{-1}})}{\sum (Q^{-1})^2 - n(\overline{Q^{-1}})^2}.$$

9. The non-transitory computer-readable medium of claim 7, wherein the target bitrate $T_P$ is given as:

$$T_P = \max\left\{\frac{R}{\left(N_P + \frac{N_B K_P X_B}{K_B X_P}\right)}, \frac{bitrate}{8 * picturerate}\right\}, \text{ where}$$

R represents a number of bits allocated to code a group of pictures in which the P picture resides, $N_P$ and $N_B$ respectively represent the number of P and B pictures that appear in a group of pictures, $X_P$ and $X_B$ respectively represent complexity estimates for the P and B pictures in the group of pictures, $K_P$ and $K_B$ determine relative bit allocations between P and B pictures in the group of pictures, bitrate represents the number of bits allocated for coding of the group of pictures, and picturerate represents the number of pictures in the group of pictures.

10. The non-transitory computer-readable medium of claim 1, further comprising:

testing a quantizer estimate for the P picture to determine if it is valid, and if the P picture's quantizer estimate is not valid, calculating a substitute quantizer estimate as a median of a predetermined number of quantizers used for previous P pictures.

11. The non-transitory computer-readable medium of claim 10, wherein the P picture's quantizer estimate is valid if it falls within a predetermined window of quantizer values and if a difference between the quantizer estimate and a quantizer of a most recently processed P picture is less than a predetermined value.

12. A non-transitory computer-readable medium encoded with a set of instructions which, when performed by a computer, perform a method of quantizer estimation for a new P picture, said method comprising:

performing a linear regression analysis on quantizer values and coding rates for a predetermined number of previously coded P pictures, generating a first quantizer estimate for the new P picture based on the linear regression analysis and with reference to a target coding rate assigned to the new P picture, generating a second quantizer estimate for the new P picture as a median of a second predetermined number of the previously coded P pictures, and based on a difference between the first quantizer estimate and a quantizer of a most recently coded P picture, selecting one of the first or the second quantizer estimates as a final quantizer estimate for the P picture.

13. The non-transitory computer-readable medium of claim 12, wherein the P picture's quantizer estimate is valid if it falls within a predetermined window of quantizer values and if a difference between the quantizer estimate and a quantizer of a most recently processed P picture is less than a predetermined value.

14. The non-transitory computer-readable medium of claim 12, wherein the quantizer estimate is given as:

$$Q_P = \frac{b}{T_P - a}, \text{ where}$$

$Q_P$ is the quantizer estimate of the P picture, $T_P$ is a target bitrate calculated for the P picture and b and a are coefficients derived from a set of previous quantizer selections and previous coding rates (respectively Q and S) according to:

$$a_P + S - bQ^{-1}$$

$$b_P = \frac{\sum (S)(Q^{-1}) - n(\overline{S})(\overline{Q^{-1}})}{\sum (Q^{-1})^2 - n(\overline{Q^{-1}})^2}.$$

15. The non-transitory computer-readable medium of claim 12, wherein the target bitrate $T_P$ is given as:

$$T_P = \max\left\{\frac{R}{\left(N_P + \frac{N_B K_P X_B}{K_B X_P}\right)}, \frac{bitrate}{8 * picturerate}\right\}, \text{ where}$$

R represents a number of bits allocated to code a group of pictures in which the P picture resides, $N_P$ and $N_B$ respectively represent the number of P and B pictures that appear in a group of pictures, $X_P$ and $X_B$ respectively represent complexity estimates for the P and B pictures in the group of pictures, $K_P$ and $K_B$ determine relative bit allocations between P and B pictures in the group of pictures, bitrate represents the number of bits allocated for coding of the group of pictures, and picturerate represents the number of pictures in the group of pictures.

16. The non-transitory computer-readable medium of claim 12, further comprising rounding the quantizer estimate to a nearest integer.

17. A non-transitory computer-readable medium encoded with a set of instructions which, when performed by a computer, perform a method of quantizer estimation for an I picture, said method comprising:

deriving coefficients for linear regression analysis by referring a complexity indicator of the I picture to a lookup table of coefficient values, performing linear regression analysis based on the coefficients, and generating a quantizer estimate for the I picture based on the linear regression analysis and with reference to a target coding rate assigned to the I picture.

18. The non-transitory computer-readable medium of claim 17, wherein the lookup table stores values as shown in the following tables:

| Linear regression coefficients a | |
|---|---|
| Complexity indicator | Coefficient value |
| 0 | −68134.59213 |
| 1 | −87003.98467 |
| 2 | −106202.60465 |
| 3 | −125401.23463 |
| 4 | −133506.23620 |
| 5 | −141558.73699 |
| 6 | −149611.24778 |
| 7 | −151588.19751 |
| 8 | −220858.39744 |
| 9 | −293963.81117 |
| 10 | −254808.46319 |
| 11 | −215653.11522 |
| 12 | −207487.50918 |
| 13 | −1993321.90315 |
| 14 | −191155.48428 |
| 15 | −182989.06541 |
| 16 | −178235.75132 |
| 17 | −169521.36854 | and

| Linear regression coefficients b | |
|---|---|
| Complexity indicator | Coefficient value |
| 0 | 3313453.21342 |
| 1 | 3993567.19336 |
| 2 | 4565785.16255 |
| 3 | 5138003.13174 |
| 4 | 5715464.15501 |
| 5 | 6104194.66665 |
| 6 | 6492925.17829 |
| 7 | 6678722.15535 |
| 8 | 9084900.80067 |
| 9 | 11517856.77655 |
| 10 | 10611605.70466 |
| 11 | 9705354.63278 |
| 12 | 9777071.15962 |
| 13 | 9848787.68646 |
| 14 | 9920504.21330 |
| 15 | 9992220.74014 |
| 16 | 10623397.89991 |
| 17 | 11435042.39299. |

19. The non-transitory computer-readable medium of claim 17, further comprising deriving the complexity indicator from image content of the I picture.

20. The non-transitory computer-readable medium of claim 17, wherein the complexity indicator represents spatial complexity of the I picture.

21. The non-transitory computer-readable medium of claim 17, wherein the quantizer estimate $Q_I$ is given by:

$$Q_I = \frac{b}{T_I - a}, \text{ where}$$

a and b are the coefficients.

22. The non-transitory computer-readable medium of claim 17, wherein the target coding rate $T_i$ is determined by:

$$T_i = \max\left\{\frac{R}{\left(1 + \frac{N_P X_P}{X_I K_P} + \frac{N_B X_B}{X_I K_B}\right)}, \frac{bitrate}{8 * picturerate}\right\}, \text{ where}$$

R represents a number of bits allocated to code a group of pictures in which the I picture resides, $N_P$ and $N_B$ respectively represent the number of P and B pictures that appear in a group of pictures, $X_I$ and $X_P$ respectively represent complexity estimates for the I and P pictures in the group of pictures, $K_P$ and $K_B$ determine relative bit allocations between P and B pictures in the group of pictures, bitrate represents the number of bits allocated for coding of the group of pictures, and picturerate represents the number of pictures in the group of pictures.

23. The non-transitory computer-readable medium of claim 17, further comprising rounding the quantizer estimate to a nearest integer.

* * * * *